(12) United States Patent
Ando et al.

(10) Patent No.: US 6,671,243 B2
(45) Date of Patent: Dec. 30, 2003

(54) INFORMATION STORAGE MEDIUM, INFORMATION RECORDING METHOD, AND INFORMATION REPRODUCTION METHOD

(75) Inventors: Hideo Ando, Hino (JP); Yutaka Kashihara, Fuchu (JP); Chosaku Noda, Kawasaki (JP); Yutaka Okamoto, Chofu (JP); Koichi Hirayama, Ichikawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 140 days.

(21) Appl. No.: 09/838,212

(22) Filed: Apr. 20, 2001

(65) Prior Publication Data

US 2001/0033517 A1 Oct. 25, 2001

(30) Foreign Application Priority Data

Apr. 21, 2000 (JP) ........................................ 2000-121327

(51) Int. Cl.⁷ ................................................ G11B 7/00
(52) U.S. Cl. ..................... 369/59.1; 369/47.1; 369/53.1; 369/53.36
(58) Field of Search ................................ 369/47.1, 47.5, 369/47.51, 47.53, 47.55, 53.1, 53.11, 53.36, 59.1, 59.11, 116

(56) References Cited

U.S. PATENT DOCUMENTS

| 5,862,103 A | * | 1/1999 | Matsumoto et al. ..... 369/13.27 |
| 5,949,747 A | * | 9/1999 | Miyashita et al. ....... 369/53.26 |
| 6,480,448 B1 | * | 11/2002 | Kawano et al. ............ 369/47.5 |

FOREIGN PATENT DOCUMENTS

| JP | 4-123368 | 4/1992 |
| JP | 6-309669 | 11/1994 |
| JP | 7-147661 | 6/1995 |

* cited by examiner

Primary Examiner—Muhammad Edun
(74) Attorney, Agent, or Firm—Oblon, Spivak, McClelland, Maier & Neustadt, P.C.

(57) ABSTRACT

An information storage medium has a plurality of reference data recording areas that record reference data which is used in at least one of circuit constant adjustment of an information reproduction apparatus and characteristic evaluation.

14 Claims, 33 Drawing Sheets

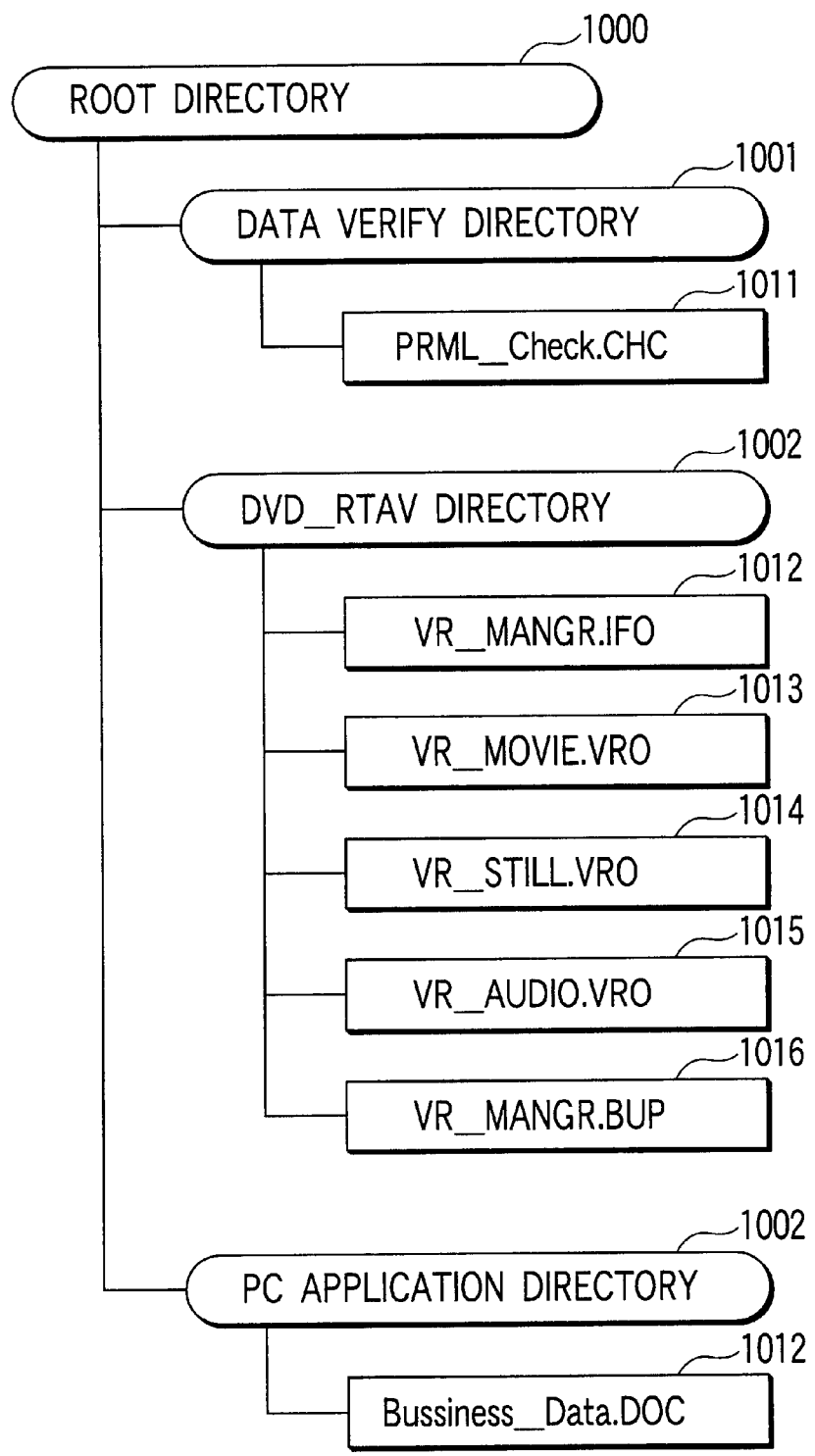
F I G. 1

ADDRESS INFORMATION AT
1011a TO 1011d IN PHYSICAL LAYER

FOCUSED BEAM SPOT INTENSITY DISTRIBUTION

RECORDING MARK

PR(1,1)    PR(1,2,1)

PSEUDO FOCUSED BEAM SPOT INTENSITY DISTRIBUTION

USE (AD (*), AD (*)...,AD (*))
... USED AS SPACE TABLE IN DESCRIPTOR USED TO SEARCH FOR
    UNRECORDED EXTENT

| 413 | 414 | 415 | 416 |
|---|---|---|---|
| DESCRIPTOR TAG (≡263) IDENTIFIER OF DESCRIPTION CONTENTS [16BYTES] | ICB TAG INDICATE FILE TYPE (TYPE=1) [20BYTES] | ALLOCATION DESCRIPTORS TOTAL LENGTH OF ALLOCATION DESCRIPTOR SEQUENCE (NUMBER OF BYTES) [4BYTES] | ALLOCATION DESCRIPTORS LIST SEQUENCE OF POSITIONS (LOGICAL BLOCK NUMBERS ON INFORMATION STORAGE MEDIUM) OF EXTENTS ON INFORMATION STORAGE MEDIUM (AD (*), AD (*)...,AD (*)) |

FIG. 15

FE (AD (*), AD (*)..., AD (*))
... INDICATE RECORDING POSITION OF FILE DESIGNATED BY FID IN FILE
    STRUCTURE HAVING HIERARCHICAL STRUCTURE ON INFORMATION
    STORAGE MEDIUM

| 417 | 418 | 419 | 420 |
|---|---|---|---|
| DESCRIPTOR TAG (≡261) IDENTIFIER OF DESCRIPTION CONTENTS [16BYTES] | ICB TAG INDICATE FILE TYPE (TYPE=4/5) [20BYTES] | USER DEPENDENT RECORDING/ REPRO- DUCTION/ DELETION PERMISSION INFORMATION [32BYTES] | ALLOCATION DESCRIPTORS LIST SEQUENCE OF RECORDING POSITIONS (LOGICAL BLOCK NUMBERS ON INFORMATION STORAGE MEDIUM) OF FILES ON INFORMATION STORAGE MEDIUM (AD (*), AD (*)...,AD (*)) |

FIG. 16

FID (LAD (LOGICAL BLOCK NUMBER))
... INDICATE INFORMATION OF FILE
    (ROOT DIRECTORY, SUBDIRECTORY, FILE DATA, OR THE LIKE)

| 421 | 422 | 423 | 424 | 437 |
|---|---|---|---|---|
| DESCRIPTOR TAG (≡257) IDENTIFIER OF DESCRIPTION CONTENTS [16BYTES] | FILE CHARACTER- ISTICS INDICATE FILE TYPE [1BYTES] | INFORMATION CONTROL BLOCK RECORDING POSITION OF CORRES- PONDING FE (LAD (*)) | FILE IDENTIFIER DIRECTORY NAME OR FILE DATA NAME | PADDING DUMMY AREA (00H) |

FIG. 17

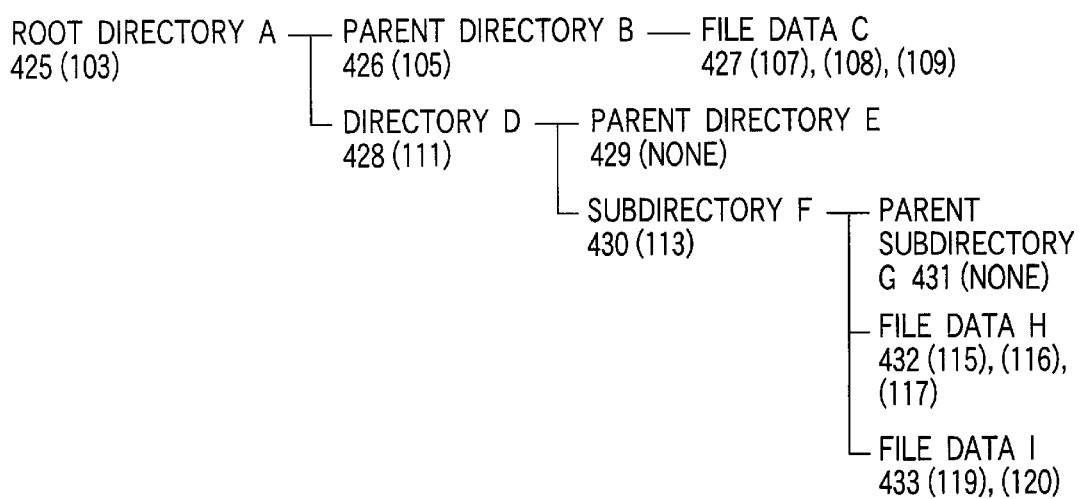
F I G. 18

| LSN | LBN | STRUCTURE 441 | DESCRIPTORS 442 | CONTENTS 443 |
|---|---|---|---|---|
| 0-15 | | | RESERVED 459 (ALL 00H BYTES) | |
| 16 | | VOLUME RECOGNITION SEQUENCE 444 | BEGINNING EXT. AREA DESCR. 445 | VRS START POSITION |
| 17 | | | VOLUME STRUCTURE DESCRIP. 446 | DISC CONTENT COMMENT |
| 18 | | | BOOT DESCRIPTOR 447 | BOOT START POSITION |
| 19 | | | TERMINATING EXT. AREA D. 448 | VRS END POSITION |
| ~31 | | | RESERVED 460 (ALL 00H BYTES) | |
| 32~ | | | OMITTED | |
| 34 | | MAIN VOLUME DESCRIPTOR SEQUENCE 449 | PARTITION DESCRIPTOR 450 PARTITION CONTENTS USE 451 UNALLOCATED SPACE TABLE 452 AD (50) UNALLOCATED SPACE BITMAP 453 AD (0) | RECORDING POSITION OF SPACE TABLE RECORDING POSITION OF SPACE BITMAP |
| 35 | | | LOGICAL VOLUME DESCRIPTOR 454 LOGICAL VOLUME CONT. USE 455 LAD (100) | RECORDING POSITION OF FILE SET DESCRIPTOR |
| ~47 | | | OMITTED | |
| ~63 | | | OMITTED | |
| -255 | | | RESERVED 461 (ALL 00H BYTES) | |
| 256 | | FIRST ANCHOR POINT 456 | ANCHOR VOLUME DESCRIPTOR POINTER 458 | |
| -271 | | | RESERVED 462 (ALL 00H BYTES) | |

FIG. 19

| | | | | |
|---|---|---|---|---|
| 272 ~ 321 | 0 ~ 49 | | SPACE BITMAP DESCRIPTOR 470 | MAPPING OF RECORDED/ UNRECORDED SPACE BITMAP |
| 322 ~ 371 | 50 ~ 99 | | USE (AD (*), AD (*),···, AD (*)) 471 | LIST OF UNRECORDED EXTENDS OF SPACE TABLE |
| 372 | 100 | | FILE SET DESCRIPTOR 472 ROOT DIRECTORY ICB 473 LAD (102) 474 | RECORDING POSITION OF ROOT DIRECTORY FE |
| 373 | 101 | | OMITTED | |
| 374 | 102 | | ROOT DIRECTORY AFE (AD (103)) 475 | RECORDING POSITION OF FIDs |
| 375 | 103 | FILE STRUCTURE 486 | A FID (LAD (104), LAD (110)) 476 | FE POSITION OF B AND D |
| 376 | 104 | | PARENT DIRECT. BFE (AD (105)) 477 | RECORDING POSITION OF FIDs |
| 377 | 105 | | BのFID (LAD (106)) 478 | FE POSITION OF C |
| 378 | 106 | | FE (AD (107) AD (108) AD (109)) 479 | FILE DATA POSITION |
| 382 | 110 | | DIRECTORYD FE (AD (111)) 480 | RECORDING POSITION OF FIDs |
| 383 | 111 | | D FID (LAD (112), LAD (NONE)) 481 | FE POSITION OF E AND F |
| 384 | 112 | | SUBDIRECTORYF FE (AD (113)) 482 | RECORDING POSITION OF FIDs |
| 385 | 113 | | FID (LAD () LAD (114) LAD (118) 483 | FE POSITION OF H AND I |
| 386 | 114 | | FE (AD (115) AD (116) AD (117)) 484 | FILE DATA POSITION |
| 390 | 118 | | I FE (AD (119), AD (120)) 485 | FILE DATA POSITION |

F I G. 20

| | | | | |
|---|---|---|---|---|
| 379- | 107- | FILE DATA 487 | INFORMATION OF FILE DATA C 488 | |
| 387- | 115- | | INFORMATION OF FILE DATA H 489 | |
| 391- | 119- | | INFORMATION OF FILE DATA I 490 | |
| LLSN-271 ~LLSN-257 | | | RESERVED 463 (ALL 00H BYTES) | |
| LLSN -256 | | SECOND ANCHOR POINT 457 | ANCHOR VOLUME DESCRIPTOR POINTER 458 | |
| LLSN-255 ~LLSN-224 | | | RESERVED 464 (ALL 00H BYTES) | |
| LLSN -223 ~ LLSN -208 | | RESERVE VOLUME DESCRIPTOR SEQUENCE 467 | PARTITION DESCRIPTOR 450 PARTITION CONTENTS USE 451 UNALLOCATED SPACE TABLE 452 UNALLOCATED SPACE BITMAP 453 LOGICAL VOLUME DESCRIPTOR 454 LOGICAL VOLUME CONT.USE 455 | BACKUP OF MAIN VOLUME DESCRIPTOR SEQUENCE |
| LLSN-207 ~LLSN | | | RESERVED 465 (ALL 00H BYTES) | |

FIG. 21

| RADIAL POSITION (mm) 601 | AREA NAME 602 | ZONE NAME 603 | PHYSICAL SECTOR NUMBER 604 |
|---|---|---|---|
| 22.59~24.00 | LEAD-IN AREA 607 | EMBOSSED DATA ZONE 611 | 27AB0~2FFFF |
| 24.00 | | MIRROR ZONE 612 | |
| 24.00~24.18 | | REWRITABLE DATA ZONE 613 | 30000~30FFF |
| 24.18~25.40 | DATA AREA (REWRITABLE DATA ZONE) 608 | ZONE 00 620 | 31000~37D5F |
| 25.40~26.79 | | ZONE 01 621 | 37D60~4021F |
| 26.79~28.19 | | ZONE 02 622 | 40220~48E3F |
| 28.19~29.59 | | ZONE 03 623 | 48E40~521BF |
| 29.59~30.99 | | ZONE 04 624 | 521C0~5BC9F |
| 30.99~32.38 | | ZONE 05 625 | 5BCA0~65EDF |
| 32.38~33.78 | | ZONE 06 626 | 65EE0~7087F |
| 33.78~35.18 | | ZONE 07 627 | 70880~7B97F |
| 35.18~36.57 | | ZONE 08 628 | 7B980~871DF |
| ⋮ | | ⋮ | ⋮ |
| 43.56~44.96 | | ZONE 14 634 | C7A60~D5EFF |
| 44.96~46.35 | | ZONE 15 635 | D5F00~E4AFF |
| 46.35~47.75 | | ZONE 16 636 | E4B00~F3E5F |
| 47.75~49.15 | | ZONE 17 637 | F3E60~10391F |
| 49.15~50.55 | | ZONE 18 638 | 103920~113B3F |
| 50.55~51.94 | | ZONE 19 639 | 113B40~1244BF |
| 51.94~53.34 | | ZONE 20 640 | 1244C0~13559F |
| 53.34~54.74 | | ZONE 21 641 | 1355A0~146DDF |
| 54.74~56.13 | | ZONE 22 642 | 146DE0~158D7F |
| 56.13~57.53 | | ZONE 23 643 | 158D80~16B47F |
| 57.53~58.60 | LEAD-OUT AREA 609 | REWRITABLE DATA ZONE 645 | 16B480~17966F |

FIG. 24

| ZONE NAME | CONTENTS OF ZONE | |
|---|---|---|
| EMBOSSED DATA ZONE (603, 611) | BLANK ZONE | 651 / 652 |
| | REFERENCE SIGNAL ZONE | 653 |
| | BLANK ZONE | 654 |
| | CONTROL DATA ZONE — BOOK TYPE AND PART VERSION 671; DISC SIZE AND MINIMUM READ-OUT RATE 672; DISC STRUCTURE 673; RECORDING DENSITY 674; DATA AREA ALLOCATION 675; BCA DESCRIPTOR 676; VELOCITY (LINEAR VELOCITY CONDITION FOR DESIGNATING EXPOSURE VALUE) 677; READ POWER 678; PEAK POWER 679; BIAS POWER 680; RESERVED 681; INFORMATION PERTAINING TO MANUFACTURE OF INFORMATION STORAGE MEDIUM 682; RESERVED 683 | 655 |
| | BLANK ZONE | 656 |
| MIRROR ZONE (612) | CONNECTION ZONE | 657 |
| REWRITABLE DATA ZONE (613) | GUARD TRACK ZONE | 658 |
| | DISK TEST ZONE | 659 |
| | DRIVE TEST ZONE | 660 |
| | GUARD TRACK ZONE | 661 |
| | DISC IDENTIFICATION ZONE | 662 |
| | DMA1 & DMA2 | 663 |

FIG. 25

| ZONE NAME | CONTENTS OF ZONE |
|---|---|
| REWRITABLE DATA ZONE | DMA3 & DMA4 691<br>DISC IDENTIFICATION ZONE 692<br>GUARD TRACK ZONE 693<br>DRIVE TEST ZONE 694<br>DISK TEST ZONE 695<br>GUARD TRACK ZONE 696 |

| ZONE NUMBER 773 | SECTOR NUMBER OF GUARD AREA 771 | NUMBER | GROUP | | | SECTOR NUMBER OF GUARD AREA 772 | LOGICAL SECTOR NUMBER OF FIRST SECTOR OF EACH GROUP 774 |
|---|---|---|---|---|---|---|---|
| | | | USER AREA 723 | | SPARE AREA 724 | | |
| | | | SECTOR NUMBER | NUMBER OF SECTORS | SECTOR NUMBER | | |
| 00 | — | 00 | 31000~377DF | 26592 | 377E0~37D2F | 37D30~37D5F | 0 |
| 01 | 37D60~37D8F | 01 | 31D90~3FB2F | 32160 | 3FB30~401EF | 401F0~4021F | 26592 |
| 02 | 40220~4024F | 02 | 40250~486EF | 33952 | 486F0~48E0F | 48E10~48E3F | 58752 |
| 03 | 48E40~48E6F | 03 | 48E70~51A0F | 35744 | 51A10~5218F | 52190~521BF | 92704 |
| 04 | 521C0~521EF | 04 | 521F0~5B48F | 37536 | 5B490~5BC6F | 5BC70~5BC9F | 128448 |
| ⋮ | ⋮ | ⋮ | ⋮ | ⋮ | ⋮ | ⋮ | ⋮ |
| 20 | 1244C0~12450F | 20 | 124510~13476F | 66144 | 134770~13554F | 13550~13559F | 943552 |
| 21 | 1355A0~1355EF | 21 | 1355F0~145F4F | 67936 | 145F50~146D8F | 146D90~146DDF | 1009696 |
| 22 | 146DE0~146E2F | 22 | 146E30~157E8F | 69728 | 157E90~158D2F | 158D30~158D7F | 1077632 |
| 23 | 158D80~158DCF | 23 | 158DD0~16A57F | 71600 | 16A580~16B47F | — | 1147360 |

FIG. 29

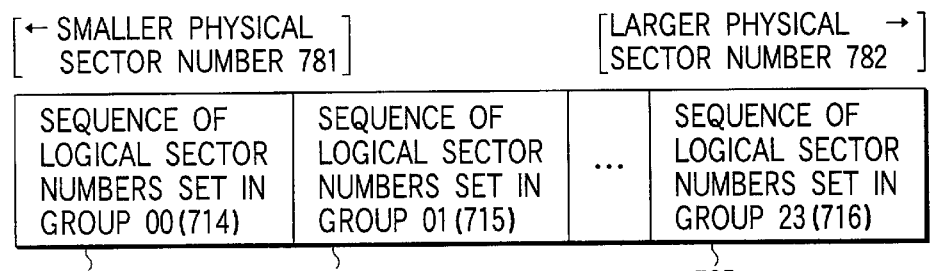

FIG. 30

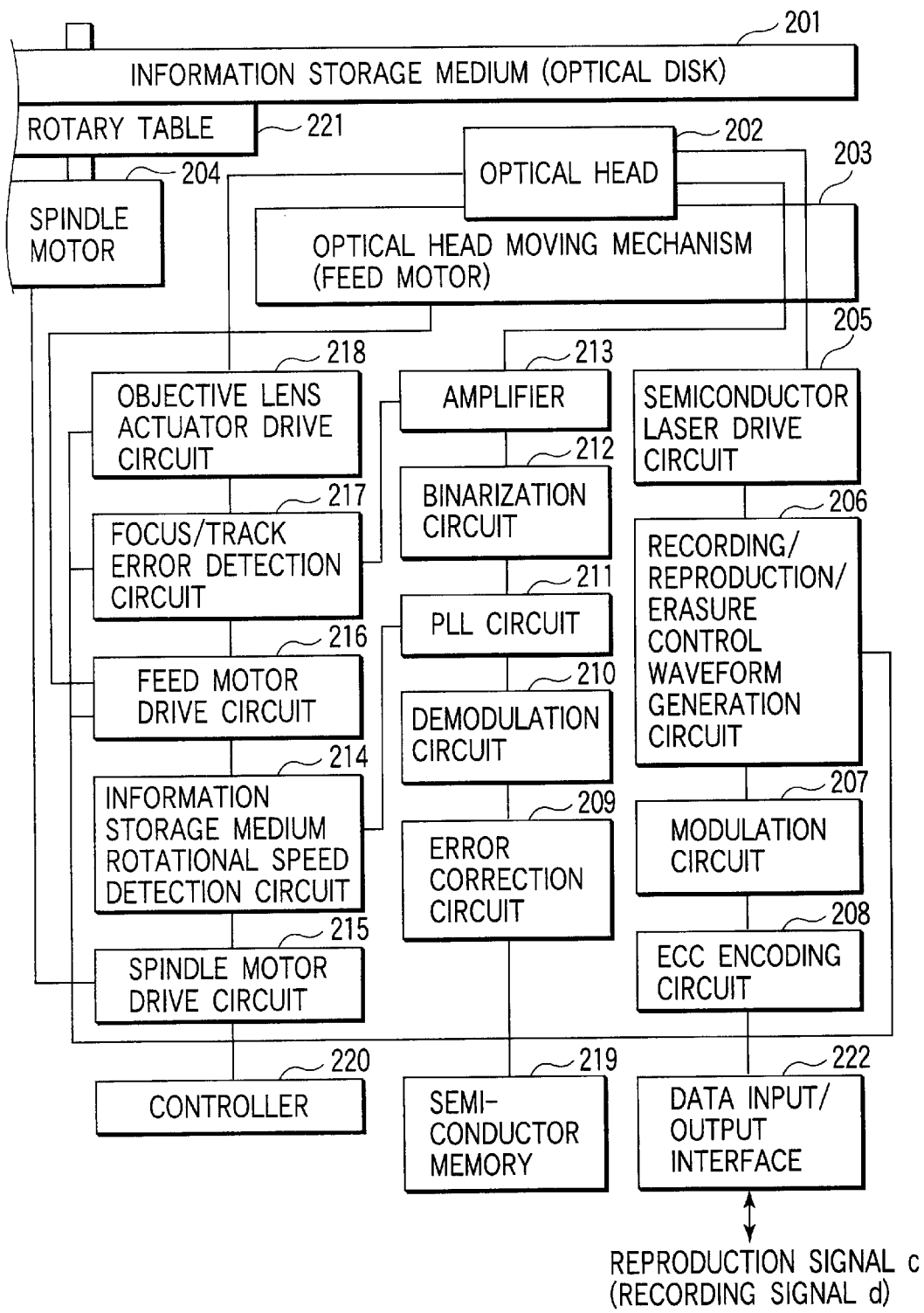
F I G. 35

INFORMATION STORAGE MEDIUM, INFORMATION RECORDING METHOD, AND INFORMATION REPRODUCTION METHOD

CROSS-REFERENCE TO RELATED APPLICATIONS

This application is based upon and claims the benefit of priority from the prior Japanese Patent Application No. 2000-121327, filed Apr. 21, 2000, the entire contents of which are incorporated herein by reference.

BACKGROUND OF THE INVENTION

The present invention relates to an information storage medium that records reproducible information and, more particularly, to an improvement in recording format of the information storage medium. The present invention also relates to an information recording method and apparatus for recording a predetermined recording format on an information storage medium. Furthermore, the present invention relates to an information reproduction method and apparatus for reproducing the predetermined recording format recorded on the information storage medium.

"Reference data" used in the circuit adjustment of an information reproduction apparatus or in the evaluation of an information storage medium that records information can be allocated in only lead-in/lead-out areas present at the innermost and outermost peripheries of a disk in a conventional DVD (Digital Versatile Disk). In addition, the reference data is allocated at only one location in, e.g., a lead-in area at the innermost periphery.

On the other hand, before an information recording/reproduction apparatus records information on an information storage medium, it makes test write on a test write area on the information storage medium while changing recording conditions (recording power, recording pulse width, and the like), and detects the state of a signal reproduced from that area so as to check recording conditions optimal to the information storage medium. The test write area is also allocated at only one location in, e.g., a lead-in area at the innermost periphery of a disk in case of a conventional DVD-RAM disk or DVD-RW disk.

When the circuit adjustment of an information reproduction apparatus or characteristic evaluation of an information storage medium is done using the reference data present at only the innermost periphery, if a master disk used to form an information storage media suffers nonuniformity of applied photoresist or a master disk exposure apparatus suffers exposure nonuniformity, the circuit constants unmatch at the middle or outer peripheral portion of the information storage medium, and the reproduction signal becomes unstable.

When optimal recording conditions in an information recording/reproduction apparatus are set using a test write area present at only the innermost periphery, if an information storage medium suffers radial recording sensitivity nonuniformity under the influence of small thickness nonuniformity of a recording film on the information storage medium, it becomes impossible to record optimal recording conditions on an outer peripheral portion of the information storage medium.

BRIEF SUMMARY OF THE INVENTION

It is an object of the present invention to provide the following information storage medium, information recording method, information recording apparatus, information reproduction method, and information reproduction apparatus that can solve the aforementioned problems:

(1) an information storage medium which records reference data to be suited to circuit constant adjustment of an information reproduction apparatus and characteristic evaluation of an information storage medium;

(2) an information recording method and apparatus for recording reference data on an information storage medium to be suited to circuit constant adjustment of an information reproduction apparatus and characteristic evaluation of an information storage medium; and (3) an information reproduction method and apparatus capable of satisfactory reproduction of user data without being influenced by reference data upon reproducing an information storage medium that records reference data to be suited to circuit constant adjustment of an information reproduction apparatus and characteristic evaluation of an information storage medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a view for explaining the storage location of a reference data recording file;

FIG. 15 is an explanatory view of the description contents of an unallocated space entry (a special registration descriptor that pertains to the position of an unrecorded extent on the information storage medium);

FIG. 16 is an explanatory view showing an excerpt of the description contents of a file entry (a descriptor that pertains to registration of information of a file attribute and file recording position);

FIG. 17 is an explanatory view showing an excerpt of the description contents of a file identifier descriptor (a descriptor that pertains to a file name and corresponding FE recording position);

FIG. 18 shows an example of a file system structure;

FIG. 19 partially shows an example of a file system recorded on the information storage medium according to the UDF (part 1);

FIG. 20 partially shows an example of a file system recorded on the information storage medium according to the UDF (part 2);

FIG. 21 partially shows an example of a file system recorded on the information storage medium according to the UDF (part 3);

FIG. 24 is a schematic explanatory view of the recording content layout in a DVD-RAM disk;

FIG. 25 is a view for explaining the data structure in a lead-in area of a DVD-RAM disk;

FIG. 29 is a view for explaining the relationship between the physical and logical sector numbers;

FIG. 30 is a view for explaining the logical sector setting method in a DVD-RAM disk;

FIG. 35 is a block diagram showing the arrangement of an information recording/reproduction unit (physical system blocks);

DETAILED DESCRIPTION OF THE INVENTION

The structure of an information storage medium of the present invention, a method for recording information on this information storage medium, and a method for reproducing information recorded on the information storage medium will be described hereinafter with reference to the accompanying drawings.

Figure 2:
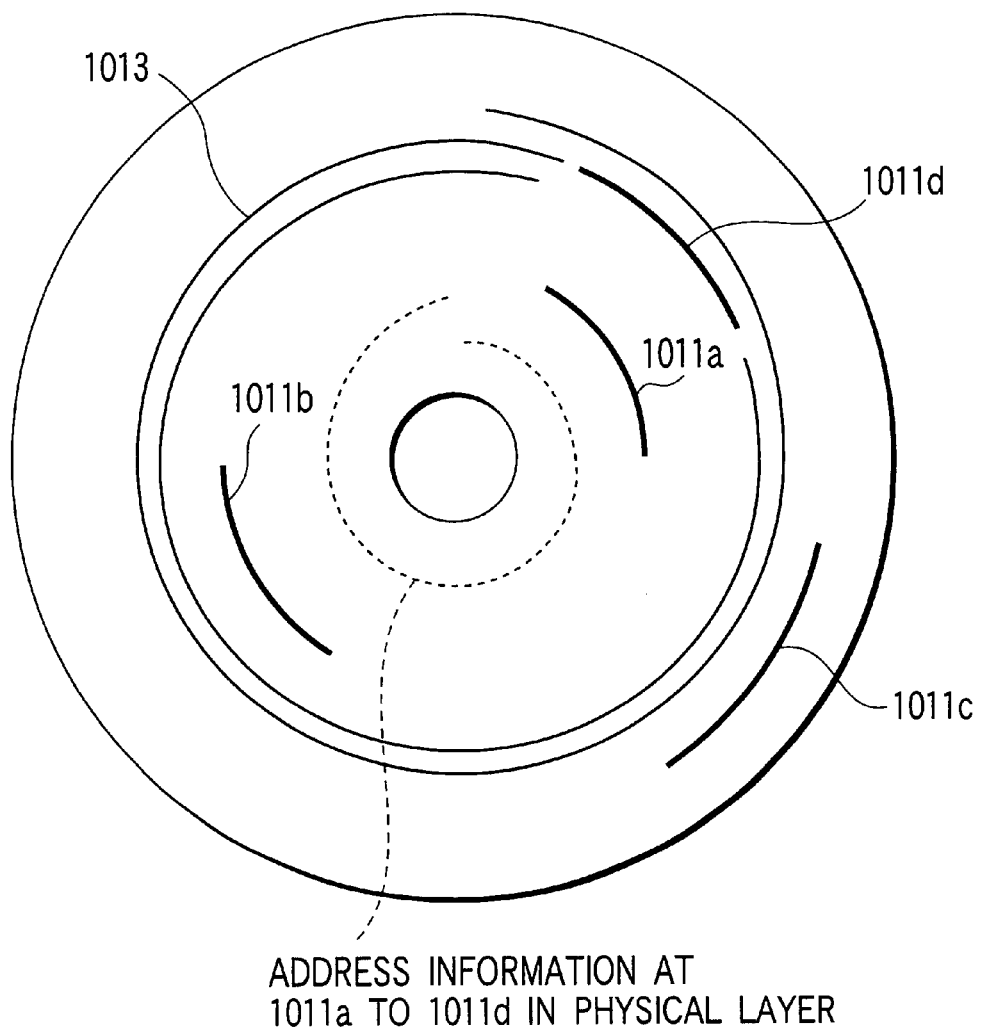
FIG. 2 is a view for explaining the storage location of the reference data recording file on an information storage medium.

Reference data used to adjust the circuit constants of an information reproduction apparatus to an appropriate value or to evaluate the characteristics of an information storage medium is recorded on an information storage medium to have a file name PRML_Check.CHC 1011 which is present under a data verify directory 1001, as shown in FIG. 1. The file PRML_Check.CHC 1011 is distributed and allocated at, e.g., positions 1011*a* to 1011*d* in FIG. 2 on an actual information storage medium. These file allocation positions on the information storage medium are described in a file allocation table when the FAT (File Allocation Table) is used as the file system, or are described in a file entry in the form of an allocation descriptor when the UDF (Universal Disk Format) is used as the file system, as will be described in detail later. Furthermore, other files are recorded on spaces between neighboring PRML_Check.CHC 1011 files. For example, a file named VR_MOVIE.VRO 1013 that records video information is recorded across the file 1011*d*, and an optical head skips the file 1011*d* upon reproducing the file VR_MOVIE.VRO 1013.

The allocation positions of the files 1011*a* to 1011*d* in a data area on the information storage medium are managed by the file system. For example, an information reproduction apparatus alone such as a DVD-ROM drive, DVD-RAM drive, or the like is unable to directly decode the information contents for the file system, and the same information as the corresponding area of the FAT or as the allocation descriptor contents in the file entry for the PRML_Check.CHC 1011 file is recorded in a control data zone 655 (see FIG. 25) or a disk test zone 659 (see FIG. 25) in a lead-in area 607 (See FIG. 24). Note that the contents of the lead-in area 607 will be described later.

A PRML technique will be explained first.

As the density of an information storage medium increases, a plurality of recording marks fall within a single focused beam spot, and the resolution drops considerably. But these marks can be separated and detected using an electrical circuit technique called partial response. The principle of partial response will be interpreted by exploiting an observation that the reproduction signal waveform from a single recording mark is similar to a focused beam spot intensity distribution, and an audacious explanation will be given based on that principle.

Figures 3A, 3B:
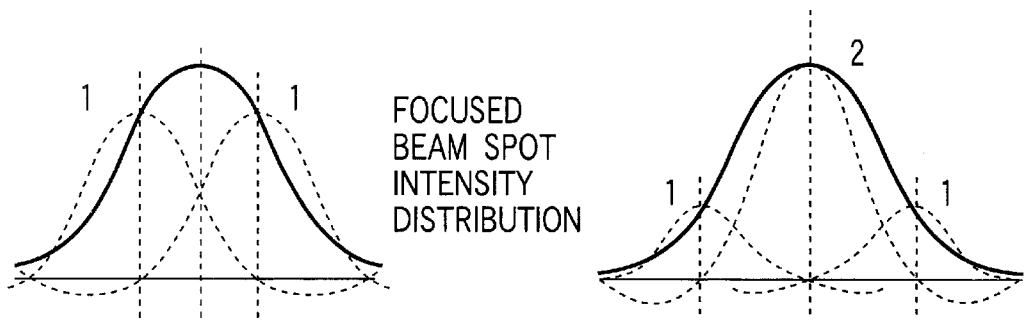
FIGS. 3A to 3E are views for explaining division of a focused beam spot.

A single focused beam spot on an optical disk is assumed to be superposition of a plurality of pseudo focused beam spots each having a small width, as shown in FIGS. 3A and 3B. At the same time, a reproduction signal with a low resolution is considered as superposition of reproduction raw signals obtained from the respective pseudo focused beam spots, and if these signals can be separated and detected by circuit processing, a signal waveform with a high resolution must be able to be obtained. There are a plurality of methods of dividing a single focused beam spot. It is convenient for the subsequent circuit processing if the pseudo spot spacing matches a minimum spacing τ (or t) of recording marks recorded on an optical disk, and the intensity distribution is set at zero at the neighboring spot central position.

Figures 3C, 3D:

If the minimum interval t of recording marks is shortened, the number of pseudo spots falling within the focused beam spot increases, and the pseudo spot size becomes small. Each pseudo spot central intensity is determined in correspondence with the original focused beam spot intensity value at its central position. The number of divided spots for specifying the pseudo spot division method, and respective pseudo spot central intensity relative values are represented in the form of PR(-). For example, since the central intensity ratio of pseudo spots divided (FIG. 3A) in correspondence with the densest recording mark layout shown in FIG. 3C is 1:1, it is expressed by PR(1, 1). On the other hand, since the central intensity ratio of pseudo spots (FIG. 3B) corresponding to the densest recording mark layout in FIG. 3D is 1:2:1, it is expressed by PR(1, 2, 1).

Figure 3E:
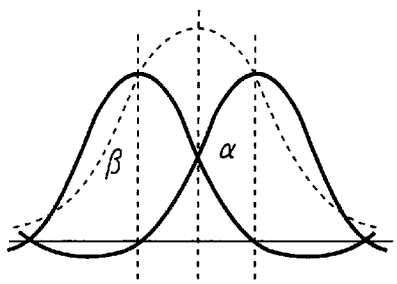
Figure 4:
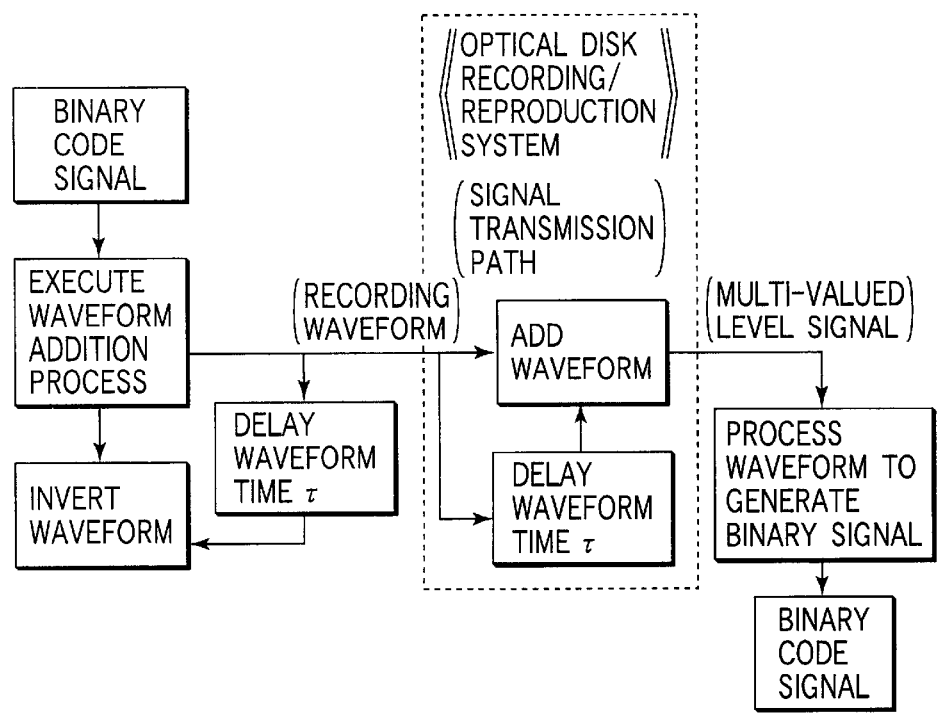
FIG. 4 is a block diagram for explaining the circuit structure of a PR(1, 1) transmission system in which waveform correction is set in a transmission network.

PR(1, 1) will be exemplified below. The leading one of two pseudo beam spots that scan on recording marks on an optical disk is named an α spot, and the trailing beam spot is named a β pseudo spot, as shown in FIG. 3E. The β spot passes a given position on an optical disk time τ (the spacing between two pseudo spots and the time corresponding to the spot moving speed use the same symbol τ) behind the α spot. Therefore, a waveform as the sum of a reproduction waveform from the α spot and a reproduction waveform obtained by shifting it by τ is a reproduction raw signal obtained from an optical head. By solving an equation using an operator method, "when a process for delaying the sum waveform by τ, vertically inverting the delayed waveform, and adding the inverted waveform to an original reproduction raw signal is repeated, a reproduction waveform obtained by the α spot alone is obtained". Circuit blocks upon executing the aforementioned process using an electrical circuit correspond to "add waveform", "delay waveform by time τ", and "invert waveform" in FIG. 4. The basic concept of partial response has been explained.

The number of pseudo focused beam spots in FIG. 3E is called a "constraint length". For example, the constraint length of PR(1, 1) is "2", and that of PR(1, 2, 1) is "3".

Figure 5:
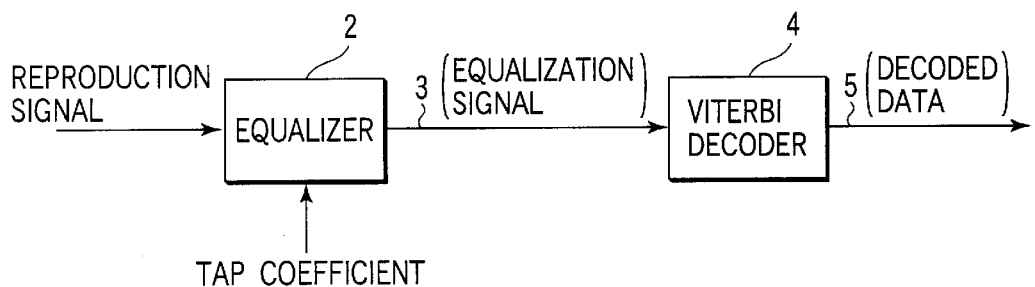
FIG. 5 is a block diagram showing PRML signal processing blocks.
Figure 6:
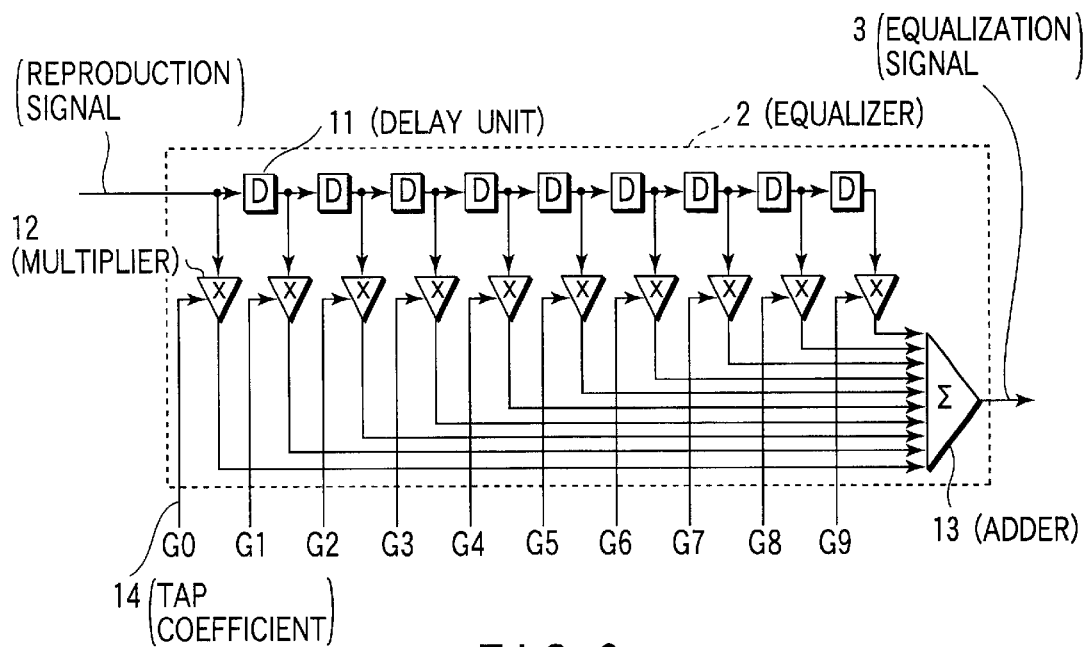
FIG. 6 is a block diagram showing a 10-tap transversal filter.

However, a signal reproduced from a recording mark or pit recorded on an information storage medium exhibits signal characteristics slightly different from a total of signals reproduced from pseudo focused beams spots shown in FIGS. 3A and 3B. A circuit for executing signal processing for an actually reproduced reproduction signal to convert it as if the signal were a total of signals reproduced from pseudo focused beam spots shown in FIGS. 3A and 3B is called an equalizer 2 shown in FIGS. 5 to 7. More specifically, a reproduction signal reproduced from an information storage medium is temporarily input to the equalizer 2 shown in FIG. 5 to obtain an equalization signal 3, and a Viterbi decoder 4 acquires decoded data 5 using that equalization signal 3. The equalizer 2 shown in FIG. 5 comprises delay units 11, multipliers 12, and an adder 13, as shown in FIG. 6.

Figure 7:
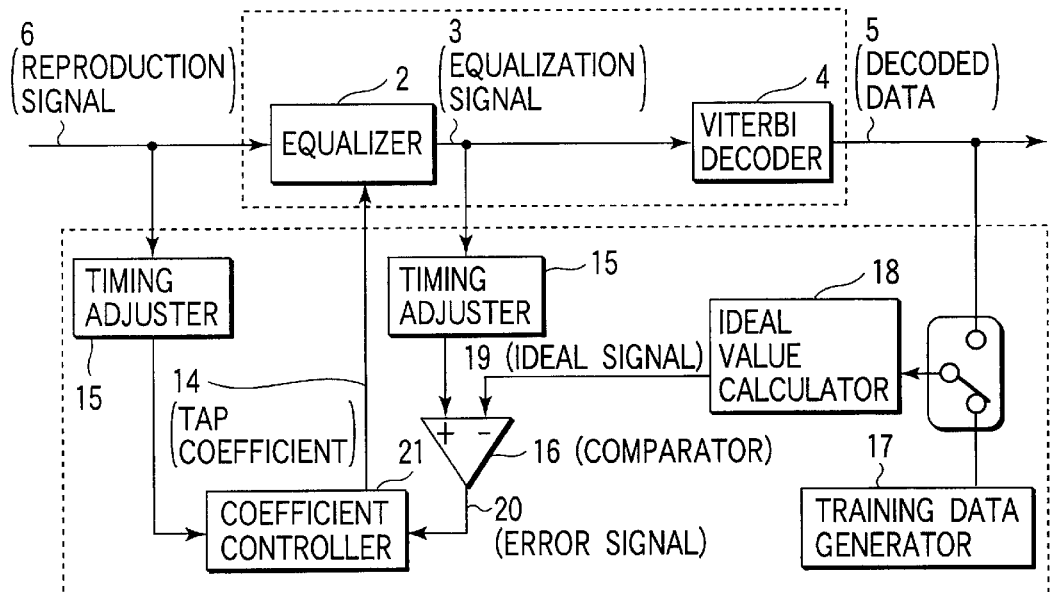
FIG. 7 is a block diagram showing an adaptive equalizer.
Figure 8:
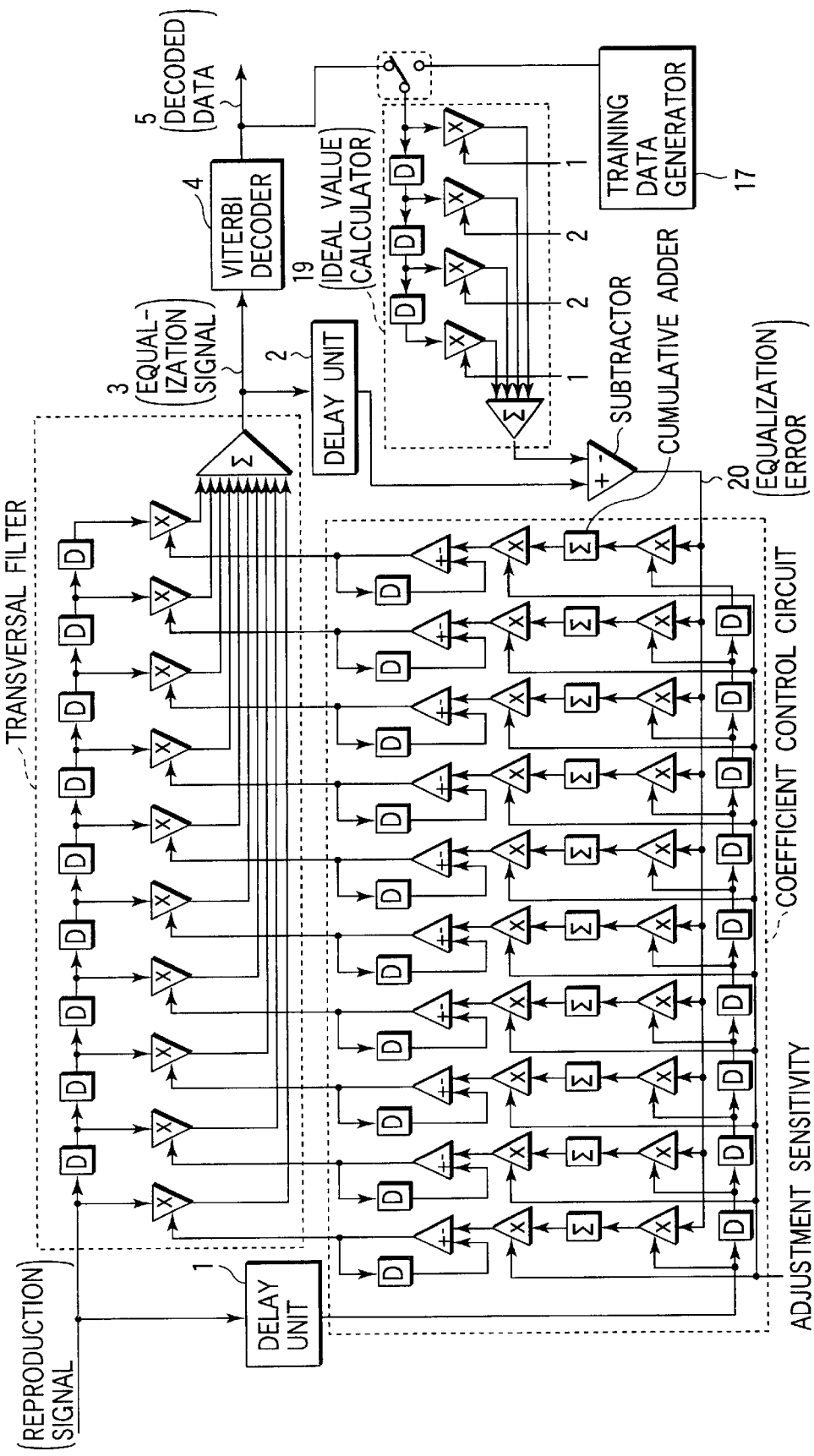
FIG. 8 is a block diagram showing the arrangement of an adaptive equalizer using an MSE method.

FIG. 7 is a block diagram of an adaptive equalizer which can automatically determine tap coefficients 14 (G0 to G9) of the equalizer 2 (setting values of tap coefficients 14 amounts to adjusting the circuit constants of an information reproduction apparatus to an appropriate value) using reference data according to the present invention, and FIG. 8 shows the detailed circuit structure in that adaptive equalizer. Before adaptive equalization, tap coefficients 14 are set at default values. In this state, a reproduction signal 6 obtained by reproducing reference data recorded on an information storage medium of the present invention is input to the equalizer 2, an equalization signal 3 obtained by the equalizer 2 is adjusted by a timing adjuster 15, and the adjusted signal is input to a comparator 16. A training data generator 17 and ideal value calculator 18 generate an ideal signal 19 to be obtained from the reference data, and the comparator 16 computes an error signal 20 upon setting the tap coefficients 14 at default values. A coefficient controller 21 feedback-controls the values of the tap coefficient 14 to be set in the equalizer 2 using the error signal 20. FIG. 8 shows a circuit when MSE (Minimum Square Error) is used as an adaptive equalization method.

Figure 9:
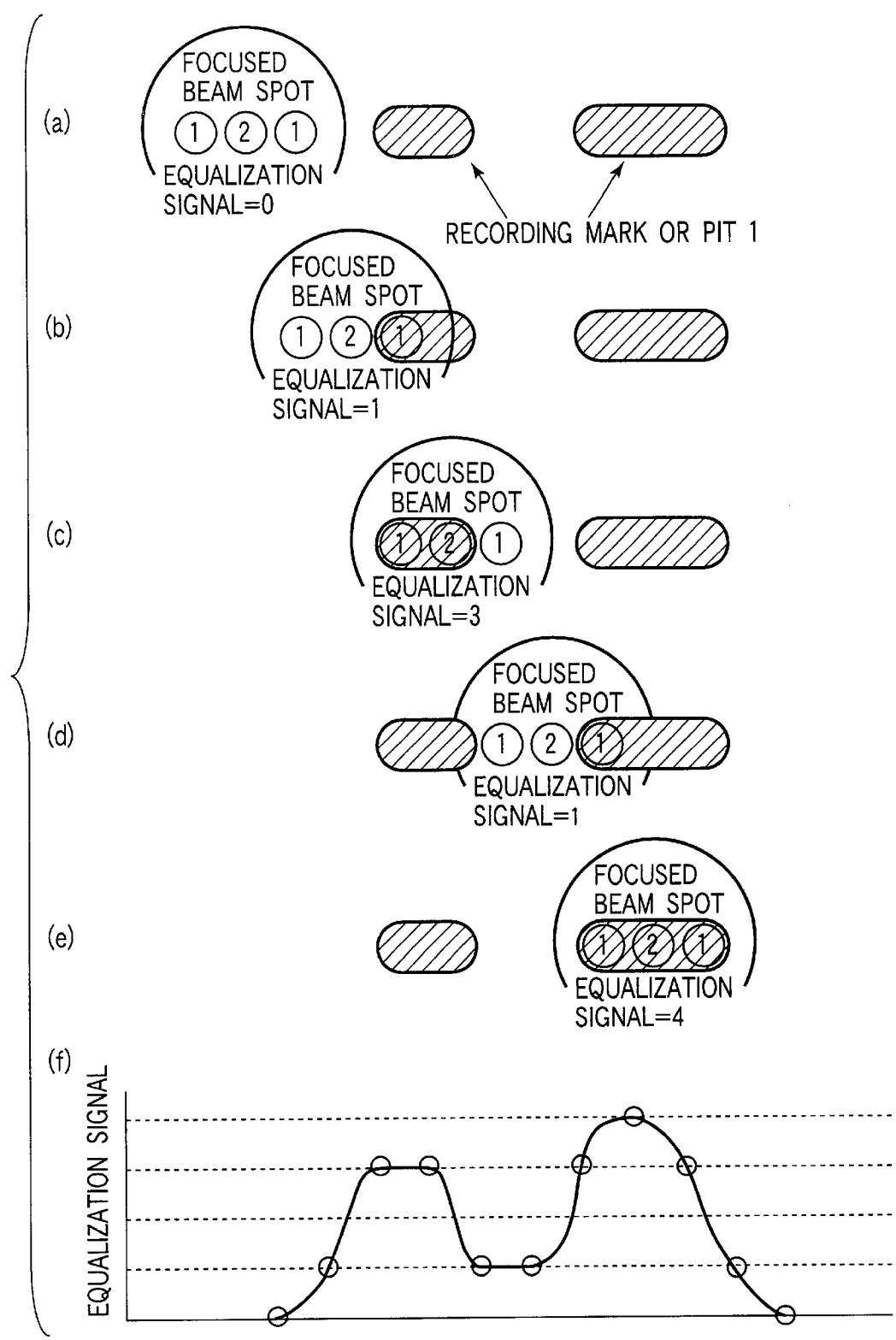
FIG. 9 explains the relationship between the mark distribution on the information storage medium and an equalization signal after an equalizer.

The reference data structure in the present invention will be explained below using FIGS. 9 to 11. Information is recorded on an information storage medium after it is scrambled and is then converted into a channel bit signal by a modulator.

Reference data to be described below using FIGS. 9 to 11 means data after being converted into the channel bit signal. When PR(1, 2, 1) is used, the data is considered as a set of pseudo focused beam spots having central intensities of 1, 2, and 1, as shown in FIG. 3B. A case will be explained below wherein the light reflectance increases at the position of a recording mark or pit 1 in FIGS. 9 to 11 (information recorded on a recordable information medium by the user will be referred to as a "recording mark", and information formed as a three-dimensional pattern in advance on a reproducible information storage medium will be referred to as a "recording pit"). When a pseudo focused beam spot of central intensity "1" alone is present on the recording mark or pit 1, as shown in (b) of FIG. 9, the value of an equalization signal 3 from an ideal equalizer 2 (the tap coefficients 14 are set at optimal values) becomes equal to the value of an ideal signal 19 in FIG. 7, i.e., level "1". When pseudo beam spots of central intensities "1" and "2" are present on the recording mark or pit 1, the value of an equalization signal 3 from an ideal equalizer 2 (the tap coefficients 14 are set at optimal values) becomes equal to the value of an ideal signal 19 in FIG. 7, i.e., level "1+2=3". As a result, an optimized equalization signal 3 having a multi-valued level shown in (f) of FIG. 9 is obtained.

Figure 10:
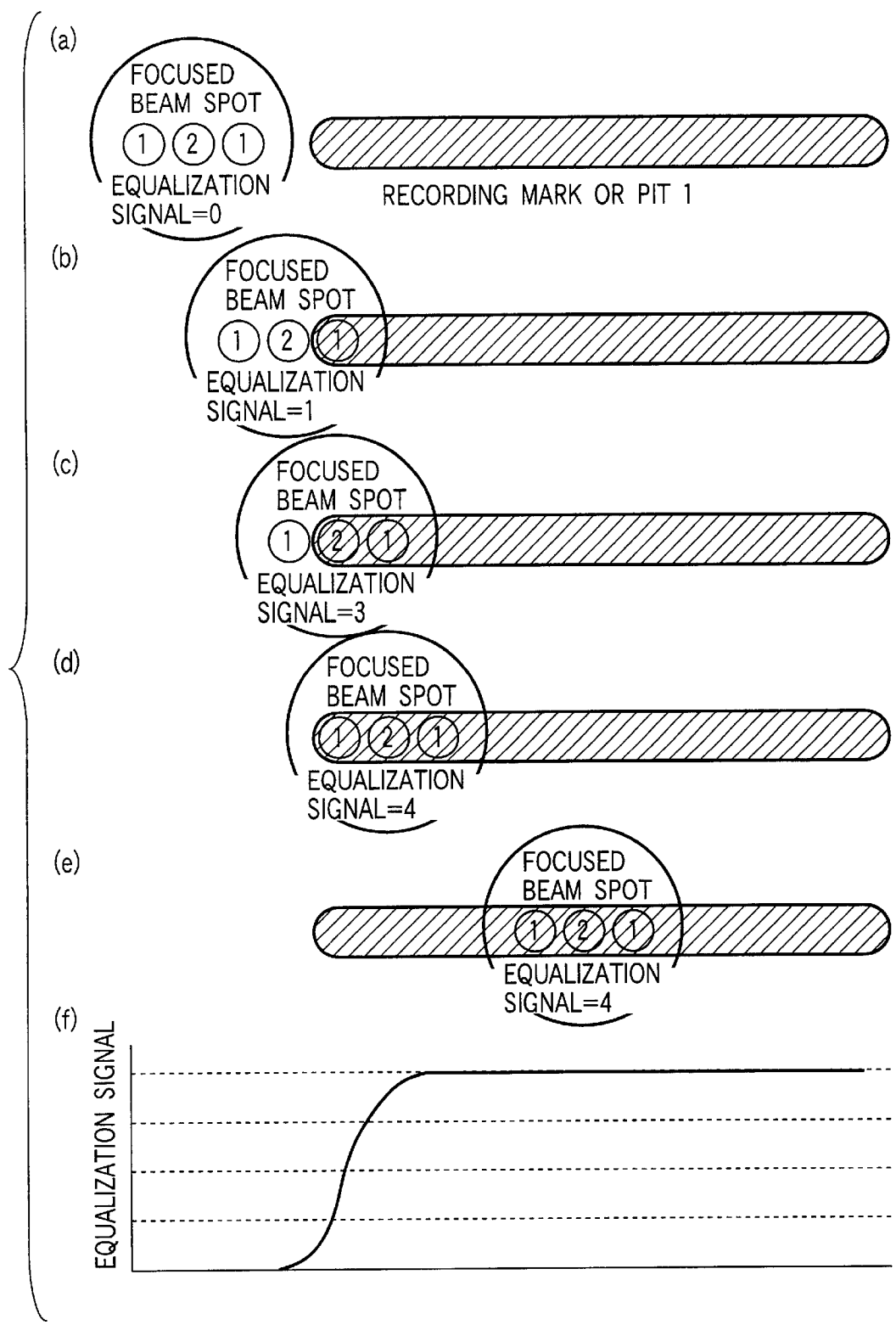
FIG. 10 explains an equalization signal after an equalizer when a sufficiently long mark is present.

A case will be explained below wherein a sufficiently long mark is present, as shown in FIG. 10. When a focused beam spot is located at a position in (a) or (e) of FIG. 10, since an equalization signal (f) becomes always constant, it becomes difficult to feedback-control tap coefficients by adaptive equalization.

Figure 11:
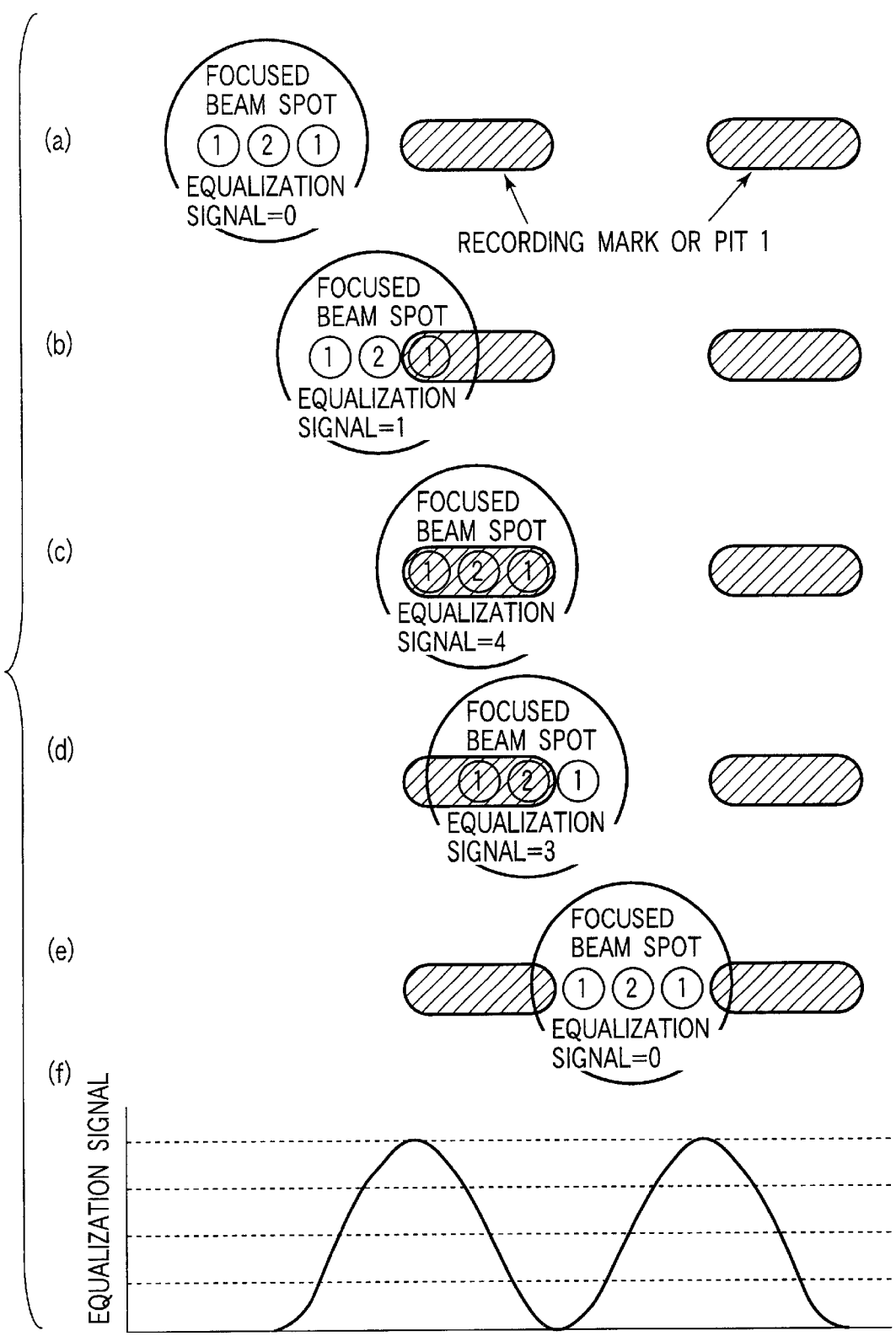
FIG. 11 explains the mark distribution on the information storage medium when the level of an equalization signal after an equalizer changes all the time.

FIG. 11 shows the distribution of recording marks or pits when the level of an equalization signal from an equalizer always changes. As can be seen from FIG. 11, when the recording mark or pit length and the spacing between recording marks or pits are smaller than the constraint length, the equalization signal level always changes. In NRZI (Non Return to Zero Inverted) in a modulation scheme, since information is provided to the end portion of a recording mark or pit, a characteristic feature of the present invention lies in that reference data is set to have the shortest distance between neighboring channel bits to be smaller than at least the constraint length. Note that a semiconductor memory 219 of an information recording/reproduction apparatus in FIG. 35 (to be described later) records information of a constraint length used to form a multi-valued level signal from a reproduction signal, and information of a channel bit unit corresponding to the constraint length.

In this way, the reference data in the present invention is set so that an ideal equalization signal undergoes frequent level changes. In the present invention, the reference data is a repetitive pattern in which channel bits are added in turn from an allowable minimum distance between neighboring channel bits, and the signal value returns to the allowable minimum value when the maximum distance is reached.

The UDF as one file system will be explained below using FIGS. 12 to 21.

<<<Description of Outline of UDF (What is UDF)>>>
<<What is UDF>>

The UDF is an abbreviation for Universal Disk Format, and mainly specifies "rules associated with a file management method" on a disk-shaped information storage medium. A CD-ROM, CD-R, CD-RW, DVD-Video, DVD-ROM, DVD-R, and DVD-RAM adopt the UDF format specified by "ISO9660".

The file management method is basically premised on a hierarchical file system which has a root directory as a parent, and manages files in a tree pattern.

The UDF format which complies with the DVD-RAM file system specifications will be mainly explained, and most of explanation contents match the contents of the DVD-ROM file system specifications.

<<Outline of UDF>>
<File Information Recording Contents on Information Storage Medium>

Upon storing information on an information storage medium, a group of information is called "file data", and recording is done in units of file data. A unique file name is appended to each file data to identify it from other file data. When groups are formed in units of a plurality of file data having common information contents, easy file management and file search are allowed. Such group of a plurality of file data is called a "directory" or "folder". A unique directory name (folder name) is appended to each directory (folder). Furthermore, a plurality of directories (folders) are collected under an upper directory (upper holder) as an upper layer group. In this case, file data and directories (folders) will be generally called files.

When information is recorded, all kinds of information which pertain to:

information contents themselves of file data
  file names corresponding to file data
  storage locations of file data (directories under which file data are recorded)

are recorded on the information storage medium.

Also, all kinds of information which pertain to:
  directory names (folder names)
  positions to which directories (folders) belong (positions of an upper directory (upper folder) as a parent) of the directories (folders) are also recorded on the information storage medium.

<Information Recording Format on Information Storage Medium>

The entire recording area on the information storage medium is broken up into logical sectors having 2048 bytes as a minimum unit, and serial logical sector numbers are assigned to all logical sectors. Information is recorded on the information storage medium in units of logical sectors. The recording positions on the information storage medium are managed using the logical sector numbers of logical sectors where the information is recorded.

As shown in FIGS. 19 to 21, logical sectors that record information of a file structure 486 and file data 487 are especially called "logical blocks", and logical block numbers (LBN) are set in correspondence with the logical sector numbers (LSN). (The length of each logical block is 2048 bytes as in the logical sector.) LLSN in FIG. 21 indicates the last logical sector number (last LSN).

<Example of Simplified Hierarchical File System>

Figure 12:
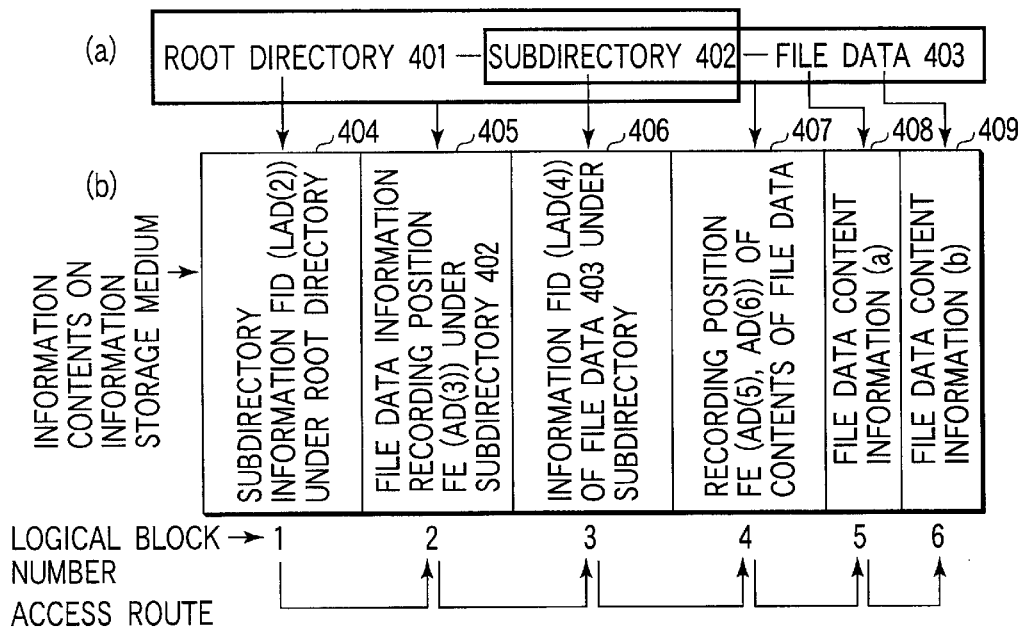
FIG. 12 is an explanatory view showing a concept of the basic relationship between the hierarchical file system structure and information contents recorded on the information storage medium.

(a) of FIG. 12 shows an example of a simplified hierarchical file system. In a DVD-RAM, the logical block (logical sector) size is 2048 bytes. A cluster of successive logical blocks (logical sectors) is called an "extent". One extent is formed by one logical block (logical sector) or a series of successive logical blocks (logical sectors). In order to access file data recorded on the information storage medium, access to an address (AD(*), LAD(*)) indicated by given information is repeated while sequentially reading the information, as indicated by an access route in FIG. 12.

The file management systems of most OSs such as UNIX, MacOS, MS-DOS, Windows, and the like have a tree-like hierarchical structure shown in (a) of FIG. 12.

One root directory 401 which serves as a parent of all directories is present in one disk drive (each partition if one HDD is partitioned into a plurality of partitions), and a subdirectory 402 is attached under the root directory. File data 403 is present in the subdirectory 402.

In practice, the hierarchical structure is more complex unlike this example. For example, file data 403 may be present immediately under the root directory 401 or a plurality of subdirectories may be connected in series.

<Recording Contents of File Management Information on Information Storage Medium>

File management information is recorded in units of logical blocks mentioned above. Contents recorded in respective logical blocks are as follows.

Descriptor FID (File Identifier Descriptor) that indicates information of files

The FID describes the types of files and file names (root directory name, subdirectory names, file data names, and the like).

The FID also describes the recording position of a descriptor which indicates the data contents of the subsequent file data, or the recording location of the contents of a directory (i.e., FE (to be described below) corresponding to a given file).

Descriptor FE (File Entry) which indicates the recording position of file contents The FE describes the position (logical block number) on the information storage medium where information which pertains to the data contents of file data and contents of a directory (subdirectory and the like) is recorded, and the like.

FIG. 17 shows an excerpt of the description contents of the file identifier descriptor. Details of the file identifier descriptor will be explained later in the paragraph of <<File Identifier Descriptor>>. FIG. 16 shows an excerpt of the description contents of the file entry, which will be described in detail later in the paragraph of <<File Entry>>.

Figure 13:
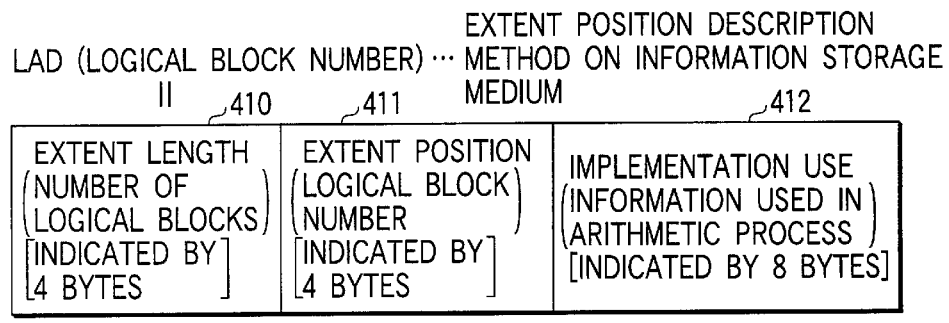
FIG. 13 is an explanatory view of the description contents of a long allocation descriptor (a large-size descriptor indicating the extent position)
Figure 14:
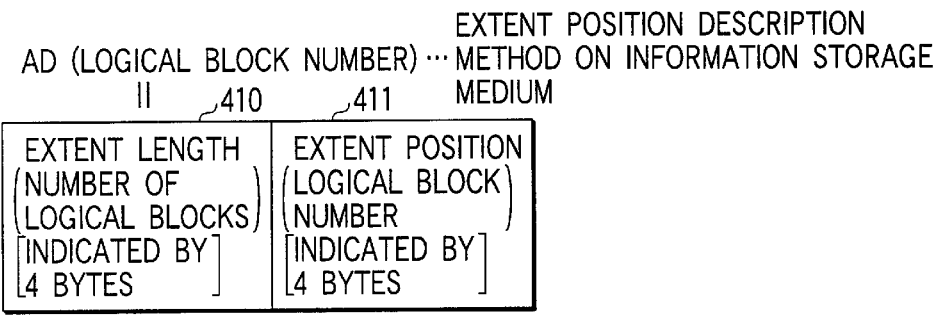
FIG. 14 is an explanatory view of the description contents of a short allocation descriptor (a small-size descriptor indicating the extent position)

A descriptor which indicates the recording position on the information storage medium uses a long allocation descriptor shown in FIG. 13 and short allocation descriptor shown in FIG. 14. These descriptors will be described in detail later in the paragraphs of <Long Allocation Descriptor> and <Short Allocation Descriptor>.

(b) of FIG. 12 shows an example of the recording contents when information of the file system structure shown in (a) of FIG. 12 is recorded on the information storage medium. The recording contents in (b) of FIG. 12 are as follows.

The contents of the root directory 401 are recorded in a logical block with logical block number "1".

In the example in (a) of FIG. 12, since only the subdirectory 402 is present in the root directory 401, information of the subdirectory 402 as the contents of the root directory 401 is described by a file identifier descriptor 404. Also, information of the root directory 401 itself (not shown) is described by a file identifier descriptor in that logical block.

The file identifier descriptor 404 of this subdirectory 402 describes the recording position (second logical block in the example in (b) of FIG. 12) of a file entry 405 which indicates the recording position of the contents of the subdirectory 402 (LAD(2)).

A logical block of logical block number "2" describes the file entry 405 which indicates the recording position of the contents of the subdirectory 402.

In the example in (a) of FIG. 12, since only file data 403 is present in the subdirectory 402, the contents of the subdirectory 402 indicate the recording position of a file identifier descriptor 406 which describes information of the file data 403 in practice.

A short allocation descriptor in the file entry describes that the contents of the subdirectory 402 are recorded in the third logical block (AD(3)).

A logical block of logical block number "3" records the contents of the subdirectory 402.

In the example in (a) of FIG. 12, since only file data 403 is present in the subdirectory 402, the file identifier descriptor 406 describes information of the file data 403 as the contents of the subdirectory 402. That logical block also describes information of the subdirectory 402 itself using a file identifier descriptor.

The file identifier descriptor 406 of the file data 403 describes the recording position (in the fourth logical block in the example in (b) of FIG. 12) of a file entry 407 which indicates the recording position of the contents of the file data 403 using a long allocation descriptor (LAD(4)).

A logical block of logical block number "4" records the file entry 407 which indicates the recording positions of contents 408 and 409 of the file data 403.

A short allocation description in the file entry 407 describes that the contents 408 and 409 of the file data 403 are recorded in the fifth and sixth logical blocks (AD(5), AD(6)).

A logical block of logical block number "5" records content information (a) 408 of the file data 403.

A logical block of logical block number "6" records content information (b) 408 of the file data 403.

<Access Method to File Data According to Information in (b) of FIG. 12>

As has been briefly explained in the paragraph of "<Recording Contents of File System Information on Information Storage Medium>", the file identifier descriptors 404 and 406 and file entries 405 and 407 describe the logical block numbers of logical blocks that describe information which follows. In the same manner as that when file data is reached via the subdirectory while going downstairs from the root directory, the data contents of file data are accessed while reproducing information of logical blocks on the information storage medium in turn in accordance with the logical block numbers described in the file identifier descriptor and file entry.

That is, in order to access the file data 403 using information shown in (b) of FIG. 12, the first logical block information is read. Since the file data 403 is present in the subdirectory 402, the first logical block information is searched for the file identifier descriptor 404 of the subdirectory 402 so as to read LAD(2), and the second logical block information is read in accordance with LAD(2). Since the second logical block describes only one file entry, AD(3) in that entry is read to access the third logical block. The third logical block is searched for the file identifier descriptor 406 which contains a description associated with the file data 403, so as to read LAD(4). When the fourth logical block is accessed in accordance with LAD(4), since that block describes only one file entry 407, AD(5) and AD(6) are read to find the logical block numbers (fifth and sixth) which record the contents of the file data 403.

The contents of AD(*) and LAD(*) will be described in detail later in the paragraph of "<Descriptors of UDF>".

<<Feature of UDF>>
<Description of Feature of UDF>

The features of the UDF will be explained below in comparison with the FAT used in an HDD, FDD, MO, and the like.

1) The UDF has a large minimum unit (of a minimum logical block size, minimum logical sector size, and the like), and is suitable for recording video information and music information having a large information size to be recorded.

The logical sector (block) size of the UDF is as large as 2048 bytes while that of the FAT is 512 bytes.

2) The UDF can distribute and record file management information at arbitrary position on a disk, while the FAT locally and records on the information storage medium a file allocation table of files to the information storage medium together.

In the UDF, the recording positions of file management information and file data on a disk are described in allocation descriptors using logical sector (block) numbers.

The FAT is suitable for purposes that frequently require changes in file structure [mainly frequent rewrite purpose] since such recording positions are managed together by the file allocation table. (Management information can be easily rewritten since it is recorded in a given area.) Since the recording position of the file allocation table is determined in advance, a recording medium must have high reliability (suffers less defective areas).

The UDF is suitable for a purpose of adding new file structures to lower layers (mainly to directories under the root directory) later [mainly write-once, read-many purpose]. (upon additional recording, the previous file management information is not changed largely.) Since the recording positions of the distributed file management information can be arbitrarily designated, recording can be done while avoiding natural defects.

Since the file management information can be recorded at an arbitrary position, and all pieces of file management information can be recorded together to obtain the merit of the FAT, the UDF is a file system having higher versatility.

<<<Description of Detailed Contents of Descriptors of UDF>>>
<<Descriptors of Logical Block Numbers>>
<Allocation Descriptor>

As described in the paragraph of "<Recording Contents of File System Information on Information Storage Medium>", a descriptor which is contained in the file identifier descriptor, file entry, or the like and describes the position (logical block number) of information that follows it is called an allocation descriptor. The allocation descriptor includes long and short allocation descriptors described below.

<Long Allocation Descriptor>

As shown in FIG. 13, the long allocation descriptor is comprised of:

extent length 410 . . . indicates the number of logical blocks by 4 bytes;

extent position 411 . . . indicates the corresponding logical block number by 4 bytes;

implementation use 412 . . . information used in an arithmetic process indicated by 8 bytes; and the like.

In the following description, the long allocation descriptor will be abbreviated as "LAD(logical block number)".

<Short Allocation Descriptor>

As shown in FIG. 14, the short allocation descriptor is comprised of only:

extent length 410 . . . indicates the number of logical blocks by 4 bytes; and extent position 411 . . . indicates the corresponding logical block number by 4 bytes.

In the following description, the short allocation descriptor will be abbreviated as "AD(logical block number)".

<<Unallocated Space Entry>>

As shown in FIG. 15, this entry describes the "unrecorded extent distribution" on the information storage medium using a short allocation descriptor sequence in units of extents, and is used as a space table (see FIGS. 19 to 21). For example, the unallocated space entry describes the following contents.

Descriptor tag 413 . . . indicates an identifier of the description contents ("263" in this case).

ICB tag 414 . . . indicates the file type.

File type=1 in the ICB tag means an unallocated space entry; file type=4 a directory; and file type=5 file data.

Total length 415 of an allocation descriptor sequence . . . This length indicates the total number of bytes by 4 bytes.

<<File Entry>>

This entry is a descriptor that has been explained in "<Recording Contents of File System Information on Information Storage Medium>", and describes the following contents, as shown in FIG. 16.

Descriptor tag 417 . . . indicates an identifier of the description contents ("261" in this case).

ICB tag 418 . . . indicates the file type→contents are the same as those of the ICG tag 414 mentioned above.

Permissions 419 . . . indicate user-dependent recording/reproduction/deletion permission information. This information is mainly used for the purpose of assuring file security.

Allocation descriptors 420 . . . describe the recording positions of contents of the corresponding file using a short allocation descriptor sequence in units of extents.

<<File Identifier Descriptor>>

This descriptor describes file information, as has been explained in "<Recording Contents of File System Information on Information Storage Medium>", and describes the following contents, as shown in FIG. 17.

Descriptor tag 421 . . . indicates an identifier of the description contents ("257" in this case).

File characteristics 422 . . . indicate the file type, and means one of a parent directory, directory, file data, and file delete flag.

Information control block 423 . . . an FE position corresponding to this file is described using a long allocation descriptor.

File identifier 424 . . . a directory or file name.

Padding 437 . . . a dummy area appended to adjust the total length of the file identifier descriptor, and all "0"s are recorded normally.

<<<Example of Description of File Structure Recorded on Information Storage Medium According to UDF>>>

The contents described in <<Outline of UDF>> will be explained in detail below using examples.

FIG. 18 shows an example of a general file system structure compared to (a) of FIG. 12. Data in parentheses indicate information of the contents of a directory or the logical block number on the information storage medium where the data contents of file data are recorded.

FIGS. 19 to 21 show an example wherein information of the file system structure shown in FIG. 18 is recorded on the information storage medium in accordance with the UDF format.

An unrecorded position management method on the information storage medium includes:

Space bitmap method

"Recorded" or "unrecorded" flags are set as a bitmap in all logical blocks of the recording area in the information storage medium using a space bitmap descriptor 470.

Space table method

All unrecorded logical block numbers are described as a sequence of short allocation descriptors using the description method of the unallocated space entry 471.

In this embodiment, FIGS. 19 to 21 describe both the methods for the descriptive convenience, but these methods are rarely used (recorded on an information storage medium) together in practice, and either method is used.

An outline of the contents of principal descriptors described in FIGS. 19 to 21 is as follows.

Beginning extended area descriptor 445 . . . indicates the start position of a volume recognition sequence.

Volume structure descriptor 446 . . . describes the comment of contents of a volume.

Boot descriptor 447 . . . describes the processing contents upon boot.

Terminating extended area descriptor 448 . . . indicates the end position of a volume recognition sequence.

Partition descriptor 450 . . . indicates partition information (size and the like). In a DVD-RAM, one partition per volume is used in principle.

Logical volume descriptor 454 . . . describes the contents of a logical volume.

Anchor volume descriptor pointer 458 . . . indicates the recording positions of a main volume descriptor sequence 449 and reserve volume descriptor sequence 467 in the information storage medium recording area.

Reserved (all 00h bytes) 459 to 465 . . . provide adjustment areas recorded with all "0"s to assure logical sector numbers for recording specific descriptors.

Reserve volume descriptor sequence 467 . . . a backup area of information recorded in the main volume descriptor sequence 449.

<<<Access Method to Data File Upon Reproduction>>>

An access processing method on the information storage medium for reproducing the data contents of, e.g., file data H 432 using the file system information shown in FIGS. 19 to 21 will be explained below.

1) Information in the boot descriptor 447 in the volume recognition sequence 444 as a boot area upon starting up an information recording/reproduction apparatus or upon loading an information storage medium is reproduced. Processing upon boot starts in accordance with the description contents of the boot descriptor 447.

2) If no specific boot processing is available, information of the logical volume descriptor 454 in the main volume descriptor sequence 449 is reproduced first.

3) The logical volume descriptor 454 describes logical volume contents use 455, which describes the logical block number indicating the recording position of a file set descriptor 472 in the long allocation descriptor (FIG. 13) format. (In the example in FIGS. 19 to 21, that descriptor is recorded in the 100th logical block from LAD(100).)

4) The 100th logical block (logical sector number =372) is accessed to reproduce the file set descriptor 472. Root directory ICB 473 in that descriptor describes the recording location (logical block number) of a file entry which pertains to a root directory A 425 in the long allocation descriptor (FIG. 13) format (in the example in FIGS. 19 to 21, that entry is recorded in the 102nd logical block from LAD (102)).

5) The 102nd logical block is accessed according to LAD(102) in the root directory ICB 473 to reproduce a file entry 475 that pertains to the root directory A 425, thus reading the recording position (logical block number) of information of the contents of the root directory A 425 (AD(103)).

6) The 103rd logical block is accessed to reproduce information of the contents of the root directory A 425. Since the File data H 432 is present under a subdirectory of a directory D 428, a file identifier descriptor that pertains to the directory D 428 is searched for to read a logical block number (LAD(110) although not shown in FIGS. 19 to 21) that indicates the recording position of a file entry which pertains to the directory D 428.

7) The 110th logical block is accessed to reproduce a file entry 480 which pertains to the directory D 428, thus reading the recording position (logical block number) of information of the contents of the directory D 428 (AD(111)).

8) The 111th logical block is accessed to reproduce information of the contents of the directory D 428. Since the file data H 432 is present immediately under a subdirectory F 430, a file identifier descriptor that pertains to the subdirectory F 430 is searched for to read a logical block number (LAD(112) although not shown in FIGS. 19 to 21) that indicates the recording position of a file entry which pertains to the subdirectory F 430.

9) The 112th logical block is accessed to reproduce a file entry 482 that pertains to the subdirectory F 430, thus reading the recording position (logical block number) of information of the contents of the subdirectory F 430 (AD(113)).

10) The 113th logical block is accessed to reproduce information of the contents of the subdirectory F 430, thus searching for a file identifier description which pertains to the file data H 432. A logical block number (LAD(114) although not shown in FIGS. 19 to 21) that indicates the recording position of a file entry which pertains to the file data H 432 is read from the file identifier descriptor.

11) The 114th logical block is accessed to reproduce a file entry 484 which pertains to the file data H 432, thus reading the recording position of data contents 489 of the file data H 432.

12) Information is reproduced from the information storage medium in the order of logical block numbers described in the file entry 484 which pertains to the file data H 432, thus reading the data contents 489 of the file data H 432.

<<<Specific File Data Content Change Method>>>

The processing method includes access upon changing the data contents of, e.g., the file data H 432 using the file system information shown in FIGS. 19 to 21 will be explained below.

1) The size difference of the data contents before and after the file data H 432 is changed is obtained, and that value is divided by 2048 bytes to compute in advance the number of logical blocks to be added or deleted to record the changed data.

2) Information in the boot descriptor 447 in the volume recognition sequence 444 as a boot area upon starting up an information recording/reproduction apparatus or upon loading an information storage medium is reproduced. Processing upon boot starts in accordance with the description contents of the boot descriptor 447.

3) If no specific boot processing is available, the partition descriptor 450 in the main volume descriptor sequence 449 is reproduced first to read information of partition contents use 451 described in that descriptor. This partition contents use 451 (also called a partition header descriptor) indicates the recording position of a space table or space bitmap. The space table position is described in the short allocation descriptor format in the column of the unallocated space table 452 (AD(50) in the example of FIGS. 19 to 21). The space bitmap position is described in the short allocation descriptor format in the column of an unallocated space bitmap 453 (AD(0) in the example of FIGS. 19 to 21).

4) The logical block number (0) which is read in 3) and describes the space bitmap is accessed. Space bitmap information is read from the space bitmap descriptor 470 to search for unrecorded logical blocks and to register use of logical blocks corresponding in number to the computation result in 1) (a rewrite process of information of the space bitmap descriptor 470).

4') Alternatively, the logical block number (50) which is read in 3) and describes the space table is accessed. USE (AD(*), AD(*), . . . , AD(*)) 471 of the space table is searched for unrecorded logical blocks, and use of logical blocks corresponding in number to the computation result in 1) is registered (a rewrite process of space table information).

In an actual process, one of "4)" and "4')" is done.

5) Information of the logical volume descriptor 454 in the main volume descriptor sequence 449 is reproduced.

6) The logical volume descriptor 454 describes logical volume contents use 455, which describes the logical block number indicating the recording position of the file set descriptor 472 in the long allocation descriptor (FIG. 13) format. (In the example in FIGS. 19 to 21, that descriptor is recorded in the 100th logical block from LAD(100).)

7) The 100th logical block (logical sector number=400) is accessed to reproduce the file set descriptor 472. Root directory ICB 473 in that descriptor describes the recording location (logical block number) of a file entry which pertains to a root directory A 425 in the long allocation descriptor (FIG. 13) format (in the example in FIGS. 19 to 21, that entry is recorded in the 102nd logical block from LAD (102)).

8) The 102nd logical block is accessed according to LAD(102) in the root directory ICB 473 to reproduce the file entry 475 that pertains to the root directory A 425, thus reading the recording position (logical block number) of information of the contents of the root directory A 425 (AD(103)).

9) The 103rd logical block is accessed to reproduce information of the contents of the root directory A 425. Since the file data H 432 is present under a subdirectory of the directory D 428, a file identifier descriptor that pertains to the directory D 428 is searched for to read a logical block number (LAD(110) although not shown in FIGS. 19 to 21) that indicates the recording position of a file entry which pertains to the directory D 428.

10) The 110th logical block is accessed to reproduce the file entry 480 which pertains to the directory D 428, thus reading the recording position (logical block number) of information of the contents of the directory D 428 (AD (111)).

11) The 111th logical block is accessed to reproduce information of the contents of the directory D 428. Since the file data H 432 is present immediately under the subdirectory F 430, a file identifier descriptor that pertains to the subdirectory F 430 is searched for to read a logical block number (LAD(112) although not shown in FIGS. 19 to 21) that indicates the recording position of a file entry which pertains to the subdirectory F 430.

12) The 112th logical block is accessed to reproduce the file entry 482 that pertains to the subdirectory F 430, thus reading the recording position (logical block number) of information of the contents of the subdirectory F 430 (AD(113)).

13) The 113th logical block is accessed to reproduce information of the contents of the subdirectory F 430, thus searching for a file identifier description which pertains to the file data H 432. A logical block number (LAD(114) although not shown in FIGS. 19 to 21) that indicates the recording position of a file entry which pertains to the file data H 432 is read from the file identifier descriptor.

14) The 114th logical block is accessed to reproduce the file entry 484 which pertains to the file data H 432, thus reading the recording position of the data contents 489 of the file data H 432.

15) Data contents 489 of changed file data H 432 are recorded in consideration of the logical block numbers additionally registered in 4) or 4').

<<<Specific File Data/Directory Delete Processing Method>>>

A method of deleting the file data H 432 or subdirectory F 430 will be exemplified below.

1) Information in the boot descriptor 447 in the volume recognition sequence 444 as a boot area upon starting up an information recording/reproduction apparatus or upon loading an information storage medium is reproduced. Processing upon boot starts in accordance with the description contents of the boot descriptor 447.

2) If no specific boot processing is available, information of the logical volume descriptor 454 in the main volume descriptor sequence 449 is reproduced first.

3) The logical volume descriptor 454 describes logical volume contents use 455, which describes the logical block number indicating the recording position of a file set descriptor 472 in the long allocation descriptor (FIG. 13) format. (In the example in FIGS. 19 to 21, that descriptor is recorded in the 100th logical block from LAD(100).)

4) The 100th logical block (logical sector number=400) is accessed to reproduce the file set descriptor 472. Root directory ICB 473 in that descriptor describes the recording location (logical block number) of a file entry which pertains to the root directory A 425 in the long allocation descriptor (FIG. 13) format (in the example in FIGS. 19 to 21, that entry is recorded in the 102nd logical block from LAD (102)).

5) The 102nd logical block is accessed according to LAD(102) in the root directory ICB 473 to reproduce the file entry 475 that pertains to the root directory A 425, thus reading the recording position (logical block number) of information of the contents of the root directory A 425 (AD(103)).

6) The 103rd logical block is accessed to reproduce information of the contents of the root directory A 425. Since the File data H 432 is present under a subdirectory of the directory D 428, a file identifier descriptor that pertains to the directory D 428 is searched for to read a logical block number (LAD(110) although not shown in FIGS. 19 to 21) that records a file entry which pertains to the directory D 428.

7) The 110th logical block is accessed to reproduce the file entry 480 which pertains to the directory D 428, thus reading the recording position (logical block number) of information of the contents of the directory D 428 (AD(111)).

8) The 111th logical block is accessed to reproduce information of the contents of the directory D 428. Since the file data H 432 is present immediately under the subdirectory F 430, a file identifier descriptor that pertains to the subdirectory F 430 is searched for.

When the subdirectory F 430 is deleted, a "file delete flag" is set in file characteristics 422 (FIG. 17) in the file identifier descriptor that pertains to the subdirectory F 430. A logical block number (LAD(112) although not shown in FIGS. 19 to 21) that indicates the recording position of a file entry which pertains to the subdirectory F 430 is read.

9) The 112th logical block is accessed to reproduce the file entry 482 that pertains to the subdirectory F 430, thus reading the recording position (logical block number) of information of the contents of the subdirectory F 430 (AD(113)).

10) The 113th logical block is accessed to reproduce information of the contents of the subdirectory F 430, thus searching for a file identifier description which pertains to the file data H 432.

When the file data H 432 is deleted, a "file delete flag" is set in file characteristics 422 (FIG. 17) in the file identifier descriptor that pertains to the file data H 432. From that descriptor, a logical block number (LAD(114) although not shown in FIGS. 19 to 21) that indicates the recording position of a file entry which pertains to the file data H 432 is read.

11) The 114th logical block is accessed to reproduce the file entry 484 which pertains to the file data H 432, thus reading the recording position of data contents 489 of the file data H 432.

When the file data H 432 is deleted, logical blocks that record the data contents 489 of the file data H 432 are released (to register those logical blocks in an unrecorded state) by the following method.

12) The partition descriptor 450 in the main volume descriptor sequence 449 is reproduced to read information of partition contents use 451 described in that descriptor. This partition contents use 451 (also called a partition header descriptor) indicates the recording position of a space table or space bitmap.

The space table position is described in the short allocation descriptor format in the column of the unallocated space table 452 (AD(50) in the example of FIGS. 19 to 21). The space bitmap position is described in the short allocation descriptor format in the column of an unallocated space bitmap 453 (AD(0) in the example of FIGS. 19 to 21).

13) The logical block number (0) which is read in 12) and describes the space bitmap is accessed to rewrite "logical block numbers to be released" obtained as a result of 11) by the space bitmap descriptor 470.

13') Alternatively, the logical block number (50) which is read in 12) and describes the space table is accessed to rewrite "logical block numbers to be released" obtained as a result of 11) by the space table.

In an actual process, one of "13)" and "13')" is done.

When the file data H 432 is deleted, the recording position of data contents 490 of file data I 433 is read in the same procedures as in 10) and 11).

13) The partition descriptor 450 in the main volume descriptor sequence 449 is reproduced to read information of partition contents use 451 described in that descriptor. This partition contents use 451 (also called a partition header descriptor) indicates the recording position of a space table or space bitmap.

The space table position is described in the short allocation descriptor format in the column of the unallocated space table 452 (AD(50) in the example of FIGS. 19 to 21). The space bitmap position is described in the short allocation descriptor format in the column of an unallocated space bitmap 453 (AD(0) in the example of FIGS. 19 to 21).

14) The logical block number (0) which is read in 13) and describes the space bitmap is accessed to rewrite "logical block numbers to be released" obtained as a result of 11) and 12) by the space bitmap descriptor 470.

14') Alternatively, the logical block number (50) which is read in 13) and describes the space table is accessed to rewrite "logical block numbers to be released" obtained as a result of 11) and 12) by the space table.

In an actual process, one of "14)" and "14')" is done.

<<<File Data/Directory Add Process>>>

An access/addition processing method upon adding new file data or a new directory under the subdirectory F 430 will be exemplified below.

1) When file data is added, the size of the contents of that file data is checked, and is divided by 2048 bytes to compute the number of logical blocks required for adding the file data.

2) Information in the boot descriptor 447 in the volume recognition sequence 444 as a boot area upon starting up an information recording/reproduction apparatus or upon loading an information storage medium is reproduced. Processing upon boot starts in accordance with the description contents of the boot descriptor 447.

3) If no specific boot processing is available, the partition descriptor 450 in the main volume descriptor sequence 449 is reproduced first to read information of partition contents use 451 described in that descriptor. This partition contents use 451 (also called a partition header descriptor) indicates the recording position of a space table or space bitmap.

The space table position is described in the short allocation descriptor format in the column of the unallocated space table 452 (AD(50) in the example of FIGS. 19 to 21). The space bitmap position is described in the short allocation descriptor format in the column of an unallocated space bitmap 453 (AD(0) in the example of FIGS. 19 to 21).

4) The logical block number (0) which is read in 3) and describes the space bitmap is accessed. Space bitmap information is read from the space bitmap descriptor 470 to search for unrecorded logical blocks and to register use of logical blocks corresponding in number to the computation result in 1) (a rewrite process of information of the space bitmap descriptor 470).

4') Alternatively, the logical block number (50) which is read in 3) and describes the space table is accessed. USE (AD(*), AD(*), . . . , AD(*)) 471 of the space table is searched for unrecorded logical blocks, and use of logical blocks corresponding in number to the computation result in 1) is registered (a rewrite process of space table information).

In an actual process, one of "4)" and "4')" is done.

5) Information of the logical volume descriptor 454 in the main volume descriptor sequence 449 is reproduced.

6) The logical volume descriptor 454 describes logical volume contents use 455, which describes the logical block number indicating the recording position of the file set descriptor 472 in the long allocation descriptor (FIG. 13) format. (In the example in FIGS. 19 to 21, that descriptor is recorded in the 100th logical block from LAD(100).)

7) The 100th logical block (logical sector number=400) is accessed to reproduce the file set descriptor 472. Root directory ICB 473 in that descriptor describes the recording location (logical block number) of a file entry which pertains to a root directory A 425 in the long allocation descriptor (FIG. 13) format (in the example in FIGS. 19 to 21, that entry is recorded in the 102nd logical block from LAD (102)).

8) The 102nd logical block is accessed according to LAD(102) in the root directory ICB 473 to reproduce the file entry 475 that pertains to the root directory A 425, thus reading the recording position (logical block number) of information of the contents of the root directory A 425 (AD(103)).

9) The 103rd logical block is accessed to reproduce information of the contents of the root directory A 425.

A file identifier descriptor that pertains to the directory D 428 is searched for to read a logical block number (LAD (110) although not shown in FIGS. 19 to 21) that indicates the recording position of a file entry which pertains to the directory D 428.

10) The 110th logical block is accessed to reproduce the file entry 480 which pertains to the directory D 428, thus reading the recording position (logical block number) of information of the contents of the directory D 428 (AD (111)).

11) The 111th logical block is accessed to reproduce information of the contents of the directory D 428.

A file identifier descriptor that pertains to the subdirectory F 430 is searched for to read a logical block number (LAD(112) although not shown in FIGS. 19 to 21) that indicates the recording position of a file entry which pertains to the subdirectory F 430.

12) The 112th logical block is accessed to reproduce the file entry 482 that pertains to the subdirectory F 430, thus reading the recording position (logical block number) of information of the contents of the subdirectory F 430 (AD(113)).

13) The 113th logical block is accessed to register new file data or a new directory to be added in information of the contents of the subdirectory F 430.

14) The logical block number position registered in 4) or 4') is accessed to register a file entry which pertains to new file data or a new directory to be added.

15) The logical block number positions indicated by a short allocation descriptor in the file entry registered in 14) are accessed to register a file identifier descriptor of a parent directory associated with a new directory to be added or data contents of a new directory to be added.

The format of a DVD-RAM disk will be explained below taking as an example a case wherein a DVD-RAM disk is used as an information storage medium.

FIG. 24 is an explanatory view of the layout of the general recording contents in the DVD-RAM disk.

More specifically, a lead-in area 607 on the inner peripheral side of the disk is comprised of an embossed data zone 611, the light reflection surface of which has a three-dimensional pattern, a mirror zone 612, the surface of which is flat (mirror surface), and a rewritable data zone 613. The embossed data zone 611 includes a reference signal zone 653 that represents a reference signal, and a control data zone 655, and the mirror zone 612 includes a connection zone 657, as shown in FIG. 25.

The rewritable data zone 613 includes a disk test zone 658, drive test zone 660, disc identification zone 662 indicating a disk ID (identifier), and defect management areas DMA1 and DMA2 663.

Figures 26, 27:
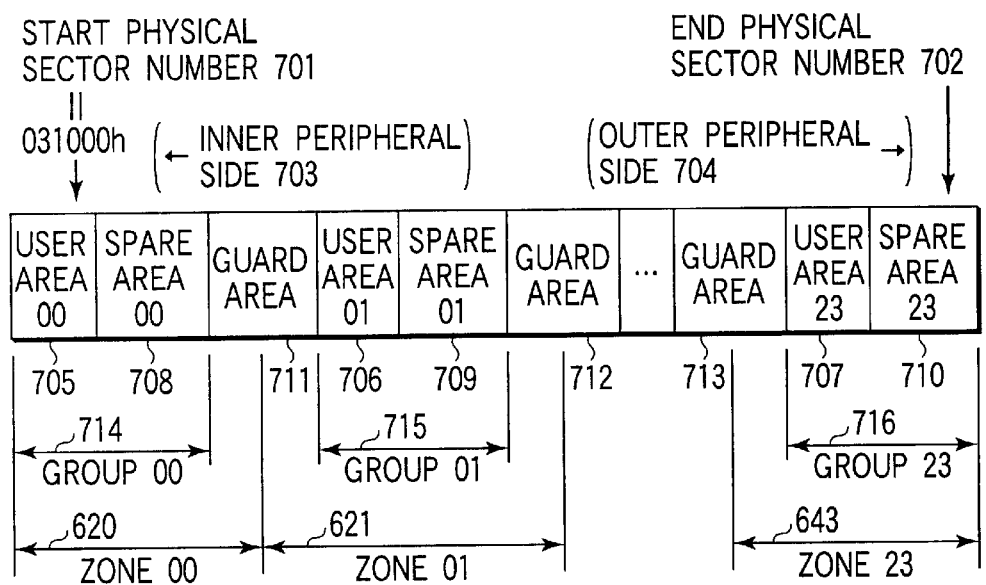
FIG. 26 is a view for explaining the data structure in a lead-out area of a DVD-RAM disk.
FIG. 27 shows the relationship between zones and groups in the data area.

A lead-out area 609 on the outer peripheral side of the disk is comprised of a rewritable data zone 645 which includes defect management areas DMA3 and DMA4 691, a disc identification zone 692 indicating a disk ID (identifier), a drive test zone 694, and a disk test zone 695, as shown in FIG. 26.

A data area 608 between the lead-in area 607 and lead-out area 609 is broken up into 24 ring-shaped zones 00 620 to 23 643. Each zone has a constant rotational velocity, but different zones have different rotational velocities. The number of sectors per zone varies in units of zones. More specifically, a zone (e.g., zone 00 620) on the inner peripheral side of the disk has high rotational velocity and a small number of sectors. On the other hand, a zone (e.g., zone 23 643) on the outer peripheral side of the disk has lower rotational velocity and a large number of sectors. With this layout, high-speed access like CAV is implemented in each zone, and high-density recording like CLV is implemented for all the zones.

FIGS. 25 and 26 are views for explaining details of the lead-in area 607 and lead-out area 609 in the layout shown in FIG. 24.

The control data zone 655 of the embossed data zone 611 records book type and part version 671 which indicates the type (DVD-ROM, DVD-RAM, DVD-R, or the like) and part version of the DVD specifications, disc size and minimum read-out rate 672 indicating the disk size and minimum read-out rate, disc structure 673 indicating a disk structure such as a single-layered ROM disk, single-layered RAM disk, double-layered ROM disk, or the like, recording density 674 indicating a recording density, data area allocation 675 indicating the recording position of data, BCA (Burst Cutting area) descriptor 676 which records the manufacturing number and the like of an individual information storage medium on the inner peripheral side of the information storage medium in a non-rewritable format, velocity 677 indicating a linear velocity condition for designating an exposure value upon recording, read power 678 indicating an exposure value on the information storage medium upon reproduction, peak power 679 indicating a maximum exposure value to be applied to the information storage medium to form a recording mark upon recording, bias power 680 indicating a maximum exposure value to be applied to the information storage medium upon erasure, and information 682 that pertains to the manufacture of the medium.

In other words, this control data zone 655 records in advance information which pertains to the entire information storage medium such as physical sector numbers indicating the recording start/end positions, and the like, information such as the recording power, recording pulse width, erase power, reproduction power, linear velocities upon recording/erasure, and the like, information that pertains to recording/reproduction/erase characteristics, information that pertains to the manufacture of the information storage medium such as the manufacture number of an individual disk, and the like.

The rewritable data zones 613 and 645 of the lead-in area 607 and lead-out area 609 respectively have unique disk name recording areas (disc identification zones 662 and 692) for each medium, test recording areas (drive test zones 660 and 694, and disk test zones 659 and 695 used to confirm recording/erasure conditions), and management information recording areas (DMA1 & DMA2 663, and DMA3 & DMA4 691) that pertain to defective areas in the data area. Using these areas, optimal recording can be done on each disk.

FIG. 29 is a view for explaining details in the data area 608 in the layout in FIG. 24.

Twenty-four groups are respectively assigned to 24 zones, and each group contains a pair of user area 723 used in data recording, and spare area 724 used in a replacement algorithm. The pair of user area 723 and spare area 724 are isolated by guard areas 771 and 772 in units of zones. The user area 723 and spare area 724 of each group fall within a zone of an identical rotational velocity, and areas having smaller group numbers belong to faster rotation zones while areas having larger group numbers belong to slower rotation zones. The groups in the slower rotation zones have a larger number of sectors than those in the faster rotation zones. But since each slow rotation zone has a large radius of rotation, the physical recording density on a disk 10 is nearly uniform across all the zones (groups).

In each group, the user area 723 is allocated on the smaller sector number side (i.e., the inner peripheral side on the disk), and the spare area 724 is allocated on the larger sector number side (the outer peripheral side of the disk).

The recording signal structure of information recorded on a DVD-RAM disk as an information storage medium and the generation method of that recording signal structure will be explained below. Note that the contents of information itself recorded on a medium are called "information", and a structure or expression obtained by scrambling or modulating information of given contents, i.e., a sequence of "1"s and "0"s after the signal format is converted is called "signal" to distinguish them from each other as needed.

Figure 22:
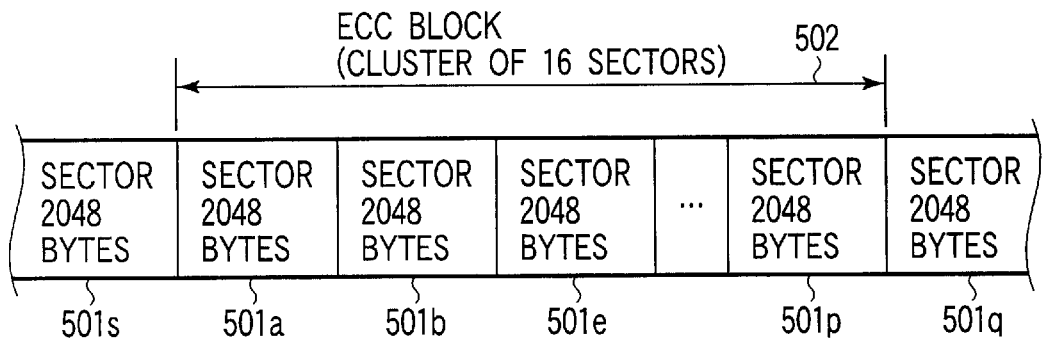
FIG. 22 shows recording units of information recorded on a data area.
Figure 23:
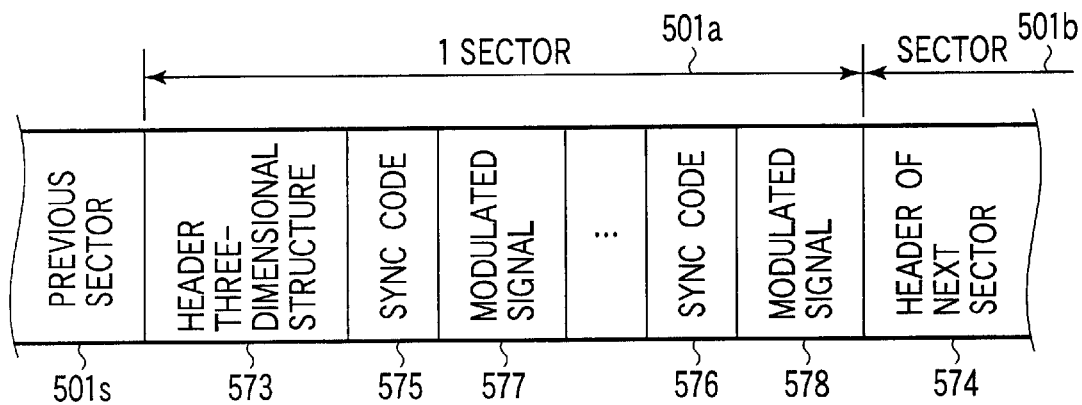
FIG. 23 shows the signal structure in a sector recorded on the data area.

FIG. 23 is a view for explaining the structure in a sector contained in the data area shown in FIG. 24. One sector 501a in FIG. 23 corresponds to one sector number in FIG. 29, and has a 2048-byte size, as shown in FIG. 22. Each sector alternately contains sync codes 575 and 576 and modulated signals 577 and 578 to have a header 573 (or 574) recorded in advance as a three-dimensional structure (e.g., an embossed pattern) on the recording surface of an information storage medium (DVD-RAM disk; not shown) at the head of the sector.

An ECC block processing method in a DVD-RAM disk will be explained below.

FIG. 22 is a view for explaining a recording unit (an ECC unit of error correction code) of information contained in the data area 608 in FIG. 24.

In the FAT (file allocation table) prevalently used as the file system of an information storage medium (hard disk HDD, magnetooptical disk MO, or the like) for a personal computer, information is recorded on the information storage medium to have 256 bytes or 512 bytes as a minimum unit.

By contrast, an information storage medium such as a CD-ROM, DVD-ROM, DVD-RAM, or the like adopts the UDF (Universal Disk Format; to be described in detail later) as the file system, in which information is recorded on the information storage medium to have 2048 bytes as a minimum unit. This minimum unit is called a sector. That is, on an information storage medium using the UDF, 2048-byte information is recorded in each sector 501, as shown in FIG. 22.

Since a CD-ROM, DVD-ROM, or the like is handled as a bare disk without using any cartridge, scratches readily form on or dust readily becomes attached to the surface of the information storage medium on the user side. When this happens, a specific sector (e.g., a sector 501c in FIG. 22) can no longer undergo reproduction (or recording) due to the influences of dust or scratches on the surface of the information storage medium.

DVD adopts an error correction scheme (ECC using product codes) in consideration of such situation. More specifically, 16 sectors (16 sectors 501*a* to 501*p* in FIG. 22) form one ECC (Error Correction Code) block 502 to have a robust error correction function. As a result, even when an error has occurred in the ECC block 502 (e.g., the sector 501*c* cannot be reproduced), such error can be corrected, and all pieces of information the ECC block 502 can be correctly reproduced.

FIG. 27 is a view for explaining the relationship between the zones and groups (see FIG. 29) in the data area 608 in FIG. 24.

The zones: zones 00 620 to 23 643 in FIG. 24 are physically allocated on the recording surface of a DVD-RAM disk, and the physical sector number (start physical sector number 701) of the first physical sector of a user area 00 705 in the data area 608 is set at 031000h (h: hexadecimal notation), as described in the column of a physical sector number 604 in FIG. 24 and FIG. 27. Furthermore, the physical sector numbers increase toward an outer peripheral side 704, and serial numbers are assigned irrespective of the presence of user areas 00 705, 01 709, and 23 707, spare areas 00 708, 01 709, and 23 710, and guard areas 711, 712, and 713. Hence, the physical sector numbers maintain continuity across the zones 620 to 643.

By contrast, the guard areas 711, 712, and 713 are inserted between neighboring groups 714, 715, and 716 formed by pairs of user areas 705, 706, and 707, and spare areas 708, 709, and 710. For this reason, the physical sector numbers across the groups 714, 715, and 716 are discontinuous, as shown in FIG. 29.

When the DVD-RAM disk having the structure shown in FIG. 27 is used in an information recording/reproduction apparatus having an information recording/reproduction unit (physical system blocks) shown in FIG. 35, a process for switching the rotational velocity of the DVD-RAM disk can be done while an optical head 202 is passing by the guard areas 711, 712, and 713. For example, when the optical head 202 seeks from groups 00 705 to 01 715, the rotational velocity of the DVD-RAM disk is switched while the head 202 is passing by the guard area 711.

FIG. 30 is a view for explaining the logical sector number setting method in the data area 608 in FIG. 24. The minimum unit of logical sectors matches that of physical sectors, i.e., a 2048-byte unit. Respective logical sectors are assigned to corresponding physical sectors in accordance with the following rules.

Since the guard areas 711, 712, and 713 are physically formed on the recording surface of the DVD-RAM disk, as shown in FIG. 27, the physical sector numbers across groups 714, 715, and 716 are discontinuous. However, as for the logical sector numbers, a method of setting continuous numbers across the groups 00 714, 01 715, and 23 716 is adopted. In a sequence of the groups 00 714, 01, 715, ..., 23 716, groups having smaller group numbers (smaller physical sector numbers) are allocated on the inner peripheral side of the DVD-RAM disk (on the lead-in area 607 side), and groups having larger group numbers (larger physical sector numbers) are allocated on the outer peripheral side of the DVD-RAM disk (on the lead-out area 609 side).

In this allocation, when the recording surface of the DVD-RAM disk is free from any defects, logical sectors are assigned to all physical sectors in the user areas 00 705 to 23 707 in FIG. 27 to have one-to-one correspondence, and the logical sector number of a sector at the position of the start physical sector number 701 (physical sector number= 031000h) is set at 0h (see the column of the logical sector number 744 of the first sector in each group in FIG. 29). In this manner, if the recording surface is free from any defects, logical sector numbers are not set for sectors in the spare areas 00 708 to 23 710.

When a defective sector is found in the user areas 00 705 to 23 707 upon a certify process as a defect position detection process on the recording surface prior to recording on the DVD-RAM disk, upon reproduction, or upon recording, logical sector numbers are set for corresponding sectors in the spare areas 00 708 to 23 710 in correspondence with the number of sectors that have undergone the replacement algorithm.

Some methods of processing defects produced in the user area will be described. Prior to the description, the defect management areas (DMA1 to DMA4 663 and 691 in FIG. 25 or 26) required for the defect process and related items will be explained.

[Defect Management Area]

Each defect management area (DMA1 to DMA4 663 and 691) contains information of the configuration of the data area and defect management, and consists of 32 sectors. The two defect management areas (DMA1 and DMA2 663) are allocated in the lead-in area 607 of the DVD-RAM disk, and the remaining two defect management areas (DMA3 and DMA4 691) are allocated in the lead-out area 609 of the DVD-RAM disk. Auxiliary sectors (spare sectors) are appended after each defect management area (DMA1 to DMA4 663 and 691).

Each defect management area (DMA1 to DMA4 663 and 691) is divided into two blocks. The first block of each defect management area (DMA1 to DMA4 663 and 691) contains a definition information structure (DDS: Disc Definition Structure) and a primary defect list (PDL: Primary Defect List) of the DVD-RAM disk. The second block of each defect management area (DMA1 to DMA4 663 and 691) contains a secondary defect list (SDL: Secondary Defect List). The four primary defect lists (PDL) of the four defect management areas (DMA1 to DMA4 663 and 691) have identical contents, and their four secondary defect lists (SDL) also have identical contents.

The four definition information structures (DDS) of the four defect management areas (DMA1 to DMA4 663 and 691) basically have identical contents, but pointers to the PDLs and SDLs of the four defect management areas (DMA1 to DMA4 663 and 691) have individual contents.

Note that a DDS/PDL block means the first block that contains the DDS and PDL. Also, the SDL block means the second block that contains the SDL.

The contents of each defect management area (DMA1 to DMA4 663 and 691) after the DVD-RAM disk is initialized are as follows:

(1) the first sector of each DDS/PDL block contains a DDS;

(2) the second sector of each DDS/PDL block contains a PDL; and (3) the first sector of each SDL block contains an SDL.

The block lengths of the primary defect list PDL and secondary defect list SDL are determined by the numbers of their entries. Unused sectors in each defect management area (DMA1 to DMA4 663 and 691) are padded with data 0FFh. All auxiliary sectors are padded with 00h.

[Disk Definition Information]

The definition information structure DDS consists of a 1-sector long table. The DDS has contents which specify the initialization method of the disk 10, and the start addresses of the PDL and SDL. The DDS is recorded in the first sector of each defect management area (DMA) upon completion of initialization of the disk 10.

[Spare Sector]

Defective sectors in each data area 608 are substituted (replaced) by normal sectors by a predetermined defect management method (verification, slipping replacement, skipping replacement, or linear replacement to be described later). The positions of spare sectors used in such replacement are contained in the spare areas 00 708 to 23 710 of the respective groups shown in FIG. 27. The physical sector numbers in these spare areas are described in the column of a spare area 724 in FIG. 29.

The DVD-RAM disk can be initialized before use, but this initialization can be done irrespective of the presence/absence of verification.

Defective sectors are processed by a slipping replacement algorithm, skipping replacement algorithm, or linear replacement algorithm. The total number of entries listed in the PDL and SDL by these algorithms is equal to or smaller than a predetermined value (e.g., 4092).

[Initialization/Certify]

An initialization process is normally done before recording user information on the data area 608 of the DVD-RAM disk to certify defect states of all sectors in the data area 608. Defective sectors found in the initialization process are specified, and are interpolated by a slipping or linear replacement algorithm in accordance with the number of successive defective sectors, and defective sectors in the user area 723 are interpolated by auxiliary sectors in the spare area 724. If all spare sectors in the zones of a DVD-RAM disk are used up during certify, it is determined that the DVD-RAM disk itself is defective, and that DVD-RAM disk is inhibited from being used.

Parameters of all the definition information structures DDS are recorded in four DDS sectors. The primary defect list PDL and secondary defect list SDL are recorded in the four defect management areas (DMA1 to DMA4 663 and 691). In first initialization, an update counter in the SDL is set at 00h, and all reserved blocks are padded with 00h.

When the disk 10 is used to store computer data, the initialization/certify process is executed. However, when the disk 10 is used to record video data, video recording may start without executing the initialization/certify process.

Figure 28:
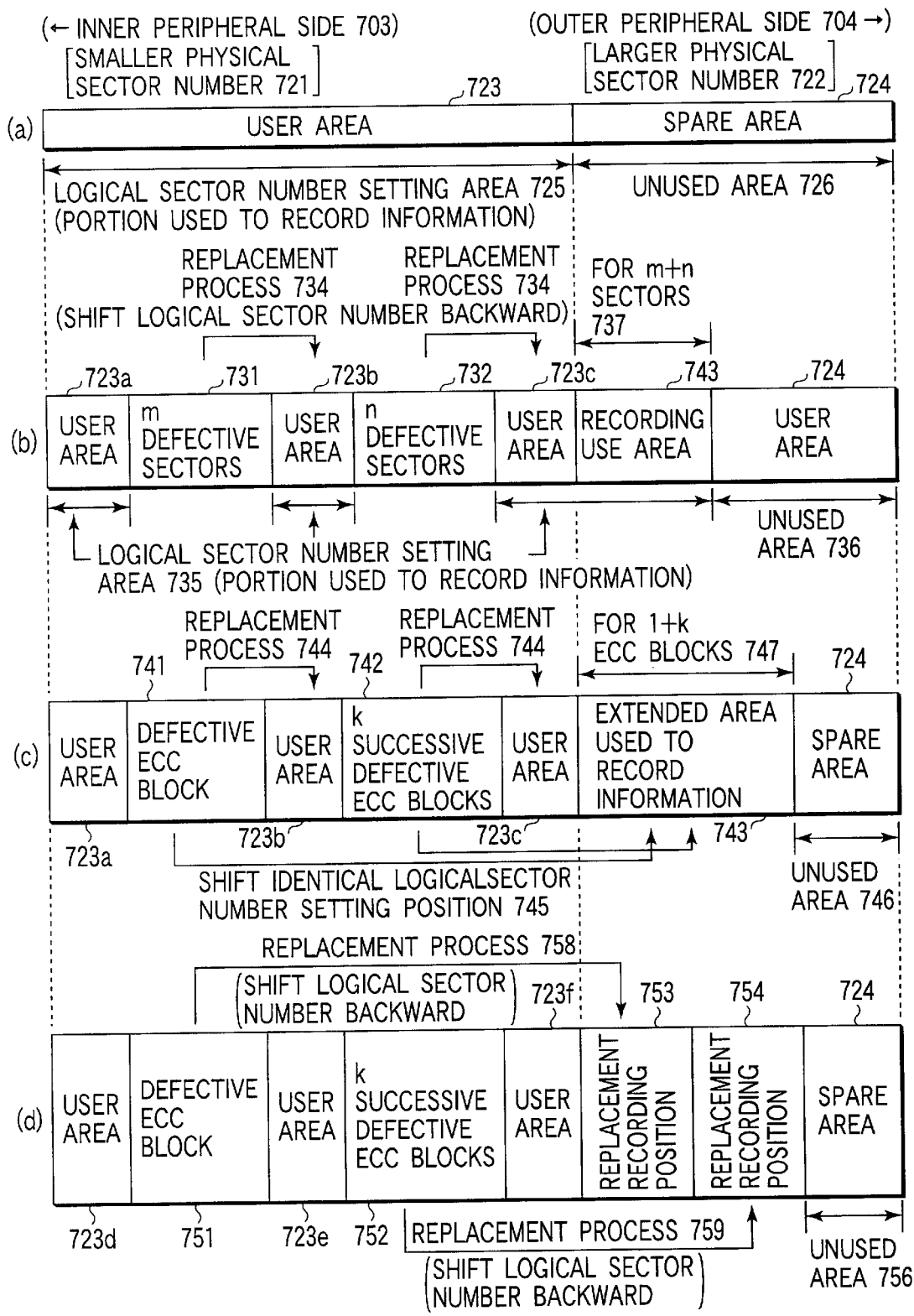
FIG. 28 is a view for explaining replacement algorithms for a defective area in the data area.

(b) of FIG. 28 is a view for explaining the slipping replacement algorithm in the data area 608 in FIG. 24.

Immediately after the manufacture of a DVD-RAM disk (no user information is recorded on the disk), or when user information is recorded for the first time (when information is recorded first on an unrecorded area without overwriting on already recorded information), the slipping replacement algorithm is adopted as the defect processing method.

More specifically, found defective data sectors (e.g., m defective sectors 731) are replaced (substituted) by first normal sectors (user area 723b) that follow these defective sectors (replacement algorithm 734). With this process, slipping (backward shift of logical sector numbers) for m sectors occurs to the terminal end of the corresponding group. Likewise, if n defective sectors 732 are found, those defective sectors are replaced by normal sectors (user area 723c) which follow, and the setting positions of logical sector numbers are shifted backward. As a result of the replacement algorithm, logical sector numbers are set for (m+n) sectors 737 from the beginning of the spare area 724 to define a user information recordable area. Consequently, an unused area 726 in the spare area 724 decreases by (m+n) sectors.

The addresses of the defective sectors in this case are written in the primary defect list (PDL), and these defective sectors are inhibited from recording user information. If no defective sectors are found during certify, no data is written in the PDL. Likewise, if defective sectors are found in a recording use area 743 in the spare area 724, the addresses of these spare sectors are also written in the PDL.

As a result of the slipping replacement algorithm, user areas 723a to 723c free from any defective sectors, and the recording use area 743 in the spare area 724 become an information recording use portion (logical sector number setting area 735) of that group, and serial logical sector numbers are assigned to this portion.

(c) of FIG. 28 is a view for explaining the skipping replacement algorithm as another replacement algorithm in the data area 608 in FIG. 24.

The skipping replacement algorithm is a processing method suitable for a defect process when user information such as video information, audio information, or the like must be seamlessly recorded. This skipping replacement algorithm is executed in units of 16 sectors, i.e., ECC blocks (in units of 32 Kbytes since 2 Kbytes per sector).

If one defective ECC block 741 is found after a user area 723a formed by normal ECC blocks, data which is planned to be recorded in this defective ECC block 741 is recorded in an ECC block of a user area 723b immediately after that defective ECC block (replacement algorithm 744) instead. Likewise, if k successive defective ECC blocks 742 are found, data which is planned to be recorded in these defective blocks 742 is recorded in k ECC blocks of a normal user area 723c immediately after these defective ECC blocks instead.

In this manner, when (1+k) defective ECC blocks are found in the user areas of a given group, (1+k) ECC blocks in a spare area 724 are alternatively used, an extended area 743 used in information recording in the spare area 724 serves as a user information recordable area, and logical sector numbers are set in this area. As a result, an unused area 726 decreases by (1+k) ECC blocks to reduce a remaining unused area 746.

As a result of the skipping replacement algorithm, user areas 723a to 723c free from any defective ECC blocks, and a recording use area 743 used in information recording become an information recording use portion (logical sector number setting area) of that group. The logical sector number setting method at that time is characterized in that the logical sector numbers assigned to the user areas 723a to 723c free from any defective ECC blocks upon initialization (before the replacement algorithm) remain the same. Consequently, logical sector numbers which were assigned upon initialization to physical sectors in the defective ECC block 741 are shifted and assigned to the first physical sector in the extended area 743 used in information recording. Also, logical sector numbers assigned upon initialization to physical sectors in the k successive defective ECC blocks 742 are shifted, and are assigned to corresponding physical sectors in the extended area 743 used in information recording.

In this skipping replacement algorithm, even when the DVD-RAM disk is not certified in advance, defective sectors found during recording of user information can immediately undergo the replacement algorithm.

(d) of FIG. 28 is a view for explaining the linear replacement algorithm as still another replacement algorithm in the data area 608 in FIG. 24.

This linear replacement algorithm is executed in units of 16 sectors, i.e., ECC blocks (32 Kbytes).

In the linear replacement algorithm, a defective ECC block 751 is replaced (substituted) by a first usable, normal spare block (a first replacement recording position 753 in a spare area 724) (replacement algorithm 758). In this replacement algorithm, user information which is planned to be recorded on the defective ECC block 751 is recorded on the replacement recording position 753, and a logical sector number setting position is shifted onto the replacement recording position 753. Likewise, user information and logical sector number setting positions, which are planned to be recorded on k successive defective ECC blocks 752 are shifted to a replacement recording position 754 in the spare area 724.

In case of the linear and skipping replacement algorithms, defective block addresses and the address of the last replacement (substitution) block are written in the SDL. If it is found later that a replacement block listed in the SDL is a defective block, registration is made in the SDL using a direct pointer method. In this direct pointer method, the address of the replacement block is changed from that of a defective block to a new one, thus correcting an SDL entry in which the replaced defective block is registered. Upon updating the secondary defect list SDL, the update counter in the SDL is incremented by 1.

[Write Process]

When data is written in a sector of a given group, a defective sector listed in the primary defect list (PDL) is skipped. According to the aforementioned slipping replacement algorithm, data to be written in the defective sector is written in the next normal data sector. If a block which is to undergo write is listed in the secondary defect list (SDL), data to be written in that block is written in a spare block indicated by the SDL in accordance with the aforementioned linear or skipping replacement algorithm.

In a personal computer environment, the linear replacement algorithm is used upon recording personal computer files, and the skipping replacement algorithm is used upon recording AV files.

[Primary Defect List: PDL]

The primary defect list (PDL) is always recorded on a DVD-RAM disk, but its contents are often empty.

The PDL contains the addresses of all defective sectors specified upon initialization. These addresses are listed in ascending order. The PDL is recorded using a minimum required number of sectors. The PDL starts from the first user byte of the first sector. All unused bytes in the last sector of the PDL are set at 0FFh. This PDL is written with the following information (numerical values indicate byte positions, and comments which follow them indicate the PDL contents).

0 . . . 00h; PDL identifier
1 . . . 01h; PDL identifier
2 . . . number of addresses in PDL; MSB
3 . . . number of addresses in PDL; LSB
4 . . . address of first defective sector (sector number; MSB)
5 . . . address of first defective sector (sector number)
6 . . . address of first defective sector (sector number)
7 . . . address of first defective sector (sector number; LSB)
x-3 . . . address of last defective sector (sector number; MSB)
x-2 . . . address of last defective sector (sector number)
x-1 . . . address of last defective sector (sector number)
x . . . address of last defective sector (sector number; LSB)

When the second and third bytes are set at 00h, the third byte corresponds to the end of the PDL.

In case of the primary defect list (PDL) for multi-sectors, the address list of defective sectors follows the first byte of the second and subsequent sectors. That is, the PDL identifier and the number of PDL addresses are present in only the first sector.

When the PDL is empty, the second and third bytes are set at 00h, and the fourth to 2047th bytes are set at FFh.

Also, FFh is written in unused sectors in the DDS/PDL block.

[Secondary Defect List: SDL]

The secondary defect list (SDL) is generated in the initialization process, and is used after certify. The SDL is recorded on all disks during initialization.

This SDL contains a plurality of entries in the form of an address of a defective data block and that of a spare block to be replaced by the defective block. Eight bytes are assigned to each entry in the SDL. That is, 4 bytes are assigned to the address of a defective block, and the remaining 4 bytes are assigned to that of a replacement block.

The SDL is recorded using a minimum required number of sectors, and starts from the first user data byte of the first sector. All unused bytes in the last sector of the SDL are set at 0FFh. Subsequent information is recorded in four SDLs.

If it is found later that a replacement block listed in the SDL is a defective block, registration is made in the SDL using the direct pointer method. In this direct pointer method, the address of the replacement block is changed from that of a defective block to a new one, thus correcting an SDL entry in which the replaced defective block is registered. In this case, the number of entries in the SDL is never changed by the defective sector.

This SDL is written with the following information (numerical values indicate byte positions, and comments which follow them indicate the SDL contents).

0 . . . (00); SDL identifier
1 . . . (02); SDL identifier
2 . . . (00)
3 . . . (01)
4 . . . update counter; MSB
5 . . . update counter
6 . . . update counter
7 . . . update counter; LSB
8 to 26 . . . reserved (00h)
27 to 29 . . . flags indicating that all spare sectors in zones are used up
30 . . . the number of entries in SDL; MSB
31 . . . the number of entries in SDL; LSB
32 . . . address of first defective block (sector number; MSB)
33 . . . address of first defective block (sector number)
34 . . . address of first defective block (sector number)
35 . . . address of first defective block (sector number; LSB)
36 . . . address of first replacement block (sector number; MSB)
37 . . . address of first replacement block (sector number)
38 . . . address of first replacement block (sector number)
39 . . . address of first replacement block (sector number; LSB)
y-7 . . . address of last defective block (sector number; MSB)
y-6 . . . address of last defective block (sector number)
y-5 . . . address of last defective block (sector number)
y-4 . . . address of last defective block (sector number; LSB)
y-3 . . . address of last replacement block (sector number; MSB)
y-2 . . . address of last replacement block (sector number)
y-1 . . . address of last replacement block (sector number)

y . . . address of last replacement block (sector number; LSB)

Note that each of entries in the 30th and 31 bytes has an 8-byte length.

In case of the secondary defect list (SDL) for multi-sectors, the address lists of defective and replacement blocks follow the first byte of the second and subsequent sectors. That is, the 0th to 31st bytes of the contents of the SDL are present in only the first sector.

FFh is written in unused sectors in the SDL block.

As shown in FIG. 22, 16 sectors form one ECC block 502. In the ECC block 502, correction codes PI (Parity Inner) and PO (Parity Outer) for error correction are appended to input information, and the sum information undergoes scrambling by means of PN (Pseudo Noise) sequence data addition. This scrambling method varies depending on the sector numbers in the ECC block 502 shown in FIG. 22. Therefore, a characteristic feature of the present invention lies in that the recording start positions of distributed data 1011a to 1011d shown in FIG. 2 start from a sector of a specific order in the ECC block 502. In the present invention, reference data is recorded from the first sector in an ECC block to allow easy processing. More specifically, channel bit reference data which satisfies the conditions described in FIGS. 9 to 11 is set in advance, and reference data which can decode the result obtained by demodulating the channel bit reference data and descrambling the demodulated data in correspondence with the recording start sector number on the UDF file system in consideration of the position (relationship with PI and PO) in an ECC block is generated. After that, the reference data is recorded using the file system of a host computer.

Figure 31:
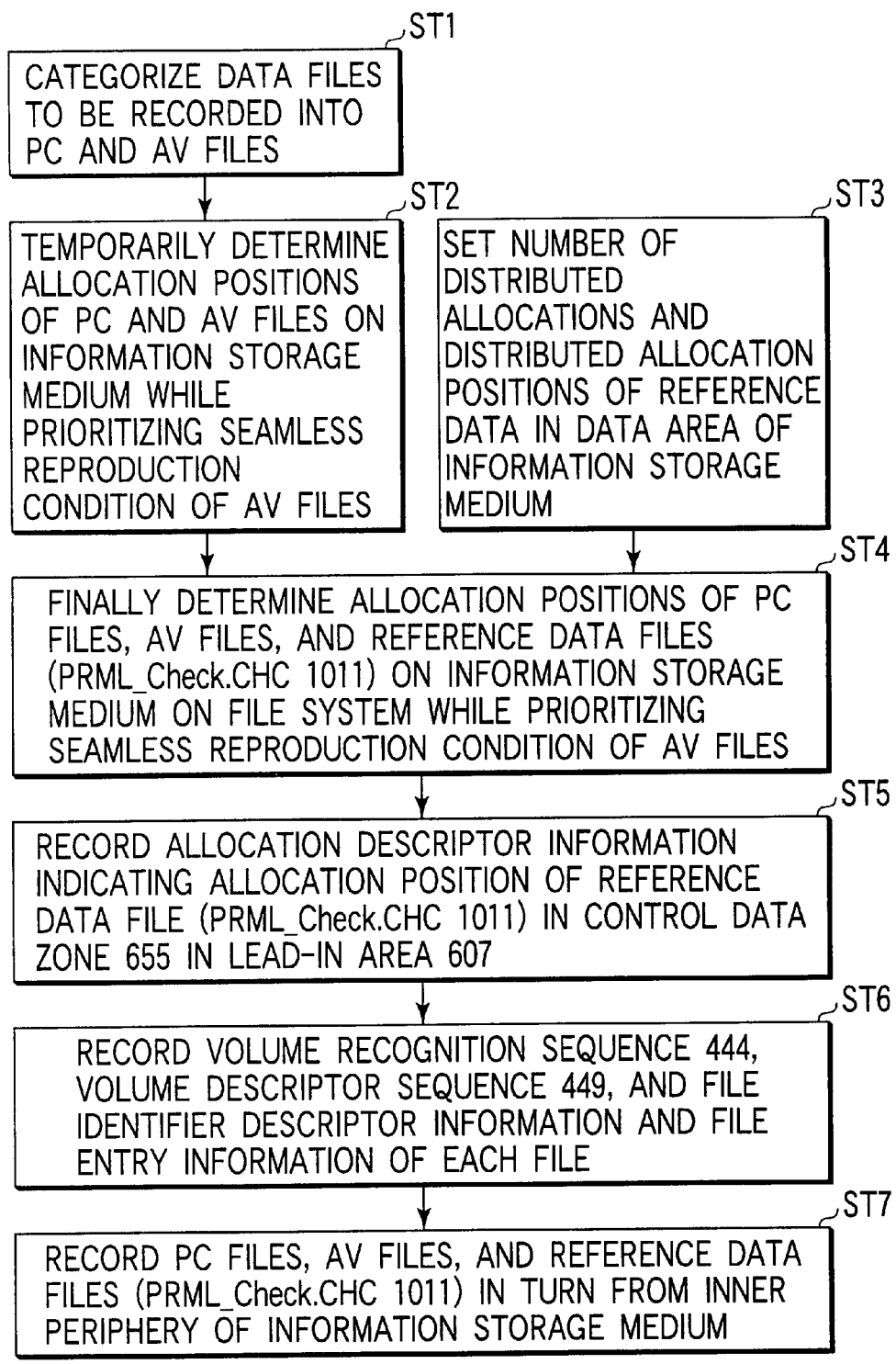
FIG. 31 is a flow chart for explaining the reference data recording method in a read-only information storage medium.

A reference data recording method on a read-only information storage medium will be explained below using FIG. 31.

The reference data is recorded on the read-only information storage medium upon formation of its master disk. FIG. 31 will explain a case wherein both PC and AV files are recorded together on an information storage medium.

A file that records video information (for example, VR_MOVIE.VRO 1013 in FIG. 1) or still picture information (VR_STILL.VRO 1014) synchronized with audio information, audio information (VR_AUDIO.VRO 1015), and the like are categorized to AV files, and seamless recording or reproduction without any intermission is an essential condition. By contrast, all files (Business_Data.DOC 1012) under a PC application directory 1002 as a directory where PC data are recorded, and management files (VR_MANGR.IFO 1012, VR_MANGR.BUP 1016) that record management information associated with AV files belong to PC files. Files are categorized into these two kinds of files (ST1), and the recording positions of respective files are temporarily determined while prioritizing the seamless reproduction condition of AV files (ST2). At the same time, a distributed allocation method of reference data files is set (ST3), and the allocation positions of the files are adjusted (ST4). After the final distributed allocation method of the reference data files is determined in ST4, that information is recorded first in the lead-in area 607 as an area the contents of which are reproducible and readable by an information reproduction apparatus alone. After that, the identical information is recorded in a file entry of each reference data file as an area the contents of which are readable by the file system, and recording position information (allocation descriptor) is recorded in the control data zone 655 in the lead-in area 607 (ST5). Also, the volume recognition sequence 444, volume descriptor sequence 449, and file identifier descriptor information and file entry information of respective files are recorded (ST6). Furthermore, all PC and AV files and reference data files are recorded together on a master disk (ST7). Those pieces of recording information are generated by a controller in a master disk recording apparatus.

Figure 32A:
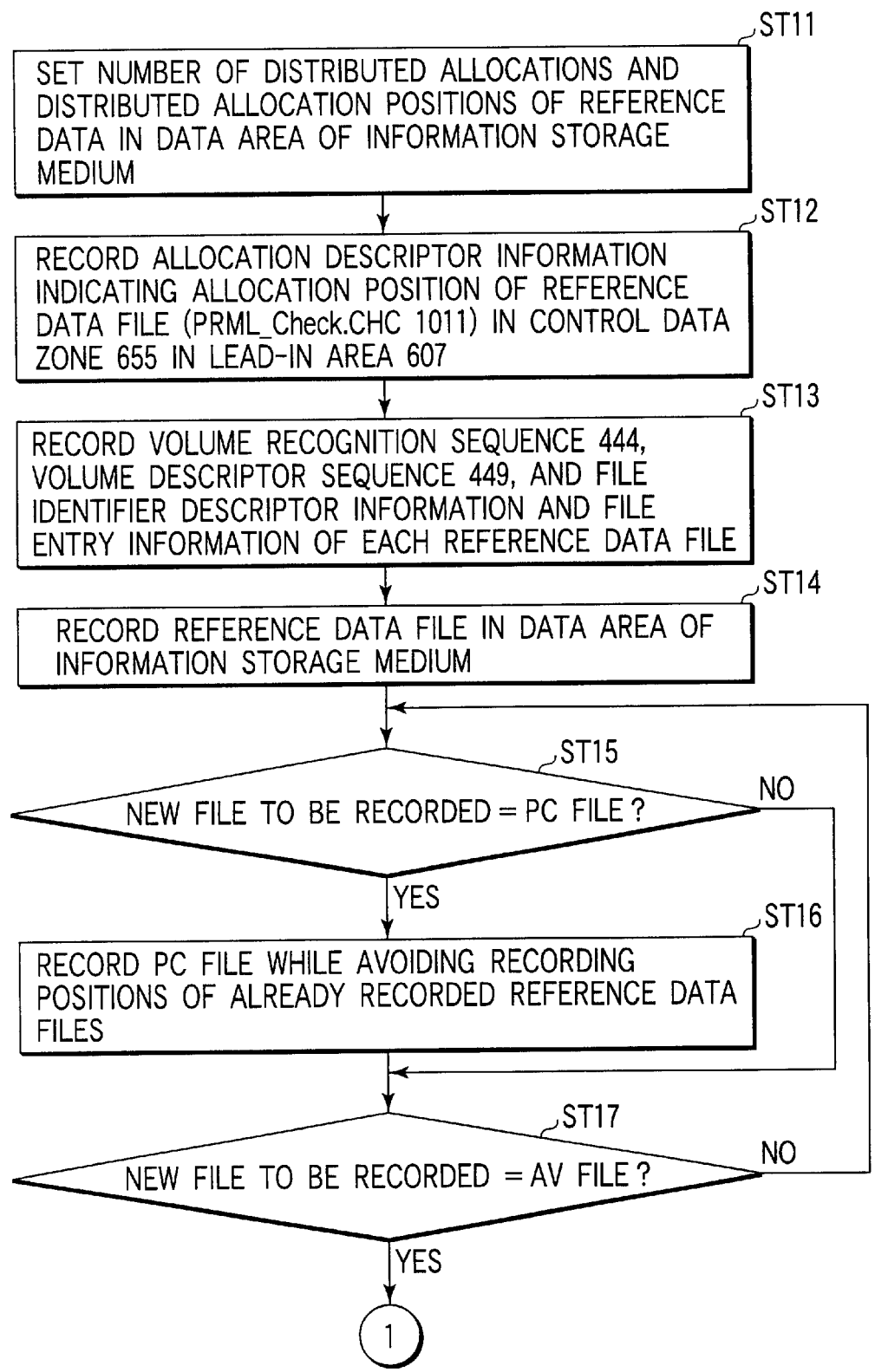
FIGS. 32A and 32B are flow charts for explaining the reference data recording method in a rewritable information storage medium.
Figure 32B:
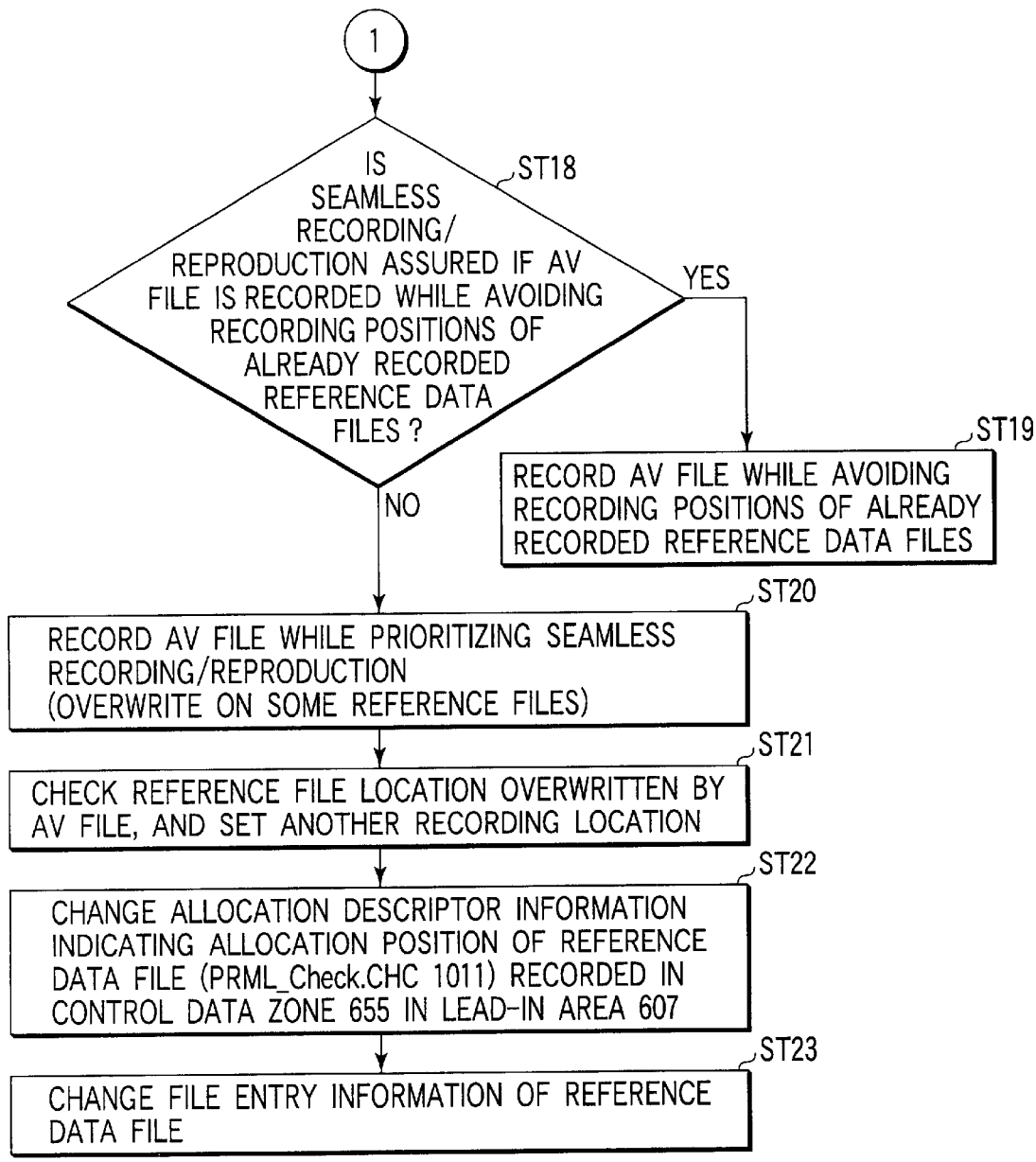

A method of recording reference data on a rewritable information storage medium such as a DVD-RAM or the like will be explained below using FIGS. 32A and 32B. In this case, an optical head 202 of an information recording/reproduction apparatus shown in FIG. 35 records reference data. An information recording system associated with an information storage medium such as a DVD-RAM or the like comprises an information recording/reproduction apparatus for directly recording information on the information storage medium, and a host computer for controlling this information recording/reproduction apparatus. An OS (Operation System) as a control program in the host computer comprises a "device drive" for directly controlling the information recording/reproduction apparatus, a "file system" for controlling the recording position of information to be recorded in the information storage medium, and the like. The information recording/reproduction apparatus can directly decode information in the lead-in area 607. By contrast, the contents of UDF related information shown in FIGS. 12 to 21 can be understood by only the file system. The control of the information recording/reproduction apparatus by the file system is implemented by sending "commands" to the information recording/reproduction apparatus via the device drive. In case of FIGS. 32A and 32B, reference data is recorded on the information storage medium upon initially formatting the information storage medium (ST11 to ST14). After that, if a PC file is additionally recorded (ST15), the PC file is recorded while avoiding recording position information of already recorded reference data files. The recording position of the PC file is set by the file system of the host computer. If an AV file is recorded (ST17), the file system checks in advance if seamless recording and reproduction can be guaranteed if an AV file is recorded while avoiding recording position information of already recorded reference data files (ST18). If YES in ST18, the AV file is recorded (ST19). However, if NO in ST18, the AV file is recorded while being overwritten on obstructive reference file portions (ST20), the overwritten reference file information is rewritten at another location under the control of the file system (ST21), and the reference file position information of the file information that has moved to the other location is updated (ST22, ST23). The file entry information of the reference data file is changed (ST23) under the control of the file system. The device drive sends a unique file entry information change command of the changed reference data file to the information recording/reproduction apparatus, which changes information in the control data zone 655 in the lead-in area 607 by itself on the basis of that result (ST22).

Figure 33:
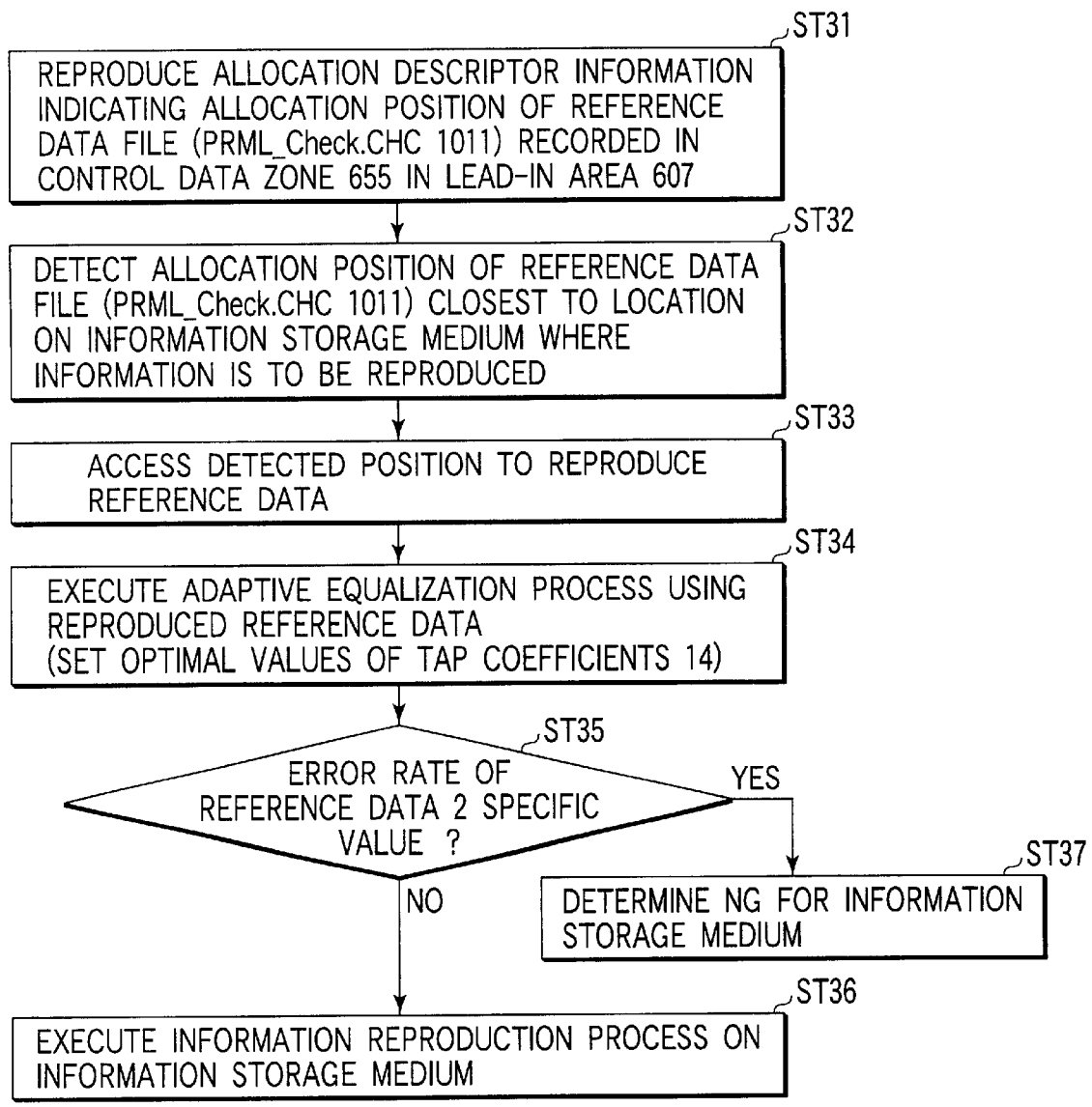
FIG. 33 is a flow chart for explaining the circuit adjustment or information storage medium evaluation method using reference data.

FIG. 33 shows a method of making circuit adjustment of a reproduction apparatus and information storage medium evaluation using the reference data recorded on the information storage medium by the aforementioned method.

The reproduction apparatus reads the reference data position from the reproducible lead-in area 607 (ST31), and executes an adaptive equalization process using reference data reproduced based on that result (ST32 to ST34). After the adaptive equalization process, the error rate of the reference data on the information storage medium is measured using error correction codes appended to ECC blocks (ST35). If the error rate is high, NG is determined for that information storage medium (ST37). If the error rate is low, an information reproduction process on the information storage medium is executed (ST36).

A characteristic feature of the present invention lies in that the reference data are recorded in the file format and in units of sectors 501, as shown in FIG. 22. In the data area 608 of the information storage medium shown in FIG. 24, information is recorded in units of sectors 501, as shown in FIG. 23. Therefore, unrecorded locations are also present in units of sectors 501. When the reference data are recorded in units of sectors, they can be recorded at arbitrary unrecorded locations and, especially, their recording positions can be shifted very easily in ST21 shown in FIG. 32B.

As another example of the recording locations of the reference data, reference data can be recorded in boundary areas of zones. For example, reference data are shared and allocated in the guard areas 711, 712, and 713 in units of sectors. Since the guard areas 711, 712, and 713 cannot be seen by the file system, recording is done by the information recording/reproduction apparatus alone in such case.

Furthermore, as still another example of the recording locations of the reference data, the reference data are shared and allocated in the spare areas 708, 709, and 710 (see FIG. 27) as alternative areas of defective areas. Since such locations cannot be seen by the file system, recording is done by the information recording/reproduction apparatus alone in such case.

As described above, the effects of the present invention can be summarized as follows.

1. Since the reference data are distributed and allocated at a plurality of locations on the information storage medium, the circuit constants of an information reproduction apparatus are set (tap coefficients are determined) using the reference data located at a position closest to a scheduled reproduction position before reproducing an arbitrary position on the information storage medium. In this way, the circuit constants can be set (tap coefficients can be determined) nearly optimally to the scheduled reproduction position. As a result, a stable equalization signal can be obtained, and the information storage medium can be evaluated accurately using the consequently obtained error rate of the information storage medium.

2. Since the shortest distance of neighboring channel bits of the reference data is set to be shorter than the constraint length, the equalization signal level can be changed frequently. If the equalization signal level is always constant, only the circuit constant for one level can be set, and setups of circuit constants for other levels must wait until the equalization signal level changes. However, when the equalization signal level changes frequently like in the present invention, the circuit adjustment (feedback of tap coefficients) of an information reproduction apparatus for a plurality of levels can be done within a short period of time.

3. Other file data are recorded in the data area in units of sectors as minimum recording units of information on the information storage medium. Therefore, when the reference data are recorded in the file format and in units of minimum recording units (sectors) on the information storage medium, the reference data and another file information can be compatibly allocated together.

4. Since the reference data are recorded in the file format and the allocated positions of the reference data on the information storage medium are controlled by the file system (host computer), the reference data can be distributed and allocated at appropriate locations in correspondence with the contents and locations of other kinds of information recorded on the information storage medium. When AV (Audio Video) data are mainly recorded as another kind of information to be recorded on the information storage medium, they are preferably recorded at successive locations (without being intermittently distributed and recorded) so as to guarantee seamless reproduction of the AV data. Therefore, in such case successive recording locations of the AV data can be assured first, and the recording locations of the reference data can be determined for storage in the gaps of the AV data and relatively even distribution from the inner to the outer periphery on the information storage medium.

5. Since each extent start position of the reference data starts from a specific sector position in an ECC block, reference data patterns having the same extent start positions can be recorded on the information storage medium without being influenced by scrambling during recording.

6. Since the reference data are recorded in the spare areas, they can be evenly allocated on the information storage medium.

7. Since the reference data are recorded at boundary positions of zones, they can be evenly allocated on the information storage medium.

An embodiment slightly different from the aforementioned embodiment will be described. An information storage medium structure and its recording method will be explained below using the accompanying drawings.

Figure 36:
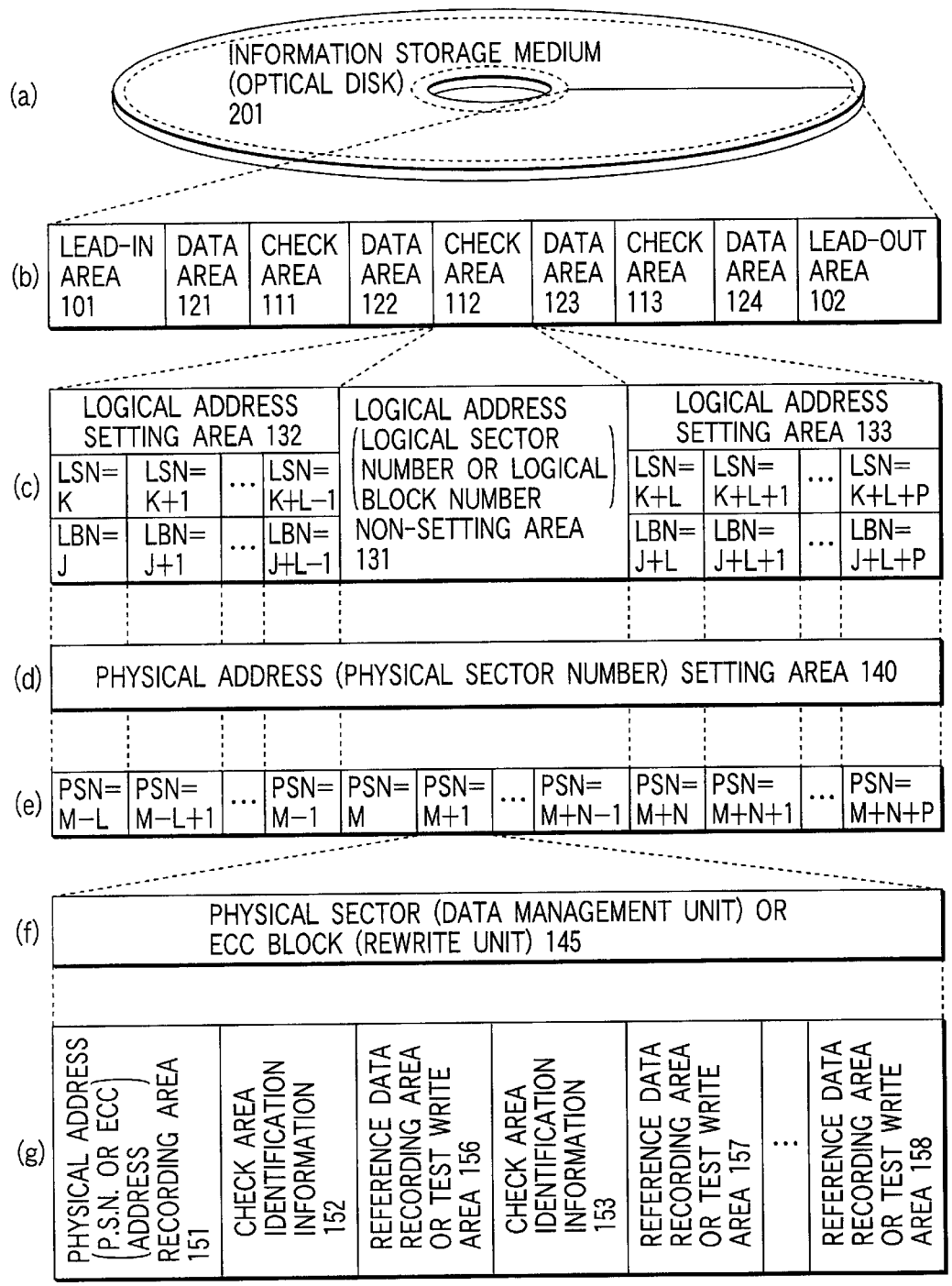
FIG. 36 is a view for explaining a reference data recording area or test write area.

Recording areas of reference data used to adjust the circuit constants of an information reproduction apparatus to appropriate values, and to evaluate the characteristics of an information storage medium 201, and test write areas 156 and 157 used to set recording conditions optimal to the information storage medium 201 in an information recording/reproduction apparatus are allocated in check areas 111 to 113 in (b) of FIG. 36. The information storage medium 201 has data areas 121 to 124 as user data recording areas on/from which user can record/reproduce data, and the check areas 111 to 113. The check areas 111 to 113 are distributed and allocated at a plurality of locations on the information storage medium 201. The data areas 121 to 124 and check areas 111 to 113 are broken up into physical sectors (2 kB) as data management units, or ECC blocks each of which is formed by a plurality of physical sectors and serves as a data rewrite unit. As shown in (d) of FIG. 36, physical addresses for access are set for all locations on the information storage medium (optical disk) 201, and are called a physical address setting area 140. Physical sector numbers (PSN) are assigned in units of sectors in the physical address setting area 140 ((e) of FIG. 36). In the embodiment of the present invention, physical addresses may be set in units of ECC blocks as rewrite units in place of sectors.

In (b) of FIG. 36, only the data areas 121 to 124 correspond to logical address setting areas 132 and 133. That is, logical addresses having one-to-one correspondence with physical sector numbers (PSN) as physical addresses are set for the data areas 121 to 123 as user data recording areas on/from which the user can record/reproduce data, and a recording or reproduction location from the host computer is designated using this logical address.

There are two types of logical addresses. That is, logical sector numbers (LSN) which are interpreted and controlled by the file system and assign addresses to recording locations of volume information that pertains to the file system, and logical block numbers (LBN) which are set in the user data recording areas (not set in recording areas of the volume information that pertains to the file system are set for identical PSNs.

A characteristic feature of the present invention lies in that each of the check areas 111 to 113 corresponds to a logical address non-setting area 131, in which no logical addresses are set, as shown in (c) of FIG. 36.

Each of the check areas 111 to 113 includes a physical address recording area 151, check area identification information 152, check area identification information 153, and reference data recording areas or test write areas 156 to 158. The reference data recording areas 156 to 158 record reference data used in at least one of circuit constant adjustment of an information reproduction apparatus and characteristic evaluation of an information storage medium. The identification information 152 and identification information 153 indicate if the subsequent area is the reference data recording area or test write area. In a read-only information storage medium 201, all those pieces of information are pre-recorded in the form of small three-dimensional patterns. In case of a recordable/reproducible information storage medium 201, the physical address recording area 151 and recording areas of the check area identification information 152 and identification information 153 are pre-recorded in the form of small three-dimensional patterns or the like. However, no information is recorded in advance in the test write areas 156 to 158, which are used when an information recording/reproduction apparatus (optical head 202) shown in FIG. 35 makes test write in these areas before recording information on the information storage medium 201 so as to find out optimal recording condition.

Figure 37:
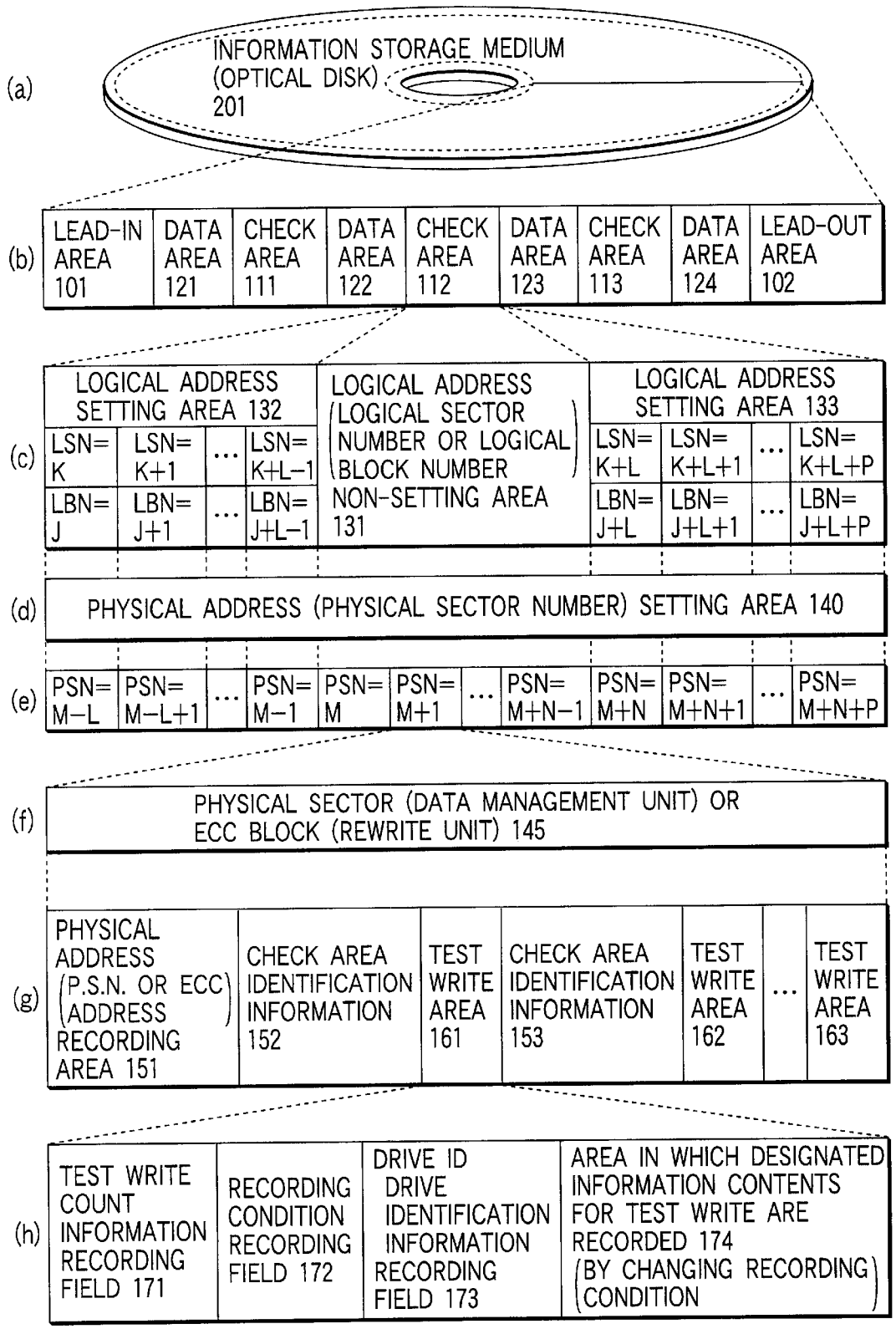
FIG. 37 is a view for explaining the recording data contents in a test write area.

(h) of FIG. 37 shows the information contents to be recorded in these test write areas 156 to 158. When a phase change recording film is used as a recording film of the information storage medium 201, the number of times of rewrite is limited due to "material flow" and "metal fatigue". Hence, a test write count information recording field 171 which is incremented (the value of which is increased one by one) every time test write is made is set. Also, a recording condition recording field 172 for recording test write recording conditions (recording power, recording pulse width, and the like) so as to share a test write result among identical models of a given manufacturer of the information recording/reproduction apparatus is assured. However, the test write result cannot be shared among different models of information recording/reproduction apparatuses of different information recording/reproduction apparatus manufacturers. Therefore, a drive ID recording field 173 for clarifying the range of information recording/reproduction apparatuses to which information recorded in the recording condition recording field 172 can be applied is assured. Information contents to be recorded in an area 174 that records designated information contents to make test write include patterns with contents shown in FIGS. 3A to 3E and FIGS. 4 and 5.

A major characteristic feature of the embodiment of the present invention lies in that a recording method named PRML (Partial Response Maximum Likelihood) mentioned above is adopted to be able to record information on the information storage medium 201 at higher density.

An information recording/reproduction apparatus according to the present invention will be explained below using FIGS. 37 and 35.

The contents of a binarization circuit 212 in FIG. 35 correspond to the circuits shown in FIGS. 5 to 8.

Figure 34:
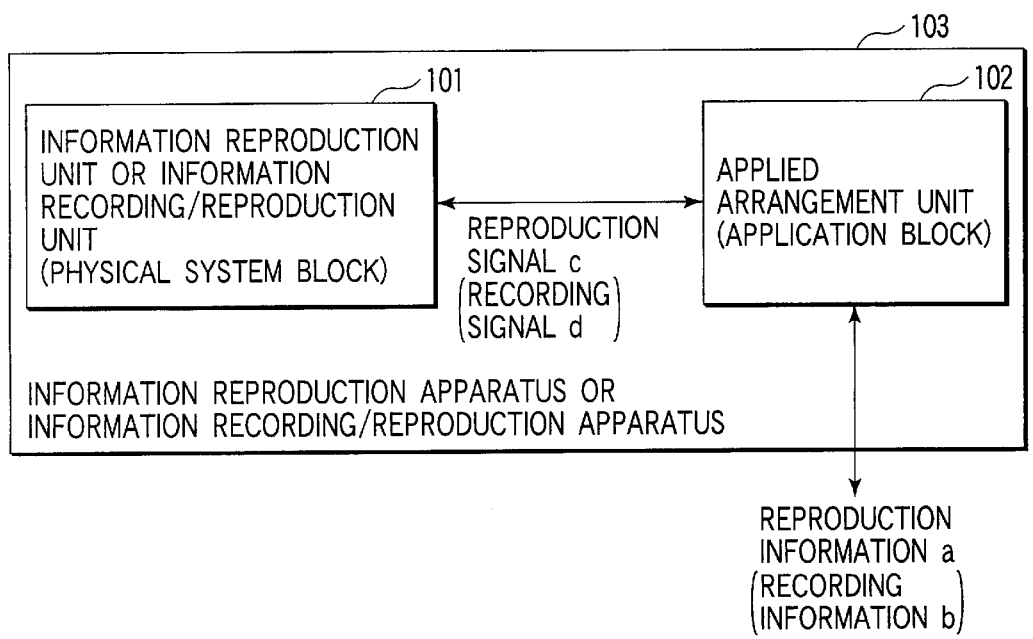
FIG. 34 is a block diagram showing the arrangement of an information reproduction apparatus or information recording/reproduction apparatus.

An information reproduction apparatus or information recording/reproduction apparatus 103 roughly comprises two blocks, as shown in FIG. 34.

An information reproduction unit or information recording/reproduction unit (physical system block) 101 has a function of rotating an information storage medium (optical disk), and reading information recorded in advance on the information storage medium (optical disk) using an optical head (or recording new information on the information storage medium (optical disk). More specifically, this block 101 comprises a spindle motor for rotating the information storage medium (optical disk), an optical head for reproducing information recorded on the information storage medium (optical disk), an optical head moving mechanism and various servo circuits for moving the optical head to that radial position on the information storage medium (optical disk) on which information to be reproduced is recorded, and the like. Note that a detailed explanation of this block using FIG. 35 will be given later.

An applied arrangement unit (application block) 102 processes a reproduction signal c obtained from the information reproduction unit or information recording/reproduction unit (physical system block) 101, and outputs reproduction information a outside the information reproduction apparatus or information recording/reproduction apparatus 103. The internal arrangement of this block changes in correspondence with a practical purpose (use purpose) of the information reproduction apparatus or information recording/reproduction apparatus 103. The arrangement of this applied arrangement unit (application block) 102 will also be explained later.

In case of the information recording/reproduction apparatus, externally input recording information b is recorded on the information storage medium (optical disk) in the following procedure.

Externally input recording information is directly transferred to the applied arrangement unit (application block) 102.

The applied arrangement unit (application block) 102 processes the recording information b, and then sends a recording signal d to the information recording/reproduction unit (physical system block) 101.

The information recording/reproduction unit (physical system block) 101 records the received recording signal d on the information storage medium.

<<<Description of Function of Information Recording/reproduction Unit>>>

<<Fundamental Function of Information Recording/reproduction Unit>>

The information recording/reproduction unit makes recording or rewrite (including erasure of information) of new information at a predetermined position on the information storage medium (optical disk) 201 using a focused beam spot. The information recording/reproduction unit reproduces already recorded information from a predetermined position on the information storage medium (optical disk) 201 using a focused beam spot.

<<Fundamental Function Achieving Means of Information Recording/reproduction Unit>>

As means for achieving the aforementioned fundamental functions, the information recording/reproduction unit traces (tracks) a focused beam spot along a track (not shown) on the information storage medium 201. The information recording/reproduction unit switches recording/reproduction/erasure of information by changing the light amount of a focused beam spot with which the information recording medium 201 is irradiated. Furthermore, the information recording/reproduction unit converts an externally input recording signal d into a signal optimal to attain high-density, low error rate recording.

<<<Structure of Mechanism Portion and Operation of Detection Portion>>>
<<Basic Structure and Signal Detection Circuit of Optical Head 202>>
<Signal Detection by Optical Head 202>

The optical head basically comprises a semiconductor laser element serving as a light source, a photodetector, and an objective lens (not shown).

A laser beam emitted by the semiconductor laser element is focused on the information storage medium (optical disk) 201 by the objective lens. The laser beam reflected by a light reflection film or light reflective recording film of the information storage medium (optical disk) 201 is photoelectrically converted by the photodetector.

A detection current obtained by the photodetector is current-voltage converted to a detection signal by an amplifier 213. The detection signal is processed by a focus/track error detection circuit 217 or the binarization circuit 212. In general, the photodetector is divided into a plurality of photodetection areas, which individually detect changes in amount of irradiation light. The focus/track error detection circuit 217 computes the sum and difference of these individual detection signals to detect focus and track errors. A signal on the information storage medium 201 is reproduced by detecting a change in amount of light reflected by the light reflection film or light reflective recording film of the information storage medium (optical disk) 201.

<<<Focus Error Detection Method>>>

As a method of optically detecting a focus error amount, the following methods are available.

The first method is an astigmatism method. In this method, an optical element (not shown) for producing astigmatism is inserted in a detection circuit of the laser beam reflected by the light reflection film or light reflective recording film of the information storage medium (optical disk) 201 so as to detect a change in shape of the laser beam which strikes the photodetector. The photodetection area is divided into four diagonal areas. The focus/track error detection circuit 217 computes the difference between the diagonal sums of the detection signals obtained from those detection areas, thus obtaining a focus error detection signal.

The second method is a knife edge method. In this method, a knife edge that asymmetrically intercepts some light components of the laser beam reflected by the information storage medium 201 is disposed. The photodetection area is divided into two areas, and the difference between detection signals obtained from these areas is computed to obtain a focus error detection signal.

<<<Track Error Detection Method>>>

The information storage medium (optical disk) 201 has spiral or concentric tracks, and information is recorded on the tracks. Information is reproduced or recorded/erased by tracing a focused beam spot along the tracks. In order to stably trace the focused beam spot along the tracks, the relative positional deviation between the track and focused beam spot must be optically detected. The track error detection method normally includes the following methods.

The first method is a DPD (Differential Phase Detection) method. In this method, a change in intensity distribution of the laser beam reflected by the light reflection film or light reflective recording film of the information storage medium (optical disk) 201 on the photodetector is detected. The photodetection area is divided into four diagonal areas.

The focus/track error detection circuit 217 computes the difference between the diagonal sums of detection signals obtained from these detection areas, thus obtaining a track error signal.

The second method is a push-pull method. In this method, a change in intensity distribution of the laser beam reflected by the information storage medium 201 on the photodetector is detected. The photodetection area is divided into two areas, and the difference between detection signals obtained from these areas is computed to obtain a track error detection signal.

The third method is a twin-spot method. In this method, a diffraction element or the like is inserted in the light guide system between the semiconductor laser element and the information storage medium 201 to split light into a plurality of wavefronts, and to detect a change in amount of reflected light of ±1st-order diffracted light rays that strike the information storage medium 201. Photodetection areas for individually detecting the amount of reflected +1st-order diffracted light, and that of reflected −1st-order diffracted light are arranged in addition to the photodetection areas for detecting a reproduction signal, and the difference between detection signals is computed to obtain a track error detection signal.

<<<Objective Lens Actuator Structure>>>

The objective lens (not shown) that focuses a laser beam emitted by the semiconductor laser element onto the information storage medium 201 has a structure movable in the directions of two axes in accordance with an output current from an objective lens actuator drive circuit 218. The objective lens moves in a direction perpendicular to the information storage medium 201 to correct focus errors, and in the radial direction of the information storage medium 201 to correct track errors.

Although not shown, the objective lens moving mechanism is called an objective lens actuator. The objective lens actuator structure includes the following systems.

The first system is a shaft slide system. In this system, a blade integrated with the objective lens moves along the central shaft. The blade moves in the direction parallel to the central shaft to correct focus errors, and rotation of the blade about the central shaft corrects track errors.

The second system is a 4-wire system. In this system, a blade integrated with the objective lens is coupled to a stationary system via four wires, and moves in the directions of two axes exploiting elastic deformations of the wires.

Either system has a permanent magnet and coil, and the blade moves by supplying a current to the coil coupled to the blade.

<<Rotation Control System of Information Storage Medium 201>>

The information storage medium (optical disk) 201 is attached onto a rotary table 221 which rotates by the driving force of a spindle motor 204.

The rotational speed of the information storage medium 201 is detected based on a reproduction signal obtained from the information storage medium 201. That is, the binarization circuit 212 converts a detection signal (analog signal) output from the amplifier 213 into a digital signal by, and a PLL circuit 211 generates a constant period signal (reference clock signal) based on the digital signal. An information storage medium rotational speed detection circuit 214 detects the rotational speed of the information storage medium 201 using this signal, and outputs the detected value.

A semiconductor memory 219 pre-stores a correspondence table of the information storage medium rotational speeds corresponding to radial positions which are to undergo reproduction or recording/erasure on the information storage medium 201. When the reproduction position or recording/erasure position is determined, a controller 220 looks up the information in the semiconductor memory 219 to set a target rotational speed of the information storage medium 201, and reports that value to a spindle motor drive circuit 215.

The spindle motor drive circuit 215 computes the difference between this target rotational speed and the output signal (current rotational speed) from the information storage medium rotational speed detection circuit 214, and supplies a drive current according to the computation result to the spindle motor 204, so as to control the spindle motor 204 to rotate at a constant rotational speed. The output signal from the information storage medium rotational speed detection circuit 214 is a pulse signal having a frequency corresponding to the rotational speed of the information storage medium 201, and the spindle motor drive circuit 215 controls the frequency and pulse phase of this signal.

<<Optical Head Moving Mechanism>>

An optical head moving mechanism (feed motor) 203 for moving the optical head 202 in the radial direction of the information storage medium 201 is provided.

A guide mechanism for moving the optical head 202 normally use a rod-like guide shaft, and the optical head 202 moves by exploiting friction between this guide shaft and a bushing attached to a portion of the optical head 202. Also, a method using a bearing that reduces the frictional force using rotation is available.

In a driving force transmission method for moving the optical head 202, a rotary motor with a pinion (rotary gear; not shown) is disposed in a stationary system, and a rack as a linear gear that meshes with the pinion is disposed on the side surface of the optical head 202 to convert the rotation of the rotation motor into rectilinear motion of the optical head 202. As another driving force transmission method, a linear motor method in which a permanent magnet is disposed in a stationary system, and a current is supplied to a coil disposed on the optical head 202 to move the head 202 rectilinearly is also available.

In either of the rotary motor and linear motor methods, a current is basically supplied to a feed motor to generate a driving force for moving the optical head 202. The drive current is supplied from a feed motor drive circuit 216.

<<<Functions of Control Circuits>>>
<<Focused Beam Spot Trace Control>>

To attain focus or track error correction, the objective lens actuator drive circuit 218 supplies a drive current to the object lens actuator (not shown) in the optical head 202 in accordance with output signal (detection signal) from the focus/track error detection circuit 217. To obtain quick response of objective lens movement up to the higher frequency range, the circuit 218 includes a phase compensation circuit for improving characteristics in correspondence with the frequency characteristics of the objective lens actuator.

The objective lens actuator drive circuit 218 executes the following processes in accordance with commands from the controller 220:
an ON/OFF process of focus/track error correction (focus/track loop);
a process for moving the objective lens in the direction (focus direction) perpendicular to the information storage medium 201 (executed while the focus/track loop is OFF); and
a process for moving the focused beam spot to a neighboring track by slightly moving in the radial direction (a direction to cross the track) of the information storage medium 201 using kick pulses.

<<Laser Beam Amount Control>>

<Switching Process Between Reproduction and Recording/Erasure>

The switching process between reproduction and recording/erasure is attached by changing the amount of the focused beam spot that strikes the information storage medium 201.

For an information storage medium using a phase change scheme, the following relation normally holds:

[light amount upon recording]>[light amount upon erasure]>[light amount upon reproduction]

For an information storage medium using a magnetooptical scheme, the following relation normally holds:

[light amount upon recording]≈[light amount upon erasure]>[light amount upon reproduction]

In case of the magnetooptical scheme, recording and erasure processes are controlled by changing the polarity of an external magnetic field (not shown) to be applied to the information storage medium 201 upon recording/erasure.

Upon reproducing information, the information storage medium 201 is continuously irradiated with a given amount of light.

When new information is recorded, a pulse-like intermittent light amount is superposed on the light amount upon reproduction. When the semiconductor laser element emits pulses with a large light amount, the light reflective recording film of the information storage medium 201 locally causes an optical or shape change to form recording marks. When information is overwritten on the already recorded area, the semiconductor laser element similarly emits pulses.

When already recorded information is erased, the information storage medium is continuously irradiated with a constant amount of light larger than that upon reproduction. Upon erasing information continuously, the amount of irradiation light returns to that upon reproduction at a specific period (e.g., in units of sectors) to intermittently reproduce information parallel to the erase process. The erase process is executed while checking if a wrong track is erased by intermittently reproducing track numbers and addresses of tracks to be erased.

<Laser Emission Control>

The optical head 202 incorporates a photodetector (not shown) for detecting the amount of light emitted by the semiconductor laser element. A semiconductor laser drive circuit 205 computes the difference between that photodetector output (the detection signal of the amount of light emitted by the semiconductor laser element), and an emission reference signal supplied from a recording/reproduction/erasure control waveform generation circuit 206, and feeds back the drive current to the semiconductor laser on the basis of the computation result.

<<<Various Operations Associated With Control System of Mechanism Portion>>>
<<Startup Control>>

When the information storage medium (optical disk) 201 is attached onto the rotary table 221 and startup control starts, the processes are done in accordance with the following procedure:

1) The controller 220 informs the spindle motor drive circuit 215 of the target rotational speed, and the spindle motor drive circuit 215 supplies a drive current to the spindle motor 204, thus starting rotation of the spindle motor 204.

2) At the same time, the controller 220 sends a command (execution command) to the feed motor drive circuit 216, which supplies a drive current to the optical head drive mechanism (feed motor) 203, thus moving the optical head 202 to the innermost peripheral position of the information storage medium 201. It is confirmed if the optical head 202 has reached an inner peripheral portion beyond the information recorded area of the information storage medium 201.

3) When the spindle motor 204 has reached the target rotational speed, that status (status report) is sent to the controller 220.

4) The semiconductor laser drive circuit 205 supplies a current to the semiconductor laser element in the optical head 202 in correspondence with a reproduction light amount signal sent from the controller 220 to the recording/reproduction/erasure control waveform generation circuit 206, thus initiating laser emission.

The optimal amount of irradiation light varies depending on the types of information storage media (optical disks) 201. Upon startup, a value corresponding to the smallest amount of irradiation light is set.

5) The objective lens actuator drive circuit 218 controls to move the objective lens (not shown) in the optical head 202 to a position farthest from the information storage medium 201 in accordance with a command from the controller 220, and to make the objective lens slowly approach the information storage medium 201.

6) At the same time, the focus/track error detection circuit 217 monitors a focus error amount, and issues status when the objective lens is located near an in-focus position, thus reporting that status to the controller 220.

7) Upon receiving the status, the controller 220 sends a focus loop ON command to the objective lens actuator drive circuit 218.

8) The controller 220 sends a command to the feed motor drive circuit 216 to slowly move the optical head 202 toward the outer periphery of the information storage medium 201, while maintaining the focus loop ON.

9) At the same time, the controller 220 monitors a reproduction signal from the optical head 202 is monitored. When the optical head 202 has reached the recording area on the information storage medium 201, the controller 220 stops the movement of the optical head 202, and sends a track loop ON command to the objective lens actuator drive circuit 218.

10) An "optimal light amount upon reproduction" and "optimal light amount upon recording/erasure" recorded in the inner peripheral portion of the information storage medium (optical disk) 201 are reproduced, and are recorded in the semiconductor memory 219 via the controller 220.

11) Furthermore, the controller 220 sends a signal corresponding to the "optimal light amount upon reproduction" to the recording/reproduction/erasure control waveform generation circuit 206 to re-set the amount of light to be emitted by the semiconductor laser element upon reproduction.

12) The amount of light to be emitted by the semiconductor laser element upon recording/erasure is set in correspondence with "optimal light amount upon recording/erasure" recorded on the information storage medium 201.
<<Access Control>>
<Reproduction of Access Destination Information on Information Storage Medium 201>

Information indicating the locations and contents of information recorded on the information storage medium 201 varies depending on the type of information storage medium 201, and is generally recorded in a directory management area, navigation pack, or the like in the information storage medium 201. The directory management area is recorded together in an inner or outer peripheral area on the information storage medium 201. The navigation pack is contained in a VOBS (video Object Set) which complies with the data structure of a PS (Program Stream) of MPEG2, and records information indicating the recording location of the next video data.

When specific information is to be reproduced or recorded/erased, information in the aforementioned area is reproduced first, and an access destination is determined based on the reproduced information.
<Coarse Access Control>

The controller 220 computes the radial position of the access destination, and detects the distance between that position and the current position of the optical head 202.

Velocity curve information which allows the optical head 202 to move that moving distance in a shortest period of time is pre-recorded in the semiconductor memory 219. The controller 220 reads that information, and controls movement of the optical head 202 by the following method in accordance with the velocity curve.

The controller 220 issues a command to the objective lens actuator drive circuit 218 to turn off the track loop, and controls the feed motor drive circuit 216 to start movement of the optical head 202.

When the focused beam spot has crossed a given track on the information storage medium 201, the focus/track error detection circuit 217 generates a track error detection signal. Using this track error detection signal, the relative velocity of the focused beam spot with respect to the information storage medium 201 can be detected.

The feed motor drive circuit 216 computes the difference between the relative velocity of the focused beam spot obtained from the focus/track error detection circuit 217, and target velocity information sequentially sent from the controller 220, and feeds back that result to a drive current to be supplied to the optical head drive mechanism (feed motor) 203, thus moving the optical head 202.

As described in "<<Optical Head Moving Mechanism>>", a frictional force always acts between the guide shaft and bushing or bearing. While the optical head 202 is moving at high speed, dynamic friction acts. However, at the beginning of movement and immediately before the end of movement, static friction acts due to the low moving speed of the optical head 202. At this time, since the relative frictional force increases (especially immediately before the end of movement), the gain of a current to be supplied to the optical head drive mechanism (feed motor) 203 is raised in accordance with a command from the controller 220.
<Dense Access Control>

When the optical head 202 has reached the target position, the controller 220 issues a command to the objective lens actuator drive circuit 218 to turn on the track loop.

The focused beam spot traces along a track on the information storage medium 201 to reproduce the address or track number of that portion.

The current focused beam spot position is detected from that address or track number, and the controller 220 computes the number of error tracks from the target positions to be reached, and informs the objective lens actuator drive circuit 218 of the number of tracks required to move the focused beam spot.

When the objective lens actuator drive circuit 218 generates a pair of kick pulses, the objective lens slightly moves in the radial direction of the information storage medium 201 to move the focused beam spot to a neighboring track.

The objective lens actuator drive circuit 218 temporarily turns off the track loop, generates some pairs of kick pulses corresponding to the information from the controller 220, and then turns on the track loop again.

Upon completion of dense access, the controller 220 reproduces information (address or track number) at a position where the focused beam spot traces, and confirms if the target track is accessed.

<<Continuous Recording/Reproduction/Erasure Control>>

As shown in FIG. 35, the track error detection signal output from the focus/track error detection circuit 217 is input to the feed motor drive circuit 216. Upon executing "startup control" and "access control" mentioned above, the controller 220 controls the feed motor drive circuit 216 not to use the track error detection signal.

After it is confirmed that the focused beam spot has reached the target track by access control, some components of the track error detection signal are supplied as a drive current of the optical head drive mechanism (feed motor) 203 via the feed motor drive circuit 216 in accordance with a command from the controller 220. During a continuous reproduction or recording/erasure process, this control continues.

The information storage medium 201 is attached to the rotary table 221 to have an eccentricity between their central positions. When some components of the track error detection signal are supplied as a drive current, the whole optical head 202 slightly moves in correspondence with the eccentricity.

When the reproduction or recording/erasure process is continuously done for a long period of time, the focused beam spot position gradually moves toward the outer or inner periphery. When some components of the track error detection signal are supplied as a drive current of the optical head moving mechanism (feed motor) 203, the optical head 202 gradually moves toward the outer or inner periphery accordingly.

In this way, the load on track error correction by the objective lens actuator can be reduced, and the track loop can be stable.

<<End Control>>

Upon completion of a series of processes, when the operation is to end, the processing is done in the following procedure.

1) The controller 220 issues a track loop OFF command to the objective lens actuator drive circuit 218.

2) The controller 220 issues a focus loop OFF command to the objective lens actuator drive circuit 218.

3) The controller 220 issues an emission stop command of the semiconductor laser element to the recording/reproduction/erasure control waveform generation circuit 206.

4) Zero reference rotational speed is sent to the spindle motor drive circuit 215.

<<<Flow of Recording Signal/Reproduction Signal to/from Information Storage Medium 201>>>

<Signal Format Recorded on Information Storage Medium 201>>

In order to meet requirements:

to allow correction of any recording information errors caused by defects on the information storage medium 201;

to simplify a reproduction processing circuit by setting zero DC component of a reproduction signal; and to record information at highest possible density on the information storage medium 201 for signals to be recorded on the information storage medium 201, the information recording/reproduction unit (physical system block) performs "appending of error correction function" and "signal conversion of recording information (modulation/demodulation of signal)", as shown in FIG. 35.

<<Flow of Signal Upon Recording>>
<<<ECC (Error Correction Code) Appending Process>>>

Information to be recorded on the information storage medium 201 is input to a data input/output interface 222 as a recording signal d in the form of a raw signal. This recording signal d is directly recorded on the semiconductor memory 219, and then an ECC encoding circuit 208 executes an ECC appending process as follows.

An embodiment of an ECC appending method using product codes will be explained below.

The recording signal d is sequentially arranged row by row in units of 172 bytes in the semiconductor memory 219 to form one ECC block by 192 rows. Ten-byte inner codes PI are computed in units of 172-byte rows with respect to a raw signal (recording signal d) in one ECC block formed by "rows: 192×columns: 192 bytes", and are additionally recorded in the semiconductor memory 219. Furthermore, 16-byte outer codes PO are computed in units of 1-byte columns, and are additionally recorded in the semiconductor memory 219.

As an embodiment of information to be recorded on the information storage medium 201, a total of 2366 bytes (2366=(12+1)×(172+10), i.e., 12 rows containing the inner codes PI and one row for the outer codes PO, are recorded as one unit in one sector of the information storage medium.

Upon completion of appending of the inner and outer codes PI and PO, the ECC encoding circuit 208 reads signals in units of 2366 bytes for one sector from the semiconductor memory 219 and transfers them to a modulation circuit 207.

<Signal Modulation>

In order to make the DC component (DSV: Digital Sum Value) of a reproduction signal approach zero, and to record information on the information storage medium 201 at high density, the modulation circuit 207 performs signal modulation as conversion of the signal format.

The modulation circuit 207 and a demodulation circuit 210 include conversion tables each indicating the relationship between the source signal and modulated signal. A signal transferred from the ECC encoding circuit 208 is broken up in units of a plurality of bits in accordance with a give modulation scheme, and is converted into another signal (code) while looking up the conversion table.

For example, when 8/16 modulation (RLL(2, 10) code) is used as the modulation scheme, there are two kinds of conversion tables, and the conversion tables to be looked up are switched sequentially to make the modulated DC component (DSV: Digital Sum Value) approach zero.

<Recording Waveform Generation>

When recording marks are recorded on the information storage medium (optical disk) 201, the following recording schemes are normally used.

The first scheme is mark length recording. In this scheme, "1"s are set at the leading and trailing end positions of a recording mark. The second scheme is inter-mark recording. In this scheme, the central position of a recording mark matches the "1" position.

When mark length recording is done, a long recording mark must be formed. In this case, when a given portion of the information storage medium 201 is kept irradiated with light with recording level for a given period of time, a "raindrop"-shaped recording mark having a broader trailing end portion forms due to the heat accumulation effect of the light reflective recording film of the information storage medium 201. To solve such problem, upon forming a long recording mark, a plurality of recording pulses are used, or the recording waveform changes in a staircase pattern.

The recording/reproduction/erasure control waveform generation circuit 206 generates the aforementioned recording waveform in accordance with a recording signal sent from the modulation circuit 206, and transfers it to the semiconductor laser drive circuit 205.

<<Flow of Signal Upon Reproduction>>

<Binarization/PLL Circuit>

As described in "<Signal Detection by Optical Head 202>", a signal on the information storage medium 201 is reproduced by detecting a change in amount of light reflected by the light reflection film or light reflective recording film of the information storage medium (optical disk) 201. A signal obtained by the amplifier 213 has an analog waveform. The binarization circuit 212 converts that signal into a binary digital signal (defined by "1"s and "0"s) using a comparator.

The PLL circuit 211 extracts a reference signal used upon reproducing information on the basis of the reproduction signal obtained by the binarization circuit 212. The PLL circuit 211 incorporates a frequency variable oscillator. The frequencies and phases of a pulse signal (reference clock) output from that oscillator and the output signal from the binarization circuit 212 are compared, and the comparison results are fed back to the oscillator output.

<Demodulation of Signal>

The demodulation circuit 210 has a conversion table indicating the relationship between the modulated and demodulated signals. The demodulation circuit 210 reclaims the original signal from this signal by looking up the conversion table in synchronism with the reference clock obtained by the PLL circuit 211. The reclaimed (demodulated) signal is recorded in the semiconductor memory 219.

<Error Correction Process>

An error correction circuit 209 detects error positions of signals saved in the semiconductor memory 219 using the inner and outer codes PI and PO, and sets pointer flags of the error positions.

After that, the error correction circuit 209 corrects signals at the error positions in accordance with the error flags while reading out the signal from the semiconductor memory 219, removes the inner and outer codes PI and PO, and transfers the corrected signals to the data input/output interface 222.

The signal sent from the ECC encoding circuit 208 is output from the data input/output interface as a reproduction signal c.

Figure 38:
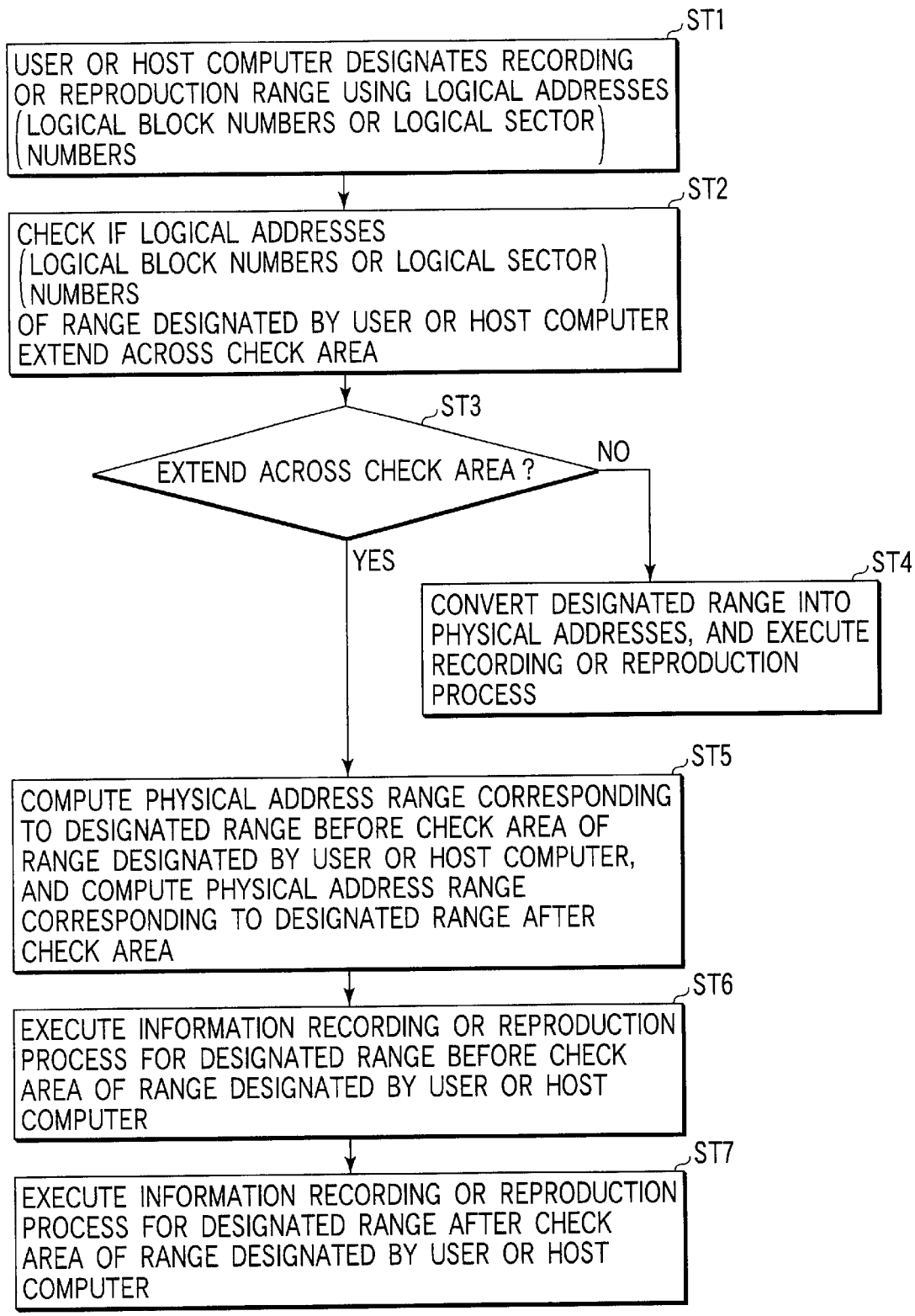
FIG. 38 is a flow chart for explaining the method of recording or reproducing information while avoiding a check area.

A method of recording or reproducing information while avoiding the check areas will be explained below with reference to FIG. 38. Note that recording or reproduction to be described below is executed by the information recording/reproduction apparatus (mainly, the optical head 202, recording/reproduction/erasure control waveform generation circuit 206, and controller 220) shown in FIG. 35. The user or host computer designates the recording or reproduction range using logical addresses (logical block numbers or logical sector numbers) (ST1). It is checked if the logical addresses (logical block numbers or logical sector numbers) of the range designated by the user or host computer extend across a check area (ST2). If the logical addresses do not extend across any check area (ST3, NO), the logical addresses of the designated range are converted into physical addresses, and a recording or reproduction process is then executed (ST4). On the other hand, If the logical addresses extend across a check area (ST3, YES), a physical address range corresponding to the designated range present before the check area of the range designated by the user or host computer is computed, and also a physical address range corresponding to the designated range after the check area is computed (ST5). An information recording or reproduction process is executed for the designated range before the check area of the range designated by the user or host computer (ST6). An information recording or reproduction process is executed for the designated range after the check area of the range designated by the user or host computer (ST7).

Figure 39:
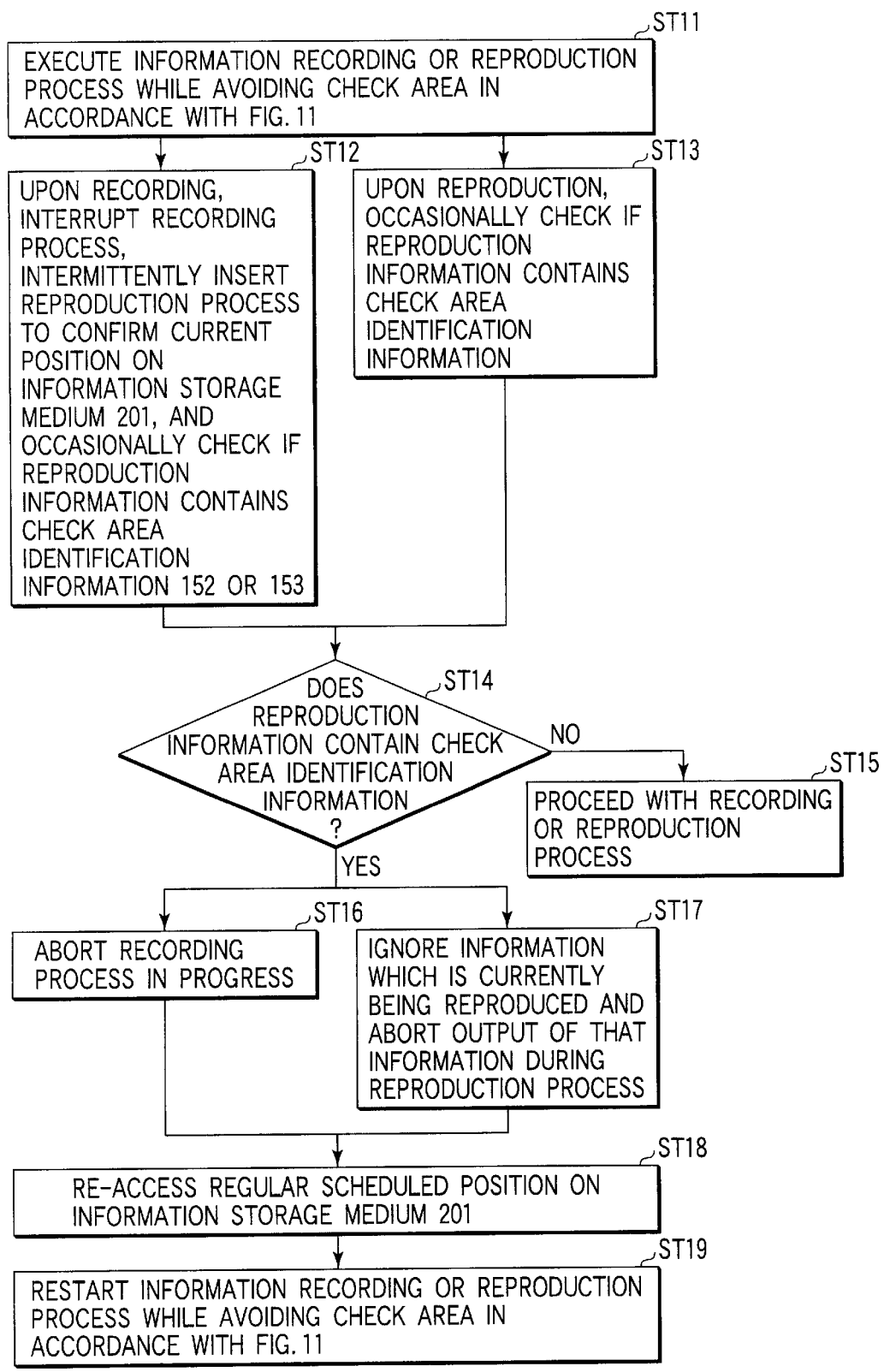
FIG. 39 is a flow chart for explaining a measure to be taken when the control inadvertently enters a check area during recording or reproduction of information.

A measure taken when the control inadvertently enters a check area during recording or reproduction of information will be explained below with reference to FIG. 39. Note that the measure to be described below is executed by the information recording/reproduction apparatus (mainly, the controller 220) shown in FIG. 35.

As has been explained with reference to the flow chart in FIG. 38, an information recording or reproduction process is executed while avoiding the check areas (ST11). Upon recording, a recording process is interrupted during the process, and a reproduction process is intermittently inserted to confirm the current position on the information storage medium 201. Also, it is occasionally confirmed if the reproduction information contains check area identification information 152 or 153 (ST12). Upon reproduction, it is occasionally confirmed if the reproduction information contains check area identification information (ST13). If the reproduction information does not contain any check area identification information (NO, ST14), the recording or reproduction process continues (ST15). On the other hand, if the reproduction information contains check area identification information (ST14, YES), the recording process in progress is aborted (ST16), or information which is currently being reproduced is ignored and is inhibited from being output during the reproduction process (ST17). Then, a regular scheduled position on the information storage medium 201 is re-accessed (ST18). As has been explained with reference to the flow chart in FIG. 38, the information recording or reproduction process is restarted while avoiding the check areas (ST19).

Figure 40:
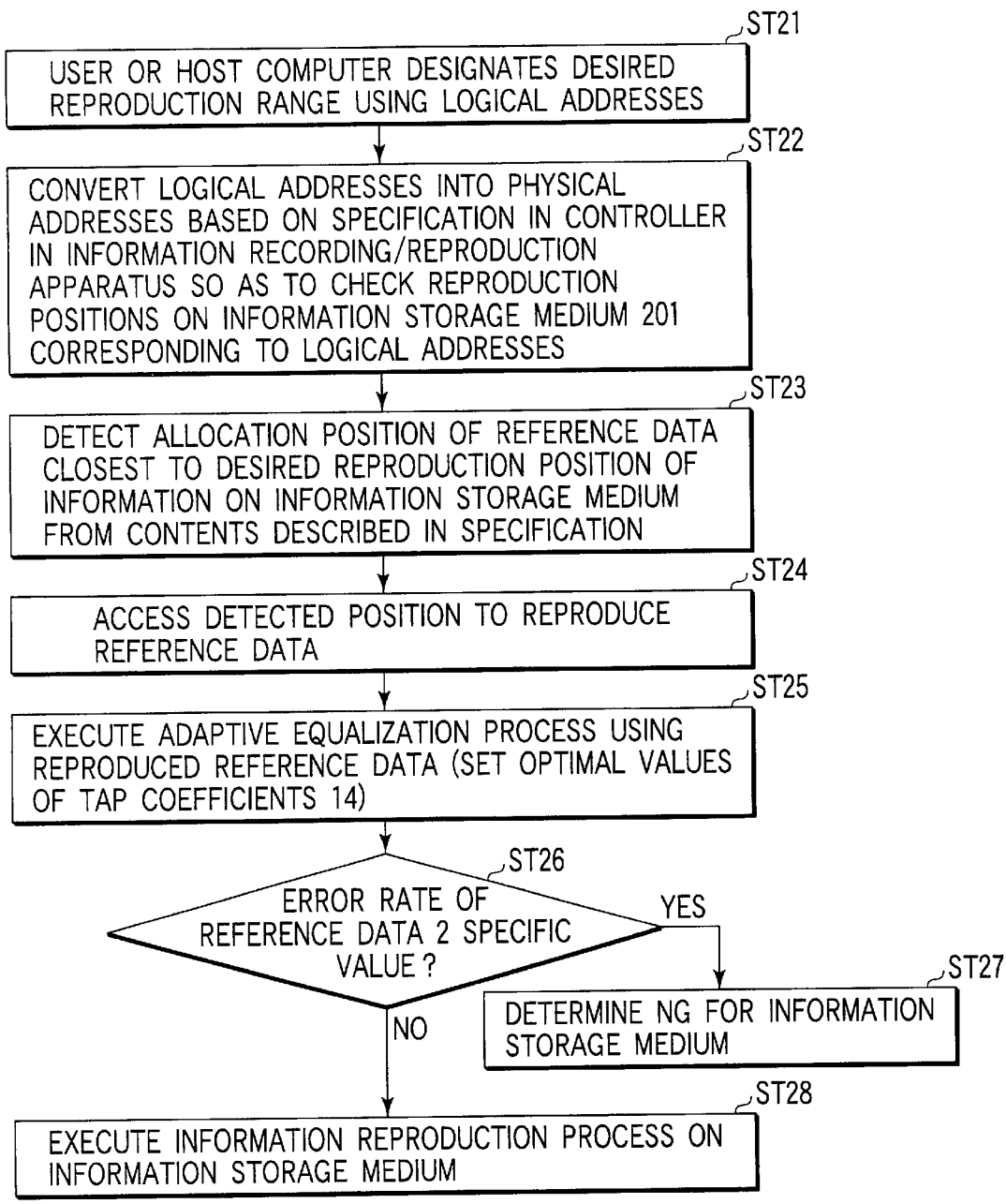
FIG. 40 is a flow chart for explaining the circuit adjustment or information storage medium evaluation method using reference data.

A circuit adjustment or information storage medium evaluation method using reference data will be explained below with reference to FIG. 40.

The user or host computer designates a range to be reproduced using logical addresses (ST21). In order to check the reproduction positions on the information storage medium 201 corresponding to the logical addresses, the controller in the information recording/reproduction apparatus converts the logical addresses into physical addresses on the basis of a specification (ST22). A location of reference data which is closest to the location on the information storage medium from which information is to be reproduced is detected from the contents described in the specification (ST23). The detected location is accessed to reproduce the reference data (ST24). An adaptive equalization process (for setting optimal tap coefficient values 14) is executed using the reproduced reference data (ST25). If the error rate of the reference data is a specific value or higher (ST26, YES), NG is determined for that information storage medium (ST27). On the other hand, if the error rate of the reference data is lower than the specific value (ST26, NO), an information reproduction process on the information storage medium is executed (ST28).

Figure 41:
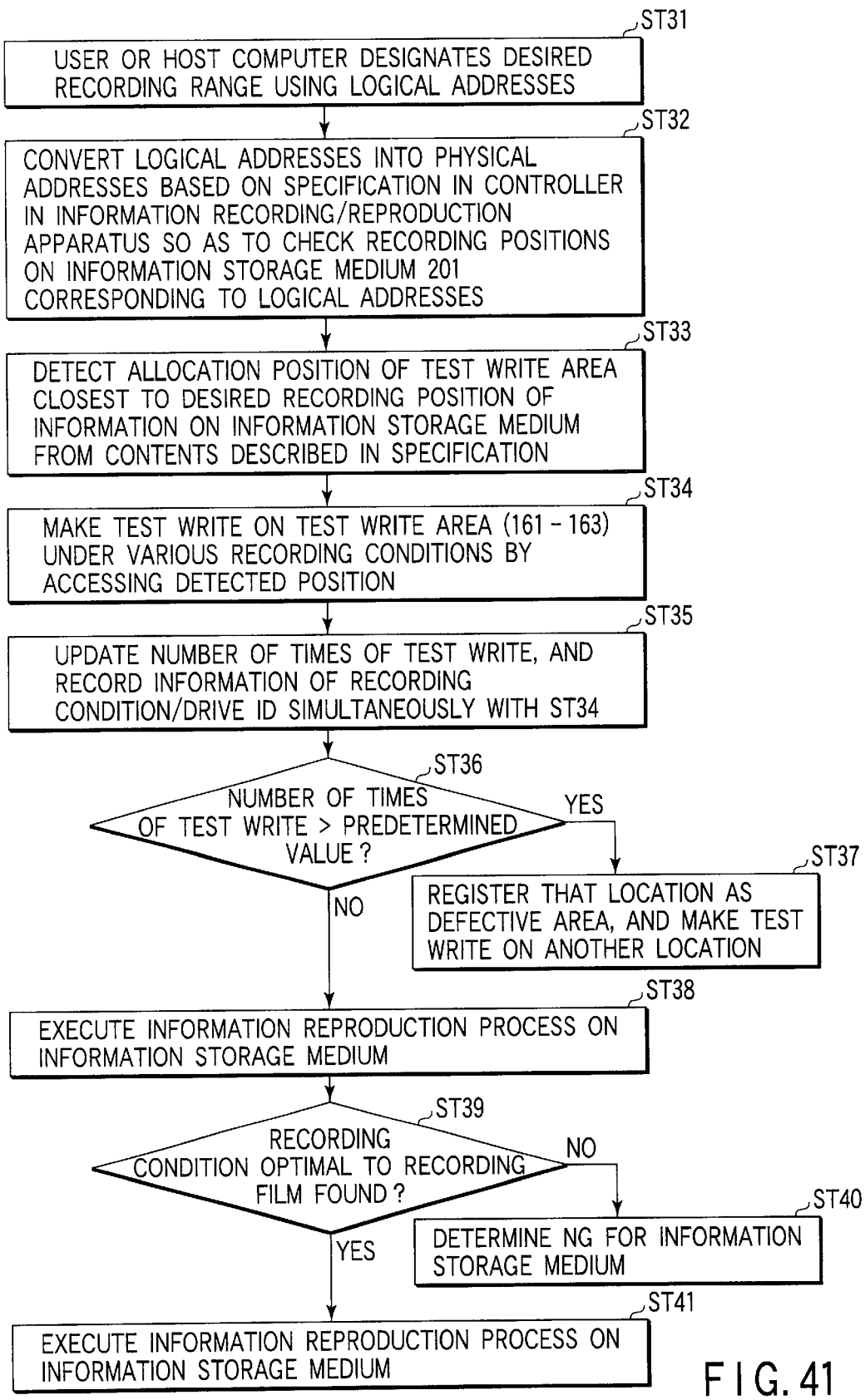
FIG. 41 is a flow chart for explaining an optimal recording condition setting method using a test write area.

An optimal recording condition setting method using the test write area will be explained below with reference to FIG. 41.

The user or host computer designates a range wherein information is to be recorded using logical addresses (ST31). In order to check the recording positions on the information storage medium 201 corresponding to the logical addresses, the controller in the information recording/ reproduction apparatus converts the logical addresses into physical addresses on the basis of a specification (ST32). That location of a test write area which is closest to the location on the information storage medium where information is to be recorded is detected from the contents described in the specification (ST33). The detected location is accessed to make test write on the test write area (161 to 163) under various recording conditions (ST34). Test write is made by the optical head 202 of the information recording/reproduction apparatus shown in FIG. 35. Simultaneously with ST34, the number of times of test write is updated, and recording condition and drive ID information are recorded (ST35). This recording is also done by the optical head 202. If the number of times of test write has exceeded a predetermined value (ST36, YES), that location is registered as a defective area, and test write is made on another area (ST37). If the number of times of test write has not exceeded the predetermined value yet (ST36, NO), the information recorded in ST34 is reproduced to extract a recording condition optimal to the recording film (ST38). If no recording condition optimal to the recording film is found (ST39, NO), NG is determined for that information storage medium (ST40). If a recording condition optimal to the recording film is found (ST39, YES), an information recording process on the information storage medium is executed (ST41).

As described above, effects of the present invention can be summarized as follows.

1. Reference data recording areas or test write areas are distributed and allocated at a plurality of locations on an information storage medium, and the circuit constants of an information reproduction apparatus or optimal recording conditions of an information recording/reproduction apparatus are set using the reference data recording area/test write area, which is closest to an area where user data is to be reproduced or recorded. In this way, even when a master disk used to form an information storage media suffers nonuniformity of applied photoresist or a master disk exposure apparatus suffers exposure nonuniformity, or even when the information storage medium suffers recording sensitivity nonuniformity in the radial direction due to the influences of thickness unevenness of its recording film, the circuit constants of the information reproduction apparatus can be optimized, and optimal recording conditions of the information recording/reproduction apparatus can be set while assuring high reliability and stability.

2. In order to set the reference data recording area or test write area as a logical address non-setting area, an access instruction from the user or host computer to the reference data recording area/test write area is inhibited, and recording/reproduction can be done while avoiding the reference data recording area/test write area upon reproducing information recorded in the user data recording area.

3. Since the reference data recording area or test write area includes recording areas of check area identification information 152 and identification information 153, even when the control inadvertently enters the reference data recording area or test write area due to track errors upon recording or reproducing user data, that area can be automatically detected, and an avoidance process can be immediately executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium comprising:
a plurality of user data recording areas; and
a plurality of reference data recording areas that record reference data, which is used in at least one of circuit constant adjustment of an information reproduction apparatus and characteristic evaluation of an information storage mediums said plurality of user data recording areas being logical address setting areas and physical address setting areas,
said plurality of reference data recording areas being distributed from an innermost periphery to an outermost periphery of the information storage medium,
said plurality of reference data recording areas being logical address non-setting areas and physical address setting areas, and
said plurality of reference data recording areas including identification information used for identifying the reference data recording areas.

2. A medium according to claim 1, wherein the reference data is recorded in each reference data recording area in a predetermined recording unit.

3. A medium according to claim 1, wherein the information reproduction apparatus has information which pertains to a constraint length used upon forming multi-valued level signals from a reproduction signal, and information which pertains to a channel bit unit corresponding to the constraint length, and
the reference data is recorded in the reference data recording area to set a shortest distance between neighboring channel bits of a reproduction signal level that reflects the reference data to be shorter than the constraint length.

4. An information storage media comprising:
a plurality of user data recording areas; and
a plurality of test write areas used to check an optimal recording condition,
said plurality of user data recording areas being logical address setting areas and physical address setting areas,
said plurality of test write areas being distributed from an innermost periphery to an outermost periphery of the information storage medium,
said plurality of test write areas being logical address non-setting areas and physical address setting areas, and
said plurality of test write areas including identification information used for identifying the test write areas.

5. An information recording method for recording information in an information storage medium comprising:
a plurality of user data recording areas; and
a plurality of reference data recording areas that record reference data, which is used in at least one of circuit constant adjustment of an information reproduction apparatus and characteristic evaluation of an information storage medium,
said plurality of user data recording areas being logical address setting areas and physical address setting areas,
said plurality of reference data recording areas being distributed from an innermost periphery to an outermost periphery of the information storage medium,
said plurality of reference data recording areas being logical address non-setting areas and physical address setting areas, and
said plurality of reference data recording areas including identification information used for identifying the reference data recording areas, said information recording method comprising the steps of:
  recording reference data used in said at least one of circuit constant adjustment of the information reproduction apparatus and characteristic evaluation of the information storage medium in a plurality of reference data recording areas assured on the information storage medium.

6. An information recording method for recording information in an information recording medium comprising:
  a plurality of user data recording areas; and
  a plurality of test write areas used to check an optimal recording condition,
  said plurality of user data recording areas being logical address setting areas and physical address setting areas,
  said plurality of test write areas being distributed from an innermost periphery to an outermost periphery of the information storage medium,
  said plurality of test write areas being logical address non-setting areas and physical address setting areas, and
  said plurality of test write areas including identification information used for identifying the test write areas,
  said information recording method comprising:
    recording at least an ID of a drive which is to undergo test write in a said test write areas, said ID of the drive being recordable together with information indicating how many times a test write is performed and information representing a test write recording condition.

7. An information recording apparatus for recording information in an information recording medium comprising:
  a plurality of user data recording areas, and
  a plurality of reference data recording areas that record reference data, which is used in at least one of circuit constant adjustment of an information reproduction apparatus and characteristic evaluation of an information storage medium,
  said plurality of user data recording areas being logical address setting areas and physical address setting areas,
  said plurality of reference data recording areas being distributed from an innermost periphery to an outermost periphery of the information storage medium,
  said plurality of reference data recording areas being logical address non-setting areas and physical address setting areas, and
  said plurality of reference data recording areas including identification information used for identifying the reference data recording areas,
  said information recording apparatus comprising:
  recording means for recording reference data used in said at least one of circuit constant adjustment of the information reproduction apparatus and characteristic evaluation of an the information storage medium in a plurality of reference data recording areas assured on the information storage medium.

8. An information recording apparatus for recording information in an information recording medium comprising:
  a plurality of user data recording areas; and
  a plurality of test write areas used to check an optimal recording condition,
  said plurality of user data recording areas being logical address setting areas and physical address setting areas,
  said plurality of test write areas being distributed from an innermost periphery to an outermost periphery of the information storage medium,
  said plurality of test write areas being logical address non-setting areas and physical address setting areas, and
  said plurality of test write areas including identification information used for identifying the test write areas,
  said information recording apparatus comprising:
    recording means for recording at least an ID of a drive which is to undergo test write in a test write areas, said ID of the drive being recordable together with information indicating how many times a test write is performed and information representing a test write recording condition.

9. An information reproduction method for reproducing an information storage medium which comprises:
  a plurality of user data recording areas; and
  a plurality of reference data recording areas where reference data which is used in at least one of circuit constant adjustment of an information reproduction apparatus and characteristic evaluation of an information storage medium is recorded,
  said plurality of user data recording areas being logical address setting areas and physical address setting areas,
  said plurality of reference data recording areas being distributed from an innermost periphery to an outermost periphery of the information storage medium,
  said plurality of reference data recording areas being logical address non-setting areas and physical address setting areas, and
  said plurality of reference data recording areas including identification information used for identifying the reference data recording areas,
  said information reproduction method comprising the step of:
    reproducing user data recorded in the user data recording area based on a logical address.

10. An information reproduction method for reproducing an information storage medium which comprises:
  a plurality of user data recording areas; and
  a plurality of test write areas used to check an optimal recording condition,
  said plurality of user data recording areas being logical address setting areas and physical address setting areas,
  said plurality of test write areas being distributed from an innermost periphery to an outermost periphery of the information storage medium,
  said plurality of test write areas being logical address non-setting areas and physical address setting areas, and
  said plurality of test write areas including identification information used for identifying the test write areas,
  said method comprising the step of:
    reproducing user data recorded in the user data recording area based on a logical address.

11. An information reproduction method for reproducing an information storage medium which comprises:
  a plurality of user data recording areas;
  a plurality of reference data recording areas where reference data which is used in at least one of circuit constant adjustment of an information reproduction apparatus and characteristic evaluation of an information storage medium is recorded and
  a plurality of test write areas used to check an optimal recording condition,
  said plurality of user data recording areas being logical address setting areas and physical address setting areas, said plurality of reference data recording areas being distributed from an innermost periphery to an outermost periphery of the information storage medium, said plurality of reference data recording areas being logical address non-setting areas and physical address setting areas, and said plurality of reference data recording areas including first identification information used for identifying the reference data recording areas, said plurality of test write areas being distributed from an innermost periphery to an outermost periphery of the information storage medium, said plurality of test write areas being logical address non-setting areas and physical address setting areas, and said plurality of test write areas including second identification information used for identifying the test write areas, said method comprising the steps of:
reproducing user data recorded in the user data recording based on a logical address;
monitoring which identification information, the first identification information or the second identification information, is reproduced from the user data recording areas during user data reproduction;
determining that one of the reference data recording area and the test write area is reproduced when one of the identification data is reproduced; and
executing a process for ignoring information recorded in the reference data recording area and the test write area, a process for aborting output of information recorded in the reference data recording area and the test write area, and a process for accessing the user data recording area.

12. An information reproduction apparatus for reproducing an information storage medium which comprises:

a plurality of user data recording areas; and a plurality of reference data recording areas where reference data which is used in at least one of circuit constant adjustment of an information reproduction apparatus and characteristic evaluation of an information storage medium is recorded, said plurality of user data recording areas being logical address setting areas and physical address setting areas, said plurality of reference data recording areas being distributed from an innermost periphery to an outermost periphery of the information storage medium, said plurality of reference data recording areas being logical address non-setting areas and physical address setting areas, and said plurality of reference data recording areas including identification information used for identifying the reference data recording areas, said apparatus comprising:
reproduction means for reproducing user data recorded in the user data recording area based on a logical address.

13. An information reproduction apparatus for reproducing an information storage medium which comprises:

a plurality of user data recording areas; and a plurality of test write areas used to check an optimal recording condition, said plurality of user data recording areas being logical address setting areas and physical address setting areas, said plurality of test write areas being distributed from an innermost periphery to an outermost periphery of the information storage medium, said plurality of test write areas being logical address non-setting areas and physical address setting areas, and said plurality of test write areas including second identification information used for identifying the test write areas, said apparatus comprising:
reproduction means for reproducing user data recorded in the user data recording area based on a logical address.

14. An information reproduction apparatus for reproducing an information storage medium which comprises:

a plurality of user data recording areas a plurality of reference data recording areas where reference data which is used in at least one of circuit constant adjustment of an information reproduction apparatus and characteristic evaluation of an information storage medium is recorded; and a plurality of test write areas used to check an optimal recording condition, said plurality of user data recording areas being logical address setting areas and physical address setting areas, said plurality of reference data recording areas being distributed from an innermost periphery to an outermost periphery of the information storage medium, said plurality of reference data recording areas being logical address non-setting areas and physical address setting areas, and said plurality of reference data recording areas including first identification information used for identifying the reference data recording areas, said plurality of test write areas being distributed from an innermost periphery to an outermost periphery of the information storage medium, said plurality of test write areas being logical address non-setting areas and physical address setting areas, and said plurality of test write areas including second identification information used for identifying the test write areas, said apparatus comprising:
reproduction means car reproducing user data recorded in the user data recording areas based on a logical address; and
reproduction control means for monitoring which identification information, the first identification information or the second identification information, is reproduced from the user data recording areas during user data reproduction, determining that one of the reference data recording area and the test write area is reproduced when one of the identification data is reproduced, and executing a process for ignoring information recorded in the reference data recording area and the test write area, a process for aborting output of information recorded in the reference data recording area and the test write area, and a process for accessing the user data recording area.

* * * * *